US012744654B2

(12) United States Patent
Liu et al.

(10) Patent No.: US 12,744,654 B2
(45) Date of Patent: Sep. 22, 2026

(54) METHOD AND APPARATUS FOR SENDING PHYSICAL LAYER PROTOCOL DATA UNIT

(71) Applicant: HUAWEI TECHNOLOGIES CO., LTD., Shenzhen (CN)

(72) Inventors: Chenchen Liu, Shenzhen (CN); Yuxin Lu, Shenzhen (CN); Bo Gong, Shenzhen (CN); Ming Gan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 324 days.

(21) Appl. No.: 18/411,477

(22) Filed: Jan. 12, 2024

(65) Prior Publication Data

US 2024/0154777 A1 May 9, 2024

Related U.S. Application Data

(63) Continuation of application No. PCT/CN2022/102178, filed on Jun. 29, 2022.

(30) Foreign Application Priority Data

Jul. 16, 2021 (CN) ......................... 202110807403.7

(51) Int. Cl.
*H04L 5/00* (2006.01)

(52) U.S. Cl.
CPC .......... *H04L 5/0098* (2013.01); *H04L 5/0048* (2013.01)

(58) Field of Classification Search
CPC ..... H04L 5/001; H04L 5/0098; H04L 5/0048; H04L 5/0041; H04L 27/2602;
(Continued)

(56) References Cited

U.S. PATENT DOCUMENTS

2016/0088599 A1 3/2016 Yang et al.
2020/0014509 A1 1/2020 Asterjadhi et al.
(Continued)

FOREIGN PATENT DOCUMENTS

EP 4185047 A1 5/2023
WO 2022245463 A1 11/2022

OTHER PUBLICATIONS

Extended European Search Report issued in EP22841186.4, dated Sep. 30, 2024, 8 pages.

(Continued)

*Primary Examiner* — Khoa Huynh

(57) ABSTRACT

A method and an apparatus for sending a physical layer protocol data unit, and a method and an apparatus for receiving a physical layer protocol data unit are disclosed. The method includes: generating a physical layer protocol data unit (PPDU); and sending the PPDU on one or more discrete resource units (RUs), where each of the one or more discrete RUs includes a plurality of subcarriers that are discrete in frequency domain. The subcarriers in each of the one or more discrete RUs provided in embodiments are discontiguous, and transmit power of discrete subcarriers increases, so that a transmitting device can transmit the PPDU at higher transmit power. This method may be applied to a wireless local area network system supporting a next-generation Wi-Fi protocol of IEEE 802.11ax, for example, 802.11 family of protocols such as 802.11be or EHT.

8 Claims, 7 Drawing Sheets

(58) Field of Classification Search
CPC ............... H04L 5/0007; H04L 5/0044; H04W 72/0453; H04W 84/12; Y02D 30/70
See application file for complete search history.

(56) References Cited

U.S. PATENT DOCUMENTS

| | | | | |
|---|---|---|---|---|
| 2020/0137836 | A1* | 4/2020 | Chen | H04L 5/001 |
| 2021/0143955 | A1 | 5/2021 | Yang et al. | |
| 2023/0084674 | A1* | 3/2023 | Tomeba | H04W 84/12 370/329 |

OTHER PUBLICATIONS

Edward Au,"Compendium of straw polls and potential changes to the Specification Framework Document",IEEE P802.11 Wireless LANs,IEEE 802.11-20/0566r42,Jul. 18, 2020,total 123 pages.

O'Rielly, Carr, et al,"Report and Order and Further Notice of Proposed Rulemaking",Federal Communications Commission FCC 20-51,Released: Apr. 24, 2020,total 142 pages.

IEEE Std 802.11a-1999,Part 11:Wireless LAN Medium Access Control(MAC) and Physical Layer (PHY) specifications: High-speed Physical Layer in the 5 GHZ Band,Sep. 16, 1999,total 90 pages.

IEEE Std 802.11b-1999, Supplement to IEEE Standard forInformation technology Telecommunications and information exchange between systems Local and metropolitan area networks Specific requirements Part 11: Wireless LAN Medium Access Control (MAC) and Physical Layer (PHY) specifications: Higher-Speed Physical Layer Extension in the 2.4 GHz Band, Sep. 16, 1999, total 97 pages.

IEEE Std 802.11g™—2003,Part 11: Wireless LAN Medium Access Control (MAC) and Physical Layer (PHY) specifications,Amendment 4: Further Higher Data Rate Extension in the 2.4 GHz Band,Jun. 27, 2003,total 78 pages.

IEEE Std 802.11n™—2009, Part 11: Wireless LAN Medium Access Control (MAC) and Physical Layer (PHY) specifications Amendment 5: Enhancements for higher throughput, Oct. 29, 2009, 536 pages.

IEEE Std 802.11ac™—2013,Part 11: Wireless LAN Medium Access Control (MAC) and Physical Layer (PHY) Specifications,Amendment 4: Enhancements for Very High Throughput for Operation in Bands below 6 GHZ,Dec. 11, 2013,total 425 pages.

IEEE P802.11ax™/D6.0,Part 11: Wireless LAN Medium Access Control(MAC) and Physical Layer (PHY) Specifications,Amendment 1: Enhancements for High Efficiency WLAN,Nov. 2019,total 780 pages.

IEEE P802.11be™/D0.01,Part 11: Wireless LAN Medium Access Control (MAC) and Physical Layer (PHY) Specifications,Amendment 7: Enhancements for extremely high throughput (EHT), Jul. 2020,total 33 pages.

* cited by examiner

METHOD AND APPARATUS FOR SENDING PHYSICAL LAYER PROTOCOL DATA UNIT

CROSS-REFERENCE TO RELATED APPLICATIONS

This application is a continuation of International Application No. PCT/CN2022/102178, filed on Jun. 29, 2022, which claims priority to China Patent Application No. 202110807403.7, filed on Jul. 16, 2021. The disclosures of the aforementioned applications are hereby incorporated by reference in their entireties.

TECHNICAL FIELD

This application relates to the field of communication technologies, and more specifically, to a method and an apparatus for sending a physical layer protocol data unit.

BACKGROUND

In a wireless local area network (WLAN) technology, a low-power indoor (LPI) communication manner is defined, and maximum power and maximum power spectral density (PSD) of sending are strictly limited, where PSD is signal power in a unit frequency band. For an access point (AP), maximum power is 36 dBm (decibel-milliwatts), and maximum power spectral density is 5 dBm/MHz (decibel-milliwatts/megahertz). For a station (STA), maximum power is 24 dBm, and maximum power spectral density is-1 dBm/MHz. Transmit power of a device is limited by both the maximum power and the maximum power spectral density. To be specific, the transmit power cannot exceed the maximum power value, and the transmit power spectral density cannot exceed the maximum power spectral density. Compared with the maximum power, limitation of the maximum power spectral density is stricter, and allowed maximum transmit power is usually more limited by the power spectral density. Due to the limitation of the power spectrum density, maximum transmit power of the device increases only with an increase in a transmit bandwidth. Table 1 shows a relationship between maximum transmit power and a bandwidth in an LPI scenario. It may be learned that when the bandwidth is 320 MHz, maximum power of the AP and the STA reaches specified maximum transmit power, and cannot reach the maximum transmit power in another bandwidth below 320 MHz due to the limitation of the maximum power spectral density.

TABLE 1

| Transmit bandwidth | Maximum power of an AP | Maximum power of a STA |
|---|---|---|
| 20 MHz | 18 | 12 |
| 40 MHz | 21 | 15 |
| 80 MHz | 24 | 18 |
| 160 MHz | 27 | 21 |
| 320 MHz | 36 | 24 |

A minimum time-frequency unit in a WLAN is a resource unit (RU). A standard defines 6 types of contiguous RUs: a 26-tone RU, a 52-tone RU, a 106-tone RU, a 242-tone RU, a 484-tone RU, and a 996-tone RU, where the 26-tone RU indicates that the type of RU includes 26 subcarriers, the 52-tone RU indicates that the type of RU includes 52 subcarriers, and so on. Currently, a subcarrier spacing of a WLAN system is 78.125 kHz, and there are approximately 12.8 subcarriers in a 1 MHz bandwidth. Therefore, the 26-tone RU approximately corresponds to 2 MHz, the 52-tone RU approximately corresponds to 4 MHz, the 106-tone RU approximately corresponds to 8 MHz, and the 242-tone RU approximately corresponds to 20 MHz.

It may be learned from Table 1 that in a scenario in which the power spectral density is limited, for an RU with a small bandwidth, the transmit power of the device is limited by the bandwidth of the RU, the device cannot send information at allowed maximum power, and a data transmission rate and a data transmission distance are greatly limited.

SUMMARY

This application provides a method and an apparatus for sending a physical layer protocol data unit, and a method and an apparatus for receiving a physical layer protocol data unit. Subcarriers in a discrete RU are discontiguous, and transmit power of discretely distributed subcarriers increases, so that a sending device can transmit a PPDU at higher transmit power.

According to a first aspect, a method for sending a physical layer protocol data unit is provided. The method may be performed by a sending device, or may be performed by a chip or a circuit configured in a sending device. This is not limited in this application. The method may include: generating a physical layer protocol data unit (PPDU); and sending the PPDU on one or more discrete resource units (RUs), where the discrete RU includes a plurality of subcarriers that are discrete in frequency domain.

According to a second aspect, a method for receiving a physical layer protocol data unit is provided. The method may be performed by a receiving device, or may be performed by a chip or a circuit configured in the receiving device. This is not limited in this application. The method includes: receiving a physical layer protocol data unit (PPDU) on one or more discrete resource units (RUs), where the discrete RU includes a plurality of subcarriers that are discrete in frequency domain; and parsing the PPDU.

According to a third aspect, a resource scheduling method is provided. The method includes:

- generating resource scheduling information based on a plurality of resource units obtained by dividing a to-be-allocated frequency domain resource, where the resource scheduling information includes: resource unit allocation information that indicates one or more resource units, and station information of a station to which the one or more resource units are allocated, the one or more resource units allocated to one station include at least one discrete resource unit RU, and the discrete resource unit includes a plurality of subcarriers that are discrete in frequency domain; and
- sending the resource scheduling information.

According to a fourth aspect, a method for obtaining resource scheduling information is provided. The method includes:

- receiving resource scheduling information, where the resource scheduling information includes: resource unit allocation information that indicates one or more resource units, and station information of a station to which the one or more resource units are allocated, the one or more resource units allocated to one station include at least one discrete resource unit RU, and the discrete resource unit includes a plurality of subcarriers that are discrete in frequency domain.

With reference to the third aspect or the fourth aspect, in some implementations, resource scheduling information in a contiguous RU mode is reused for the resource scheduling information.

With reference to the third aspect or the fourth aspect, in some implementations, that resource scheduling information in a contiguous RU mode is reused for the resource scheduling information specifically means that a value of a resource unit allocation subfield in the contiguous RU mode is reused to indicate a discrete resource unit in a discrete RU mode.

On the basis of the foregoing technical solutions, subcarriers in the discrete RU are discontiguous and are distributed in a larger bandwidth, and transmit power of discretely distributed subcarriers increases, so that a transmit end can transmit the PPDU at higher transmit power.

With reference to the first aspect, the second aspect, the third aspect, or the fourth aspect, in some implementations, in all subcarriers included in a bandwidth per each MHz or per MHz, there are a maximum of M subcarriers that belong to the discrete RU.

That in all subcarriers included in a bandwidth per each MHz or per MHz, there are a maximum of M subcarriers that belong to the discrete RU may also be understood as that in any 12 or 13 contiguous subcarriers, there are a maximum of M subcarriers that belong to the discrete RU.

With reference to the first aspect, the second aspect, the third aspect, or the fourth aspect, in some implementations, M=1, 2, 3, or 4.

With reference to the first aspect, the second aspect, the third aspect, or the fourth aspect, in some implementations, the discrete RU is an X-tone RU, where a value of X is any one or a combination of 13, 26, 52, 106, 242, 484, and 996, and the X-tone RU includes X subcarriers.

With reference to the first aspect, the second aspect, the third aspect, or the fourth aspect, in some implementations, the discrete RU is a 26-tone RU, and the 26-tone RU includes two 13-tone RUs; or the discrete RU is a 52-tone RU, and the 52-tone RU includes two 26-tone RUs; or the discrete RU is a 52+26-tone RU, and the 52+26-tone RU includes one 52-tone RU and one 26-tone RU; or the discrete RU is a 106-tone RU, and the 106-tone RU includes two 52-tone RUs and two null subcarriers; or the discrete RU is a 242-tone RU, and the 242-tone RU includes a plurality of 26-tone RUs.

With reference to the first aspect, the second aspect, the third aspect, or the fourth aspect, in some implementations, the discrete RU is located in a first bandwidth, and the first bandwidth is a multiple of 80 MHz. The each 80 MHz includes 1024 contiguous subcarriers. Indexes of the 1024 contiguous subcarriers start from −512 and end at 511 with a spacing of 1 in ascending order of subcarrier frequencies. Indexes of direct current subcarriers in the 1024 contiguous subcarriers start from $-N_{DC}$ and end at $N_{DC}$ with a spacing of 1, and $N_{DC} \geq 2$.

The each 80 MHz includes 72 13-tone RUs, and subcarrier index ranges corresponding to the 72 13-tone RUs are shown below, where :12: indicates that an index difference between a latter subcarrier and a former subcarrier in two adjacent subcarriers is 12:

- a subcarrier index range corresponding to an RU 1 is $-(492+N_{DC})$:12:$-(348+N_{DC})$,
- a subcarrier index range corresponding to an RU 2 is $-(324+N_{DC})$:12:$-(180+N_{DC})$,
- a subcarrier index range corresponding to an RU 3 is $-(156+N_{DC})$:12:$-(12+N_{DC})$,
- a subcarrier index range corresponding to an RU 4 is $(1+N_{DC})$:12:$(145+N_{DC})$,
- a subcarrier index range corresponding to an RU 5 is $(169+N_{DC})$:12:$(313+N_{DC})$,
- a subcarrier index range corresponding to an RU 6 is $(337+N_{DC})$:12:$(481+N_{DC})$,
- indexes corresponding to 4 null subcarriers that exist between the RU 1 and the RU 6 are: $-(336+N_{DC})$, $-(168+N_{DC})$, $(157+N_{DC})$, and $(325+N_{DC})$,
- a subcarrier index range corresponding to an RU 7 is $-(491+N_{DC})$:12:$-(347+N_{DC})$,
- a subcarrier index range corresponding to an RU 8 is $-(323+N_{DC})$:12:$-(179+N_{DC})$,
- a subcarrier index range corresponding to an RU 9 is $-(155+N_{DC})$:12:$-(11+N_{DC})$,
- a subcarrier index range corresponding to an RU 10 is $(2+N_{DC})$:12:$(146+N_{DC})$,
- a subcarrier index range corresponding to an RU 11 is $(170+N_{DC})$:12:$(314+N_{DC})$,
- a subcarrier index range corresponding to an RU 12 is $(338+N_{DC})$:12:$(482+N_{DC})$,
- indexes corresponding to 4 null subcarriers that exist between the RU 7 and the RU 12
- are: $-(335+N_{DC})$, $-(167+N_{DC})$, $(158+N_{DC})$, and $(326+N_{DC})$,
- a subcarrier index range corresponding to an RU 13 is $-(490+N_{DC})$:12:$-(346+N_{DC})$,
- a subcarrier index range corresponding to an RU 14 is $-(322+N_{DC})$:12:$-(178+N_{DC})$,
- a subcarrier index range corresponding to an RU 15 is $-(154+N_{DC})$:12:$-(10+N_{DC})$,
- a subcarrier index range corresponding to an RU 16 is $(3+N_{DC})$:12:$(147+N_{DC})$,
- a subcarrier index range corresponding to an RU 17 is $(171+N_{DC})$:12:$(315+N_{DC})$,
- a subcarrier index range corresponding to an RU 18 is $(339+N_{DC})$:12:$(483+N_{DC})$,
- indexes corresponding to 4 null subcarriers that exist between the RU 13 and the RU 18 are: $-(334+N_{DC})$, $-(166+N_{DC})$, $(159+N_{DC})$, and $(327+N_{DC})$,
- a subcarrier index range corresponding to an RU 19 is $-(489+N_{DC})$:12:$-(345+N_{DC})$,
- a subcarrier index range corresponding to an RU 20 is $-(321+N_{DC})$:12:$-(178+N_{DC})$,
- a subcarrier index range corresponding to an RU 21 is $-(153+N_{DC})$:12:$-(9+N_{DC})$,
- a subcarrier index range corresponding to an RU 22 is $(4+N_{DC})$:12:$(148+N_{DC})$,
- a subcarrier index range corresponding to an RU 23 is $(172+N_{DC})$:12:$(316+N_{DC})$,
- a subcarrier index range corresponding to an RU 24 is $(340+N_{DC})$:12:$(484+N_{DC})$,
- indexes corresponding to 4 null subcarriers that exist between the RU 19 and the RU 24 are: $-(333+N_{DC})$, $-(165+N_{DC})$, $(160+N_{DC})$, and $(328+N_{DC})$,
- a subcarrier index range corresponding to an RU 25 is $-(488+N_{DC})$:12:$-(344+N_{DC})$,
- a subcarrier index range corresponding to an RU 26 is $-(320+N_{DC})$:12:$-(176+N_{DC})$,
- a subcarrier index range corresponding to an RU 27 is $-(152+N_{DC})$:12:$-(8+N_{DC})$,
- a subcarrier index range corresponding to an RU 28 is $(5+N_{DC})$:12:$(149+N_{DC})$,
- a subcarrier index range corresponding to an RU 29 is $(173+N_{DC})$:12:$(317+N_{DC})$,
- a subcarrier index range corresponding to an RU 30 is $(341+N_{DC})$:12:$(485+N_{DC})$, indexes corresponding to 4 null subcarriers that exist between the RU 25 and the RU are: −(332+$N_{DC}$), −(164+$N_{DC}$), (161+$N_{DC}$), and (329+$N_{DC}$), a subcarrier index range corresponding to an RU 31 is −(487+$N_{DC}$):12:−(343+$N_{DC}$), a subcarrier index range corresponding to an RU 32 is −(319+$N_{DC}$):12:−(175+$N_{DC}$), a subcarrier index range corresponding to an RU 33 is −(151+$N_{DC}$):12:−(7+$N_{DC}$), a subcarrier index range corresponding to an RU 34 is (6+$N_{DC}$):12:(150+$N_{DC}$), a subcarrier index range corresponding to an RU 35 is (174+$N_{DC}$):12:(318+$N_{DC}$), a subcarrier index range corresponding to an RU 36 is (342+$N_{DC}$):12:(486+$N_{DC}$), indexes corresponding to 4 null subcarriers that exist between the RU 31 and the RU 36 are: −(331+$N_{DC}$), −(163+$N_{DC}$), (162+$N_{DC}$), and (330+$N_{DC}$), a subcarrier index range corresponding to an RU 37 is −(486+$N_{DC}$):12:−(342+$N_{DC}$), a subcarrier index range corresponding to an RU 38 is −(318+$N_{DC}$):12:−(174+$N_{DC}$), a subcarrier index range corresponding to an RU 39 is −(150+$N_{DC}$):12:−(6+$N_{DC}$), a subcarrier index range corresponding to an RU 40 is (7+$N_{DC}$):12:(151+$N_{DC}$), a subcarrier index range corresponding to an RU 41 is (175+$N_{DC}$):12:(319+$N_{DC}$), a subcarrier index range corresponding to an RU 42 is (343+$N_{DC}$):12:(487+$N_{DC}$), indexes corresponding to 4 null subcarriers that exist between the RU 37 and the RU 42 are: −(330+$N_{DC}$), −(162+$N_{DC}$), (163+$N_{DC}$), and (331+$N_{DC}$), a subcarrier index range corresponding to an RU 43 is −(485+$N_{DC}$):12:−(341+$N_{DC}$), a subcarrier index range corresponding to an RU 44 is −(317+$N_{DC}$):12:−(173+$N_{DC}$), a subcarrier index range corresponding to an RU 45 is −(149+$N_{DC}$):12:−(5+$N_{DC}$), a subcarrier index range corresponding to an RU 46 is (8+$N_{DC}$):12:(152+$N_{DC}$), a subcarrier index range corresponding to an RU 47 is (176+$N_{DC}$):12:(320+$N_{DC}$), a subcarrier index range corresponding to an RU 48 is (344+$N_{DC}$):12:(488+$N_{DC}$), indexes corresponding to 4 null subcarriers that exist between the RU 43 and the RU 48 are: −(329+$N_{DC}$), −(161+$N_{DC}$), (164+$N_{DC}$), and (332+$N_{DC}$), a subcarrier index range corresponding to an RU 49 is −(484+$N_{DC}$):12:−(340+$N_{DC}$), a subcarrier index range corresponding to an RU 50 is −(316+$N_{DC}$):12:−(172+$N_{DC}$), a subcarrier index range corresponding to an RU 51 is −(148+$N_{DC}$):12:−(4+$N_{DC}$), a subcarrier index range corresponding to an RU 52 is (9+$N_{DC}$):12:(153+$N_{DC}$), a subcarrier index range corresponding to an RU 53 is (177+$N_{DC}$):12:(321+$N_{DC}$), a subcarrier index range corresponding to an RU 54 is (345+$N_{DC}$):12:(489+$N_{DC}$), indexes corresponding to 4 null subcarriers that exist between the RU 49 and the RU 54 are: −(328+$N_{DC}$), −(160+$N_{DC}$), (165+$N_{DC}$), and (333+$N_{DC}$), a subcarrier index range corresponding to an RU 55 is −(483+$N_{DC}$):12:−(339+$N_{DC}$), a subcarrier index range corresponding to an RU 56 is −(315+$N_{DC}$):12:−(171+$N_{DC}$), a subcarrier index range corresponding to an RU 57 is −(147+$N_{DC}$):12:−(3+$N_{DC}$), a subcarrier index range corresponding to an RU 58 is (10+$N_{DC}$):12:(154+$N_{DC}$), a subcarrier index range corresponding to an RU 59 is (178+$N_{DC}$):12:(322+$N_{DC}$), a subcarrier index range corresponding to an RU 60 is (346+$N_{DC}$):12:(490+$N_{DC}$), indexes corresponding to 4 null subcarriers that exist between the RU 55 and the RU 60 are: −(327+$N_{DC}$), −(159+$N_{DC}$), (166+$N_{DC}$), and (334+$N_{DC}$), a subcarrier index range corresponding to an RU 61 is −(482+$N_{DC}$):12:−(338+$N_{DC}$), a subcarrier index range corresponding to an RU 62 is −(314+$N_{DC}$):12:−(170+$N_{DC}$), a subcarrier index range corresponding to an RU 63 is −(146+$N_{DC}$):12:−(2+$N_{DC}$), a subcarrier index range corresponding to an RU 64 is (11+$N_{DC}$):12:(155+$N_{DC}$), a subcarrier index range corresponding to an RU 65 is (179+$N_{DC}$):12:(323+$N_{DC}$), a subcarrier index range corresponding to an RU 66 is (347+$N_{DC}$):12:(491+$N_{DC}$), indexes corresponding to 4 null subcarriers that exist between the RU 61 and the RU 66 are: −(326+$N_{DC}$), −(158+$N_{DC}$), (167+$N_{DC}$), and (335+$N_{DC}$), a subcarrier index range corresponding to an RU 67 is −(481+$N_{DC}$):12:−(337+$N_{DC}$), a subcarrier index range corresponding to an RU 68 is −(313+$N_{DC}$):12:−(169+$N_{DC}$), a subcarrier index range corresponding to an RU 69 is −(145+$N_{DC}$):12:−(1+$N_{DC}$), a subcarrier index range corresponding to an RU 70 is (12+$N_{DC}$):12:(156+$N_{DC}$), a subcarrier index range corresponding to an RU 71 is (180+$N_{DC}$):12:(324+$N_{DC}$), a subcarrier index range corresponding to an RU 72 is (348+$N_{DC}$):12:(492+$N_{DC}$), and indexes corresponding to 4 null subcarriers that exist between the RU 67 and the RU 72 are: −(325+$N_{DC}$), −(157+$N_{DC}$), (168+$N_{DC}$), and (336+$N_{DC}$) ; or an 80 MHz bandwidth includes 36 26-tone RUs, and subcarrier index ranges corresponding to the 36 26-tone RUs are shown below, where :12: indicates that an index difference between a latter subcarrier and a former subcarrier in two adjacent subcarriers is 12:

subcarrier index ranges corresponding to an RU 1 are −(492+$N_{DC}$):12:−(348+$N_{DC}$) and (324+$N_{DC}$):12:−(180+$N_{DC}$), subcarrier index ranges corresponding to an RU 2 are −(156+$N_{DC}$):12:−(12+$N_{DC}$) and (1+$N_{DC}$):12:(145+$N_{DC}$), subcarrier index ranges corresponding to an RU 3 are (169+$N_{DC}$):12:(313+$N_{DC}$) and (337+$N_{DC}$):12:(481+$N_{DC}$), indexes corresponding to 4 null subcarriers that exist in the RU 1 to the RU 3 are: −(336+$N_{DC}$), −(168+$N_{DC}$), (157+$N_{DC}$), and (325+$N_{DC}$), subcarrier index ranges corresponding to an RU 4 are −(491+$N_{DC}$):12:−(347+$N_{DC}$) and −(323+$N_{DC}$):12:−(179+$N_{DC}$), subcarrier index ranges corresponding to an RU 5 are −(155+$N_{DC}$):12:−(11+$N_{DC}$) and (2+$N_{DC}$):12:(146+$N_{DC}$), subcarrier index ranges corresponding to an RU 6 are (170+$N_{DC}$):12:(314+$N_{DC}$) and (338+$N_{DC}$):12:(482+$N_{DC}$), indexes corresponding to 4 null subcarriers that exist in the RU 1 to the RU 3 are: $-(335+N_{DC})$, $-(167+N_{DC})$, $(158+N_{DC})$, and $(326+N_{DC})$, subcarrier index ranges corresponding to an RU 7 are $-(490+N_{DC})$:12:$-(346+N_{DC})$ and $-(322+N_{DC})$:12:$-(178+N_{DC})$, subcarrier index ranges corresponding to an RU 8 are $-(154+N_{DC})$:12:$-(10+N_{DC})$ and $(3+N_{DC})$:12:$(147+N_{DC})$, subcarrier index ranges corresponding to an RU 9 are $(171+N_{DC})$:12:$(315+N_{DC})$ and $(339+N_{DC})$:12:$(483+N_{DC})$, indexes corresponding to 4 null subcarriers that exist in the RU 7 to the RU 9 are: $-(334+N_{DC})$, $-(166+N_{DC})$, $(159+N_{DC})$, and $(327+N_{DC})$, subcarrier index ranges corresponding to an RU 10 are $-(489+N_{DC})$:12:$-(345+N_{DC})$ and $-(321+N_{DC})$:12:$-(178+N_{DC})$, subcarrier index ranges corresponding to an RU 11 are $-(153+N_{DC})$:12:$-(9+N_{DC})$ and $(4+N_{DC})$:12:$(148+N_{DC})$, subcarrier index ranges corresponding to an RU 12 are $(172+N_{DC})$:12:$(316+N_{DC})$ and $(340+N_{DC})$:12:$(484+N_{DC})$, indexes corresponding to 4 null subcarriers that exist in the RU 10 to the RU 12 are: $-(333+N_{DC})$, $-(165+N_{DC})$, $(160+N_{DC})$, and $(328+N_{DC})$, subcarrier index ranges corresponding to an RU 13 are $-(488+N_{DC})$:12:$-(344+N_{DC})$ and $-(320+N_{DC})$:12:$-(176+N_{DC})$, subcarrier index ranges corresponding to an RU 14 are $-(152+N_{DC})$:12:$-(8+N_{DC})$ and $(5+N_{DC})$:12:$(149+N_{DC})$, subcarrier index ranges corresponding to an RU 15 are $(173+N_{DC})$:12:$(317+N_{DC})$ and $(341+N_{DC})$:12:$(485+N_{DC})$, indexes corresponding to 4 null subcarriers that exist in the RU 13 to the RU 15 are: $-(332+N_{DC})$, $-(164+N_{DC})$, $(161+N_{DC})$, and $(329+N_{DC})$, subcarrier index ranges corresponding to an RU 16 are $-(487+N_{DC})$:12:$-(343+N_{DC})$ and $-(319+N_{DC})$:12:$-(175+N_{DC})$, subcarrier index ranges corresponding to an RU 17 are $-(151+N_{DC})$:12:$-(7+N_{DC})$ and $(6+N_{DC})$:12:$(150+N_{DC})$, subcarrier index ranges corresponding to an RU 18 are $(174+N_{DC})$:12:$(318+N_{DC})$ and $(342+N_{DC})$:12:$(486+N_{DC})$, indexes corresponding to 4 null subcarriers that exist in the RU 16 to the RU 18 are: $-(331+N_{DC})$, $-(163+N_{DC})$, $(162+N_{DC})$, and $(330+N_{DC})$, subcarrier index ranges corresponding to an RU 19 are $-(486+N_{DC})$:12:$-(342+N_{DC})$ and $-(318+N_{DC})$:12:$-(174+N_{DC})$, subcarrier index ranges corresponding to an RU 20 are $-(150+N_{DC})$:12:$-(6+N_{DC})$ and $(7+N_{DC})$:12:$(151+N_{DC})$, subcarrier index ranges corresponding to an RU 21 are $(175+N_{DC})$:12:$(319+N_{DC})$ and $(343+N_{DC})$:12:$(487+N_{DC})$, indexes corresponding to 4 null subcarriers that exist in the RU 19 to the RU 21 are: $-(330+N_{DC})$, $-(162+N_{DC})$, $(163+N_{DC})$, and $(331+N_{DC})$, subcarrier index ranges corresponding to an RU 22 are $-(485+N_{DC})$:12:$-(341+N_{DC})$ and $-(317+N_{DC})$:12:$-(173+N_{DC})$, subcarrier index ranges corresponding to an RU 23 are $-(149+N_{DC})$:12:$-(5+N_{DC})$ and $(8+N_{DC})$:12:$(152+N_{DC})$, subcarrier index ranges corresponding to an RU 24 are $(176+N_{DC})$:12:$(320+N_{DC})$ and $(344+N_{DC})$:12:$(488+N_{DC})$, indexes corresponding to 4 null subcarriers that exist in the RU 22 to the RU 24 are: $-(329+N_{DC})$, $-(161+N_{DC})$, $(164+N_{DC})$, and $(332+N_{DC})$, subcarrier index ranges corresponding to an RU 25 are $-(484+N_{DC})$:12:$-(340+N_{DC})$ and $-(316+N_{DC})$:12:$-(172+N_{DC})$, subcarrier index ranges corresponding to an RU 26 are $-(148+N_{DC})$:12:$-(4+N_{DC})$ and $(9+N_{DC})$:12:$(153+N_{DC})$, subcarrier index ranges corresponding to an RU 27 are $(177+N_{DC})$:12:$(321+N_{DC})$ and $(345+N_{DC})$:12:$(489+N_{DC})$, indexes corresponding to 4 null subcarriers that exist in the RU 25 to the RU 27 are: $-(328+N_{DC})$, $-(160+N_{DC})$, $(165+N_{DC})$, and $(333+N_{DC})$, subcarrier index ranges corresponding to an RU 28 are $-(483+N_{DC})$:12:$-(339+N_{DC})$ and $-(315+N_{DC})$:12:$-(171+N_{DC})$, subcarrier index ranges corresponding to an RU 29 are $-(147+N_{DC})$:12:$-(3+N_{DC})$ and $(10+N_{DC})$:12:$(154+N_{DC})$, subcarrier index ranges corresponding to an RU 30 are $(178+N_{DC})$:12:$(322+N_{DC})$ and $(346+N_{DC})$:12:$(490+N_{DC})$, indexes corresponding to 4 null subcarriers that exist in the RU 28 to the RU 30 are: $-(327+N_{DC})$, $-(159+N_{DC})$, $(166+N_{DC})$, and $(334+N_{DC})$, subcarrier index ranges corresponding to an RU 31 are $-(482+N_{DC})$:12:$-(338+N_{DC})$ and $-(314+N_{DC})$:12:$-(170+N_{DC})$, subcarrier index ranges corresponding to an RU 32 are $-(146+N_{DC})$:12:$-(2+N_{DC})$ and $(11+N_{DC})$:12:$(155+N_{DC})$, subcarrier index ranges corresponding to an RU 33 are $(179+N_{DC})$:12:$(323+N_{DC})$ and $(347+N_{DC})$:12:$(491+N_{DC})$, indexes corresponding to 4 null subcarriers that exist in the RU 31 to the RU 33 are: $-(326+N_{DC})$, $-(158+N_{DC})$, $(167+N_{DC})$, and $(335+N_{DC})$, subcarrier index ranges corresponding to an RU 34 are $-(481+N_{DC})$:12:$-(337+N_{DC})$ and $-(313+N_{DC})$:12:$-(169+N_{DC})$, subcarrier index ranges corresponding to an RU 35 are $-(145+N_{DC})$:12:$-(1+N_{DC})$ and $(12+N_{DC})$:12:$(156+N_{DC})$, subcarrier index ranges corresponding to an RU 36 are $(180+N_{DC})$:12:$(324+N_{DC})$ and $(348+N_{DC})$:12:$(492+N_{DC})$, and indexes corresponding to 4 null subcarriers that exist in the RU 34 to the RU 36 are: $-(325+N_{DC})$, $-(157+N_{DC})$, $(168+N_{DC})$, and $(336+N_{DC})$; or an 80 MHz bandwidth includes 24 52-tone RUs, and subcarrier index ranges corresponding to the 24 52-tone RUs are shown below, where :12: indicates that an index difference between a latter subcarrier and a former subcarrier in two adjacent subcarriers is 12:

subcarrier index ranges corresponding to an RU 1 are $-(492+N_{DC})$:12:$-(348+N_{DC})$, $-(324+N_{DC})$:12:$-(180+N_{DC})$, $-(156+N_{DC})$:12:$-(12+N_{DC})$, and $(1+N_{DC})$:12:$(145+N_{DC})$, indexes corresponding to 2 null subcarriers that exist in the RU 1 are: $-(336+N_{DC})$ and $-(168+N_{DC})$, subcarrier index ranges corresponding to an RU 2 are $-(491+N_{DC}):12:-(347+N_{DC})$, $-(323+N_{DC}):12:-(179+N_{DC})$, $-(155+N_{DC}):12:-(11+N_{DC})$, and $(2+N_{DC}):12:(146+N_{DC})$, indexes corresponding to 2 null subcarriers that exist in the RU 2 are: $-(335+N_{DC})$ and $-(167+N_{DC})$, subcarrier index ranges corresponding to an RU 3 are $-(490+N_{DC}):12:-(346+N_{DC})$, $-(322+N_{DC}):12:-(178+N_{DC})$, $-(154+N_{DC}):12:-(10+N_{DC})$, and $(3+N_{DC}):12:(147+N_{DC})$, indexes corresponding to 2 null subcarriers that exist in the RU 3 are: $-(334+N_{DC})$ and $-(166+N_{DC})$, subcarrier index ranges corresponding to an RU 4 are $-(489+N_{DC}):12:-(345+N_{DC})$, $-(321+N_{DC}):12:-(178+N_{DC})$, $-(153+N_{DC}):12:-(9+N_{DC})$, and $(4+N_{DC}):12:(148+N_{DC})$, indexes corresponding to 2 null subcarriers that exist in the RU 4 are: $-(333+N_{DC})$ and $-(165+N_{DC})$, subcarrier index ranges corresponding to an RU 5 are $-(488+N_{DC}):12:-(344+N_{DC})$, $-(320+N_{DC}):12:-(176+N_{DC})$, $-(152+N_{DC}):12:-(8+N_{DC})$, and $(5+N_{DC}):12:(149+N_{DC})$, indexes corresponding to 2 null subcarriers that exist in the RU 5 are: $-(332+N_{DC})$ and $-(164+N_{DC})$, subcarrier index ranges corresponding to an RU 6 are $-(487+N_{DC}):12:-(343+N_{DC})$, $-(319+N_{DC}):12:-(175+N_{DC})$, $-(151+N_{DC}):12:-(7+N_{DC})$, and $(6+N_{DC}):12:(150+N_{DC})$, indexes corresponding to 2 null subcarriers that exist in the RU 6 are: $-(331+N_{DC})$ and $-(163+N_{DC})$, subcarrier index ranges corresponding to an RU 7 are $-(486+N_{DC}):12:-(342+N_{DC})$, $-(318+N_{DC}):12:-(174+N_{DC})$, $-(150+N_{DC}):12:-(6+N_{DC})$, and $(7+N_{DC}):12:(151+N_{DC})$, indexes corresponding to 2 null subcarriers that exist in the RU 7 are: $-(330+N_{DC})$ and $-(162+N_{DC})$, subcarrier index ranges corresponding to an RU 8 are $-(485+N_{DC}):12:-(341+N_{DC})$, $-(317+N_{DC}):12:-(173+N_{DC})$, $-(149+N_{DC}):12:-(5+N_{DC})$, and $(8+N_{DC}):12:(152+N_{DC})$, indexes corresponding to 2 null subcarriers that exist in the RU 8 are: $-(329+N_{DC})$ and $-(161+N_{DC})$, subcarrier index ranges corresponding to an RU 9 are $-(484+N_{DC}):12:-(340+N_{DC})$, $-(316+N_{DC}):12:-(172+N_{DC})$, $-(148+N_{DC}):12:-(4+N_{DC})$, and $(9+N_{DC}):12:(153+N_{DC})$, indexes corresponding to 2 null subcarriers that exist in the RU 9 are: $-(328+N_{DC})$ and $-(160+N_{DC})$, subcarrier index ranges corresponding to an RU 10 are $-(483+N_{DC}):12:-(339+N_{DC})$, $-(315+N_{DC}):12:-(171+N_{DC})$, $-(147+N_{DC}):12:-(3+N_{DC})$, and $(10+N_{DC}):12:(154+N_{DC})$, indexes corresponding to 2 null subcarriers that exist in the RU 10 are: $-(327+N_{DC})$ and $-(159+N_{DC})$, subcarrier index ranges corresponding to an RU 11 are $-(482+N_{DC}):12:-(338+N_{DC})$, $-(314+N_{DC}):12:-(170+N_{DC})$, $-(146+N_{DC}):12:-(2+N_{DC})$, and $(11+N_{DC}):12:(155+N_{DC})$, indexes corresponding to 2 null subcarriers that exist in the RU 11 are: $-(326+N_{DC})$ and $-(158+N_{DC})$, subcarrier index ranges corresponding to an RU 12 are $-(481+N_{DC}):12:-(337+N_{DC})$, $-(313+N_{DC}):12:-(169+N_{DC})$, $-(145+N_{DC}):12:-(1+N_{DC})$, and $(12+N_{DC}):12:(156+N_{DC})$, indexes corresponding to 2 null subcarriers that exist in the RU 12 are: $-(325+N_{DC})$ and $-(157+N_{DC})$, subcarrier index ranges corresponding to an RU 13 are $-(156+N_{DC}):12:-(12+N_{DC})$, $(1+N_{DC}):12:(145+N_{DC})$, $(169+N_{DC}):12:(313+N_{DC})$, and $(337+N_{DC}):12:(481+N_{DC})$, indexes corresponding to 2 null subcarriers that exist in the RU 13 are: $(157+N_{DC})$ and $(325+N_{DC})$, subcarrier index ranges corresponding to an RU 14 are $-(155+N_{DC}):12:-(11+N_{DC})$, $(2+N_{DC}):12:(146+N_{DC})$, $(170+N_{DC}):12:(314+N_{DC})$, and $(338+N_{DC}):12:(482+N_{DC})$, indexes corresponding to 2 null subcarriers that exist in the RU 14 are: $(158+N_{DC})$ and $(326+N_{DC})$, subcarrier index ranges corresponding to an RU 15 are $-(154+N_{DC}):12:-(10+N_{DC})$, $(3+N_{DC}):12:(147+N_{DC})$, $(171+N_{DC}):12:(315+N_{DC})$, and $(339+N_{DC}):12:(483+N_{DC})$, indexes corresponding to 2 null subcarriers that exist in the RU 15 are: $(159+N_{DC})$ and $(327+N_{DC})$, subcarrier index ranges corresponding to an RU 16 are $-(153+N_{DC}):12:-(9+N_{DC})$, $(4+N_{DC}):12:(148+N_{DC})$, $(172+N_{DC}):12:(316+N_{DC})$, and $(340+N_{DC}):12:(484+N_{DC})$, indexes corresponding to 2 null subcarriers that exist in the RU 16 are: $(160+N_{DC})$ and $(328+N_{DC})$, subcarrier index ranges corresponding to an RU 17 are $-(152+N_{DC}):12:-(8+N_{DC})$, $(5+N_{DC}):12:(149+N_{DC})$, $(173+N_{DC}):12:(317+N_{DC})$, and $(341+N_{DC}):12:(485+N_{DC})$, indexes corresponding to 2 null subcarriers that exist in the RU 17 are: $(161+N_{DC})$ and $(329+N_{DC})$, subcarrier index ranges corresponding to an RU 18 are $-(151+N_{DC}):12:-(7+N_{DC})$, $(6+N_{DC}):12:(150+N_{DC})$, $(174+N_{DC}):12:(318+N_{DC})$, and $(342+N_{DC}):12:(486+N_{DC})$, indexes corresponding to 2 null subcarriers that exist in the RU 18 are: $(162+N_{DC})$ and $(330+N_{DC})$, subcarrier index ranges corresponding to an RU 19 are $-(150+N_{DC}):12:-(6+N_{DC})$, $(7+N_{DC}):12:(151+N_{DC})$, $(175+N_{DC}):12:(319+N_{DC})$, and $(343+N_{DC}):12:(487+N_{DC})$, indexes corresponding to 2 null subcarriers that exist in the RU 19 are: $(163+N_{DC})$ and $(331+N_{DC})$, subcarrier index ranges corresponding to an RU 20 are $-(149+N_{DC}):12:-(5+N_{DC})$, $(8+N_{DC}):12:(152+N_{DC})$, $(176+N_{DC}):12:(320+N_{DC})$, and $(344+N_{DC}):12:(488+N_{DC})$, indexes corresponding to 2 null subcarriers that exist in the RU 20 are: $(164+N_{DC})$ and $(332+N_{DC})$, subcarrier index ranges corresponding to an RU 21 are $-(148+N_{DC}):12:-(4+N_{DC})$, $(9+N_{DC}):12:(153+N_{DC})$, $(177+N_{DC}):12:(321+N_{DC})$, and $(345+N_{DC}):12:(489+N_{DC})$, indexes corresponding to 2 null subcarriers that exist in the RU 21 are: $(165+N_{DC})$ and $(333+N_{DC})$, subcarrier index ranges corresponding to an RU 22 are $-(147+N_{DC}):12:-(3+N_{DC})$, $(10+N_{DC}):12:(154+N_{DC})$, $(178+N_{DC}):12:(322+N_{DC})$, and $(346+N_{DC}):12:(490+N_{DC})$, indexes corresponding to 2 null subcarriers that exist in the RU 22 are: $(166+N_{DC})$ and $(334+N_{DC})$, subcarrier index ranges corresponding to an RU 23 are $-(146+N_{DC}):12:-(2+N_{DC})$, $(11+N_{DC}):12:(155+N_{DC})$, $(179+N_{DC}):12:(323+N_{DC})$, and $(347+N_{DC}):12:(491+N_{DC})$, indexes corresponding to 2 null subcarriers that exist in the RU 23 are: (167+$N_{DC}$) and (335+$N_{DC}$), subcarrier index ranges corresponding to an RU 24 are −(145+$N_{DC}$):12:−(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 2 null subcarriers that exist in the RU 24 are: (168+$N_{DC}$) and (336+$N_{DC}$); or an 80 MHz bandwidth includes 12 52+26-tone RUs, and subcarrier index ranges corresponding to the 12 52+26-tone RUs are shown below, where :12: indicates that an index difference between a latter subcarrier and a former subcarrier in two adjacent subcarriers is 12:

subcarrier index ranges corresponding to an RU 1 are −(492+$N_{DC}$):12:−(348+$N_{DC}$), −(324+$N_{DC}$):12:−(180+$N_{DC}$), (156+$N_{DC}$):12:−(12+$N_{DC}$), (1+$N_{DC}$):12:(145+$N_{DC}$), (169+$N_{DC}$):12:(313+$N_{DC}$), and (337+$N_{DC}$):12:(481+$N_{DC}$), indexes corresponding to 4 null subcarriers that exist in the RU 1 are: −(336+$N_{DC}$), −(168+$N_{DC}$), (157+$N_{DC}$), and (325+$N_{DC}$), subcarrier index ranges corresponding to an RU 2 are −(491+$N_{DC}$):12:−(347+$N_{DC}$), −(323+$N_{DC}$):12:−(179+$N_{DC}$), (155+$N_{DC}$):12:−(11+$N_{DC}$), (2+$N_{DC}$):12:(146+$N_{DC}$), (170+$N_{DC}$):12:(314+$N_{DC}$), and (338+$N_{DC}$):12:(482+$N_{DC}$), indexes corresponding to 4 null subcarriers that exist in the RU 2 are: −(335+$N_{DC}$), −(167+$N_{DC}$), (158+$N_{DC}$), and (326+$N_{DC}$), subcarrier index ranges corresponding to an RU 3 are −(490+$N_{DC}$):12:−(346+$N_{DC}$), −(322+$N_{DC}$):12:−(178+$N_{DC}$), −(154+$N_{DC}$):12:−(10+$N_{DC}$), (3+$N_{DC}$):12:(147+$N_{DC}$), (171+$N_{DC}$):12:(315+$N_{DC}$), and (339+$N_{DC}$):12:(483+$N_{DC}$), indexes corresponding to 4 null subcarriers that exist in the RU 3 are: −(334+$N_{DC}$), −(166+$N_{DC}$), (159+$N_{DC}$), and (327+$N_{DC}$), subcarrier index ranges corresponding to an RU 4 are −(489+$N_{DC}$):12:−(345+$N_{DC}$), −(321+$N_{DC}$):12:−(178+$N_{DC}$), (153+$N_{DC}$):12:−(9+$N_{DC}$), (4+$N_{DC}$):12:(148+$N_{DC}$), (172+$N_{DC}$):12:(316+$N_{DC}$), and (340+$N_{DC}$):12:(484+$N_{DC}$), indexes corresponding to 4 null subcarriers that exist in the RU 4 comprises: −(333+$N_{DC}$) and −(165+$N_{DC}$), subcarrier index ranges corresponding to an RU 5 are −(488+$N_{DC}$):12:−(344+$N_{DC}$), −(320+$N_{DC}$):12:−(176+$N_{DC}$), −(152+$N_{DC}$):12:−(8+$N_{DC}$), and (5+$N_{DC}$):12:(149+$N_{DC}$), indexes corresponding to 4 null subcarriers that exist in the RU 5 are: −(333+$N_{DC}$), −(165+$N_{DC}$), (160+$N_{DC}$), and (328+$N_{DC}$), subcarrier index ranges corresponding to an RU 6 are −(487+$N_{DC}$):12:−(343+$N_{DC}$), −(319+$N_{DC}$):12:−(175+$N_{DC}$), (151+$N_{DC}$):12:−(7+$N_{DC}$), (6+$N_{DC}$):12:(150+$N_{DC}$), (174+$N_{DC}$):12:(318+$N_{DC}$), and (342+$N_{DC}$):12:(486+$N_{DC}$), indexes corresponding to 4 null subcarriers that exist in the RU 6 are: −(331+$N_{DC}$), −(163+$N_{DC}$), (162+$N_{DC}$), and (330+$N_{DC}$), subcarrier index ranges corresponding to an RU 7 are −(486+$N_{DC}$):12:−(342+$N_{DC}$), −(318+$N_{DC}$):12:−(174+$N_{DC}$), (150+$N_{DC}$):12:−(6+$N_{DC}$), (7+$N_{DC}$):12:(151+$N_{DC}$), (175+$N_{DC}$):12:(319+$N_{DC}$), and (343+$N_{DC}$):12:(487+$N_{DC}$), indexes corresponding to 4 null subcarriers that exist in the RU 7 are: −(330+$N_{DC}$), −(162+$N_{DC}$), (163+$N_{DC}$), and (331+$N_{DC}$), subcarrier index ranges corresponding to an RU 8 are −(485+$N_{DC}$):12:−(341+$N_{DC}$), −(317+$N_{DC}$):12:−(173+$N_{DC}$), −(149+$N_{DC}$):12:−(5+$N_{DC}$), (8+$N_{DC}$):12:(152+$N_{DC}$), (176+$N_{DC}$):12:(320+$N_{DC}$), and (344+$N_{DC}$):12:(488+$N_{DC}$), indexes corresponding to 4 null subcarriers that exist in the RU 8 are: −(329+$N_{DC}$), −(161+$N_{DC}$), (164+$N_{DC}$), and (332+$N_{DC}$), subcarrier index ranges corresponding to an RU 9 are −(484+$N_{DC}$):12:−(340+$N_{DC}$), −(316+$N_{DC}$):12:−(172+$N_{DC}$), (148+$N_{DC}$):12:−(4+$N_{DC}$), (9+$N_{DC}$):12:(153+$N_{DC}$), (177+$N_{DC}$):12:(321+$N_{DC}$), and (345+$N_{DC}$):12:(489+$N_{DC}$), indexes corresponding to 4 null subcarriers that exist in the RU 9 are: −(328+$N_{DC}$), −(160+$N_{DC}$), (165+$N_{DC}$), and (333+$N_{DC}$), subcarrier index ranges corresponding to an RU 10 are −(483+$N_{DC}$):12:−(339+$N_{DC}$), −(315+$N_{DC}$):12:−(171+$N_{DC}$), −(147+$N_{DC}$):12:−(3+$N_{DC}$), (10+$N_{DC}$):12:(154+$N_{DC}$), (178+$N_{DC}$):12:(322+$N_{DC}$), and (346+$N_{DC}$):12:(490+$N_{DC}$), indexes corresponding to 4 null subcarriers that exist in the RU 10 are: −(327+$N_{DC}$), −(159+$N_{DC}$), (166+$N_{DC}$), and (334+$N_{DC}$), subcarrier index ranges corresponding to an RU 11 are −(482+$N_{DC}$):12:−(338+$N_{DC}$), −(314+$N_{DC}$):12:−(170+$N_{DC}$), −(146+$N_{DC}$):12:−(2+$N_{DC}$), (11+$N_{DC}$):12:(155+$N_{DC}$), (179+$N_{DC}$):12:(323+$N_{DC}$), and (347+$N_{DC}$):12:(491+$N_{DC}$), indexes corresponding to 4 null subcarriers that exist in the RU 11 are: −(326+$N_{DC}$), −(158+$N_{DC}$), (167+$N_{DC}$), and (335+$N_{DC}$), subcarrier index ranges corresponding to an RU 12 are −(481+$N_{DC}$):12:−(337+$N_{DC}$), −(313+$N_{DC}$):12:−(169+$N_{DC}$), −(145+$N_{DC}$):12:−(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 4 null subcarriers that exist in the RU 12 are: −(325+$N_{DC}$), −(157+$N_{DC}$), (168+$N_{DC}$), and (336+$N_{DC}$); or an 80 MHz bandwidth includes 12 106-tone RUs, and subcarrier index ranges corresponding to the 12 106-tone RUs are shown below, where :12: indicates that an index difference between a latter subcarrier and a former subcarrier in two adjacent subcarriers is 12:

subcarrier index ranges corresponding to an RU 1 are −(492+$N_{DC}$):12:−(12+$N_{DC}$), (1+$N_{DC}$):12:(145+$N_{DC}$), −(491+$N_{DC}$):12:−(347+$N_{DC}$), −(323+$N_{DC}$):12:−(179+$N_{DC}$), −(155+$N_{DC}$):12:−(11+$N_{DC}$), and (2+$N_{DC}$):12:(146+$N_{DC}$), indexes corresponding to 2 null subcarriers that exist in the RU 1 are: −(335+$N_{DC}$) and −(167+$N_{DC}$), subcarrier index ranges corresponding to an RU 2 are −(490+$N_{DC}$):12:−(10+$N_{DC}$), (3+$N_{DC}$):12:(147+$N_{DC}$), −(489+$N_{DC}$):12:−(345+$N_{DC}$), −(321+$N_{DC}$):12:−(178+$N_{DC}$), −(153+$N_{DC}$):12:−(9+$N_{DC}$), and (4+$N_{DC}$):12:(148+$N_{DC}$), indexes corresponding to 2 null subcarriers that exist in the RU 2 are: −(333+$N_{DC}$) and −(165+$N_{DC}$), subcarrier index ranges corresponding to an RU 3 are −(488+$N_{DC}$):12:−(8+$N_{DC}$), (5+$N_{DC}$):12:(149+$N_{DC}$), −(487+$N_{DC}$):12:−(343+$N_{DC}$), −(319+$N_{DC}$):12:−(175+$N_{DC}$), −(151+$N_{DC}$):12:−(7+$N_{DC}$), and (6+$N_{DC}$):12:(150+$N_{DC}$), indexes corresponding to 2 null subcarriers that exist in the RU 3 are: −(331+$N_{DC}$) and −(163+$N_{DC}$), subcarrier index ranges corresponding to an RU 4 are −(486+$N_{DC}$):12:−(6+$N_{DC}$), (7+$N_{DC}$):12:(151+$N_{DC}$), −(485+$N_{DC}$):12:−(341+$N_{DC}$), −(317+$N_{DC}$):12:−(173+$N_{DC}$), −(149+$N_{DC}$):12:−(5+$N_{DC}$), and (8+$N_{DC}$):12:(152+$N_{DC}$), indexes corresponding to 2 null subcarriers that exist in the RU 4 are: −(329+$N_{DC}$) and −(161+$N_{DC}$), subcarrier index ranges corresponding to an RU 5 are −(484+$N_{DC}$):12:−(4+$N_{DC}$), (9+$N_{DC}$):12:(153+$N_{DC}$), −(483+$N_{DC}$):12:−(339+$N_{DC}$), −(315+$N_{DC}$):12:−(171+$N_{DC}$), −(147+$N_{DC}$):12:−(3+$N_{DC}$), and (10+$N_{DC}$):12:(154+$N_{DC}$), indexes corresponding to 2 null subcarriers that exist in the RU 5 are: −(327+$N_{DC}$) and −(159+$N_{DC}$), subcarrier index ranges corresponding to an RU 6 are −(482+$N_{DC}$):12:−(2+$N_{DC}$), (11+$N_{DC}$):12:(155+$N_{DC}$), −(481+$N_{DC}$):12:−(337+$N_{DC}$), −(313+$N_{DC}$):12:−(169+$N_{DC}$), −(145+$N_{DC}$):12:−(1+$N_{DC}$), and (12+$N_{DC}$):12:(156+$N_{DC}$), indexes corresponding to 2 null subcarriers that exist in the RU 6 are: −(325+$N_{DC}$) and −(157+$N_{DC}$), subcarrier index ranges corresponding to an RU 7 are −(156+$N_{DC}$):12:−(12+$N_{DC}$), (1+$N_{DC}$):12:(481+$N_{DC}$),−(155+$N_{DC}$):12:−(11+$N_{DC}$), (2+$N_{DC}$):12:(146+$N_{DC}$), (170+$N_{DC}$):12:(314+$N_{DC}$), and (338+$N_{DC}$):12:(482+$N_{DC}$), indexes corresponding to 2 null subcarriers that exist in the RU 7 are: (158+$N_{DC}$) and (326+$N_{DC}$), subcarrier index ranges corresponding to an RU 8 are −(154+$N_{DC}$):12:−(10+$N_{DC}$), (3+$N_{DC}$):12:(483+$N_{DC}$), −(153+$N_{DC}$):12:−(9+$N_{DC}$), (4+$N_{DC}$):12:(148+$N_{DC}$), (172+$N_{DC}$):12:(316+$N_{DC}$), and (340+$N_{DC}$):12:(484+$N_{DC}$), indexes corresponding to 2 null subcarriers that exist in the RU 8 are: (160+$N_{DC}$) and (328+$N_{DC}$), subcarrier index ranges corresponding to an RU 9 are −(152+$N_{DC}$):12:−(8+$N_{DC}$), (5+$N_{DC}$):12:(485+$N_{DC}$), (151+$N_{DC}$):12:−(7+$N_{DC}$), (6+$N_{DC}$):12:(150+$N_{DC}$), (174+$N_{DC}$):12:(318+$N_{DC}$), and (342+$N_{DC}$):12:(486+$N_{DC}$), indexes corresponding to 2 null subcarriers that exist in the RU 9 are: (162+$N_{DC}$) and (330+$N_{DC}$), subcarrier index ranges corresponding to an RU 10 are −(150+$N_{DC}$):12:−(6+$N_{DC}$), (7+$N_{DC}$):12:(487+$N_{DC}$), (149+$N_{DC}$):12:−(5+$N_{DC}$), (8+$N_{DC}$):12:(152+$N_{DC}$), (176+$N_{DC}$):12:(320+$N_{DC}$), and (344+$N_{DC}$):12:(488+$N_{DC}$), indexes corresponding to 2 null subcarriers that exist in the RU 10 are: (164+$N_{DC}$) and (332+$N_{DC}$), subcarrier index ranges corresponding to an RU 11 are −(148+$N_{DC}$):12:−(4+$N_{DC}$), (9+$N_{DC}$):12:(489+$N_{DC}$), (147+$N_{DC}$):12:−(3+$N_{DC}$), (10+$N_{DC}$):12:(154+$N_{DC}$), (178+$N_{DC}$):12:(322+$N_{DC}$), and (346+$N_{DC}$):12:(490+$N_{DC}$), indexes corresponding to 2 null subcarriers that exist in the RU 11 are: (166+$N_{DC}$) and (334+$N_{DC}$), subcarrier index ranges corresponding to an RU 12 are −(146+$N_{DC}$):12:−(2+$N_{DC}$), (11+$N_{DC}$):12:(491+$N_{DC}$), (145+$N_{DC}$):12:−(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 2 null subcarriers that exist in the RU 12 are: (168+$N_{DC}$) and (336+$N_{DC}$); or an 80 MHz bandwidth includes 4 242-tone RUs, and subcarrier index ranges corresponding to the 4 242-tone RUs are shown below, where :12: indicates that an index difference between a latter subcarrier and a former subcarrier in two adjacent subcarriers is 12:

subcarrier index ranges corresponding to an RU 1 are −(492+$N_{DC}$):12:−(12+$N_{DC}$), −(491+$N_{DC}$):12:−(23+$N_{DC}$), −(490+$N_{DC}$):12:−(22+$N_{DC}$), (13+$N_{DC}$):12:(481+$N_{DC}$), (14+$N_{DC}$):12:(482+$N_{DC}$), and (3+$N_{DC}$):12:(483+$N_{DC}$), subcarrier index ranges corresponding to an RU 2 are −(489+$N_{DC}$):12:−(9+$N_{DC}$), −(488+$N_{DC}$):12:−(20+$N_{DC}$), −(487+$N_{DC}$):12:−(19+$N_{DC}$), (16+$N_{DC}$):12:(484+$N_{DC}$), (17+$N_{DC}$):12:(485+$N_{DC}$), and (6+$N_{DC}$):12:(486+$N_{DC}$), subcarrier index ranges corresponding to an RU 3 are −(486+$N_{DC}$):12:−(6+$N_{DC}$), −(485+$N_{DC}$):12:−(17+$N_{DC}$), (484+$N_{DC}$):12:−(16+$N_{DC}$), (19+$N_{DC}$):12:(487+$N_{DC}$), (20+$N_{DC}$):12:(488+$N_{DC}$), and (9+$N_{DC}$):12:(489+$N_{DC}$), and subcarrier index ranges corresponding to an RU 4 are −(483+$N_{DC}$):12:−(3+$N_{DC}$), −(482+$N_{DC}$):12:−(14+$N_{DC}$), (481+$N_{DC}$):12:−(13+$N_{DC}$), (22+$N_{DC}$):12:(490+$N_{DC}$), (23+$N_{DC}$):12:(491+$N_{DC}$), and (12+$N_{DC}$):12:(492+$N_{DC}$).

In the foregoing technical solution, subcarriers that are discrete in the 80 MHz bandwidth are evenly distributed segment by segment. In this way, it may be ensured that a large PAPR increase is not caused in a data part after subcarriers in an RU are discrete based on a common discrete method.

Optionally, during resource allocation, a one-to-one mapping relationship may be established between the discrete RUs in this application and existing resource blocks with a same size. For a case in which a quantity of some resource blocks may be inconsistent with that specified in an existing standard, only some resource blocks defined in this application are selected for use. For example, the 80 MHz bandwidth in the existing standard includes 36 26-tone RUs, and the 80 MHz bandwidth in this application includes 36 52-tone RUs. A quantity of the 26-tone RUs included in the 80 MHz bandwidth in the existing standard and a quantity of the 26-tone RUs included in the 80 MHz bandwidth in this application are the same. Therefore, an RU 1 to an RU 36 in Table 4 may be mapped, in a one-to-one manner, to the 36 26-tone RUs in the existing standard. For another example, the 80 MHz bandwidth in the existing standard includes 20 52-tone RUs, and the 80 MHz bandwidth in this application includes 24 52-tone RUs. A quantity of the 52-tone RUs included in the 80 MHz bandwidth in the existing standard and a quantity of the 52-tone RUs included in the 80 MHz bandwidth in this application are different. Therefore, an RU 1 to an RU 12 in Table 6 may be mapped, in a one-to-one manner, to 12 RUs in the 20 52-tone RUs in the existing standard. Alternatively, an RU 13 to an RU 24 in Table 6 may be mapped, in a one-to-one manner, to 12 RUs in the 20 52-tone RUs in the existing standard. In this way, without changing an original resource scheduling algorithm, an existing scheduling method may be reused when the RU defined in this application is used.

According to a fifth aspect, an apparatus for sending a physical layer protocol data unit is provided. The apparatus is configured to perform the method provided in the first aspect. Specifically, the apparatus may include a module configured to perform any one of the first aspect or the possible implementations of the first aspect.

According to a sixth aspect, an apparatus for receiving a physical layer protocol data unit is provided. The apparatus is configured to perform the method provided in the second aspect. Specifically, the apparatus may include a module configured to perform any one of the second aspect or the possible implementations of the second aspect.

According to a seventh aspect, an apparatus for sending a physical layer protocol data unit is provided. The apparatus includes a processor. The processor is coupled to a memory, and may be configured to execute instructions in the memory, to implement the method in any one of the first aspect or the possible implementations of the first aspect, or implement the method in any one of the third aspect or the possible implementations of the third aspect. Optionally, the apparatus further includes the memory. Optionally, the apparatus further includes a communication interface, and the processor is coupled to the communication interface.

In an implementation, the apparatus is a sending device. When the apparatus is the sending device, the communication interface may be a transceiver or an input/output interface.

In another implementation, the apparatus is a chip configured in a sending device. When the apparatus is the chip configured in the sending device, the communication interface may be an input/output interface.

In another implementation, the apparatus is a chip or a chip system.

Optionally, the transceiver may be a transceiver circuit. Optionally, the input/output interface may be an input/output circuit.

According to an eighth aspect, an apparatus for receiving a physical layer protocol data unit is provided. The apparatus includes a processor. The processor is coupled to a memory, and may be configured to execute instructions in the memory, to implement the method in any one of the second aspect or the possible implementations of the second aspect, or implement the method according to any one of the fourth aspect or the possible implementations of the fourth aspect. Optionally, the apparatus further includes the memory. Optionally, the apparatus further includes a communication interface, and the processor is coupled to the communication interface.

In an implementation, the apparatus is a receiving device. When the apparatus is the receiving device, the communication interface may be a transceiver or an input/output interface.

In another implementation, the apparatus is a chip configured in a receiving device. When the apparatus is the chip configured in the receiving device, the communication interface may be an input/output interface.

In another implementation, the apparatus is a chip or a chip system.

Optionally, the transceiver may be a transceiver circuit. Optionally, the input/output interface may be an input/output circuit.

According to a ninth aspect, a computer-readable storage medium is provided, where computer instructions are stored in the computer-readable storage medium, and when the computer instructions are executed by an apparatus, the apparatus is enabled to implement the method in any one of the first aspect or the possible implementations of the first aspect, or the apparatus is enabled to implement the method in any one of the third aspect or the possible implementations of the third aspect.

According to a tenth aspect, a computer-readable storage medium is provided, where computer instructions are stored in the computer-readable storage medium, and when the computer instructions are executed by an apparatus, the apparatus is enabled to implement the method in any one of the second aspect or the possible implementations of the second aspect, or the apparatus is enabled to implement the method in any one of the fourth aspect or the possible implementations of the fourth aspect.

According to an eleventh aspect, a computer program product including instructions is provided, where the computer program product includes a computer program, and when the computer program is executed by an apparatus, the apparatus is enabled to implement the method provided in any one of the first aspect or the possible implementations of the first aspect, or the apparatus is enabled to implement the method in any one of the third aspect or the possible implementations of the third aspect.

According to a twelfth aspect, a computer program product including instructions is provided, where the computer program product includes a computer program, and when the computer program is executed by an apparatus, the apparatus is enabled to implement the method provided in any one of the second aspect or the possible implementations of the second aspect, or the apparatus is enabled to implement the method in any one of the fourth aspect or the possible implementations of the fourth aspect.

According to a thirteenth aspect, a communication system is provided. The system includes the foregoing sending device and the foregoing receiving device.

DESCRIPTION OF EMBODIMENTS

Figure 1:
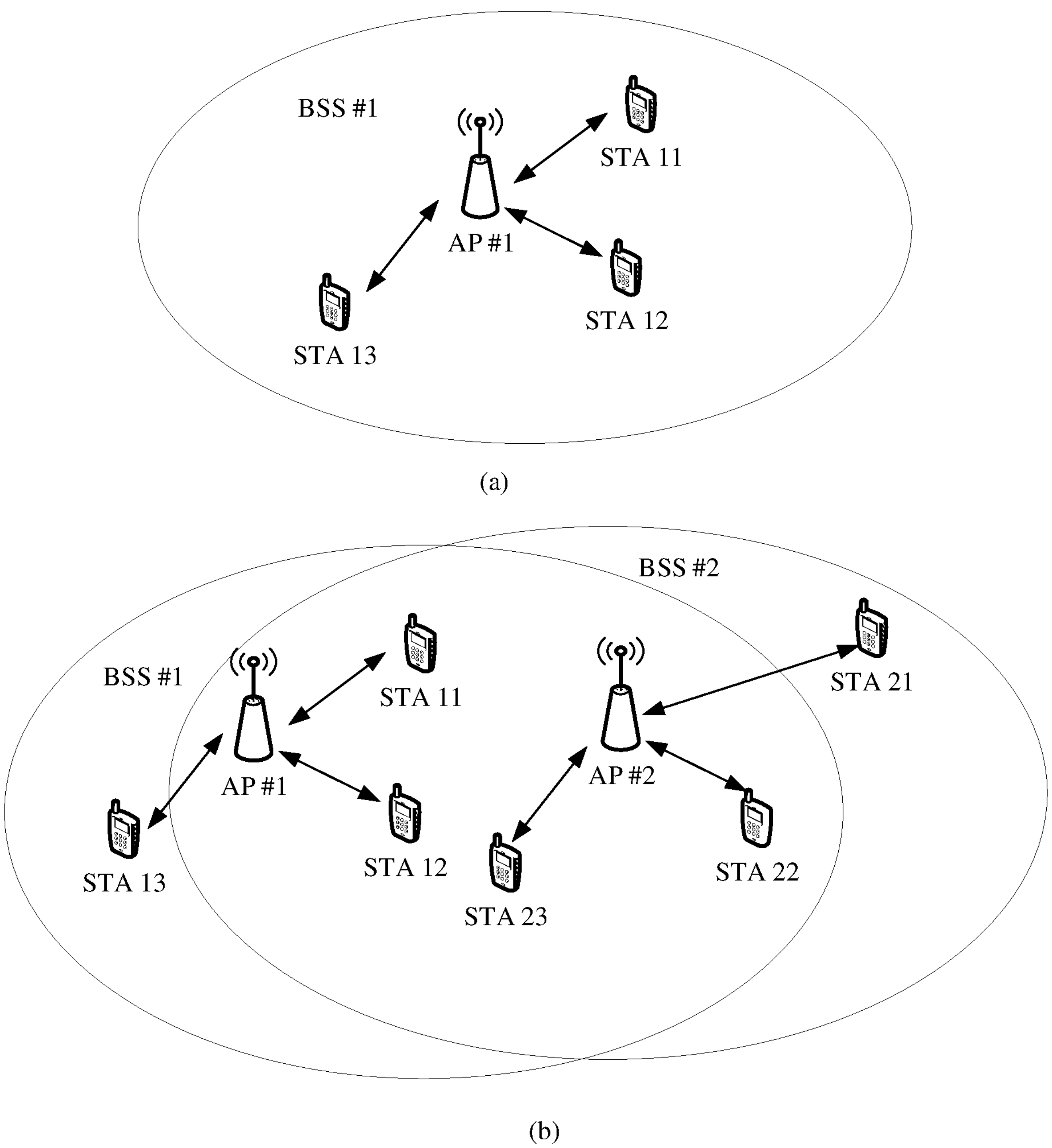
FIG. 1 is a schematic diagram of a network architecture of an example wireless local area network applicable to an embodiment of this application.

The following describes technical solutions of this application with reference to accompanying drawings.

Embodiments of this application may be applied to a wireless local area network (WLAN). Currently, a standard used in the WLAN is the Institute of Electrical and Electronics Engineers (IEEE) 802.11 family. The WLAN may include a plurality of basic service sets (BSSs), and network nodes in the BSSs are stations (STAs) and access points (APs). Each BSS may include one AP and a plurality of STAs associated with the AP.

The AP in embodiments of this application may also be referred to as a wireless access point, a hotspot, or the like. The AP is an access point for a mobile user to access a wired network, and is mainly deployed at home, inside a building, and inside a campus. A typical coverage radius is tens to hundreds of meters. Certainly, the AP may alternatively be deployed outdoors. The AP is equivalent to a bridge that connects a wired network and a wireless network. A main function of the AP is to connect various wireless network clients together and then connect the wireless network to the Ethernet. Specifically, the AP may be a terminal device or a network device with a wireless fidelity (Wi-Fi) chip. Optionally, the AP may be a device that supports a plurality of WLAN standards such as 802.11a/b/g, 802.11n, 802.11ac, 802.11ax, 802.11be that is currently under discussion, or a subsequent version.

The access point in this application may be a high efficient (HE) STA or an extremely high throughput (EHT) STA, or may be a STA applicable to a future-generation Wi-Fi standard.

For example, the access point and the station may be devices used in the internet of vehicles, internet of things nodes, sensors, or the like in the internet of things (IOT), smart cameras, smart remote controls, or smart water or electricity meter in smart home, sensors in smart city, and the like.

The STA in embodiments of this application may be a wireless communication chip, a wireless sensor, or a wireless communication terminal. For example, the STA may be a mobile phone supporting a Wi-Fi communication function, a tablet computer supporting a Wi-Fi communication function, a set-top box supporting a Wi-Fi communication function, a smart television supporting a Wi-Fi communication function, a smart wearable device supporting a Wi-Fi communication function, a vehicle-mounted communication device supporting a Wi-Fi communication function, or a computer supporting a Wi-Fi communication function. Optionally, the STA may support an 802.11ax standard. Further, optionally, the STA may support a plurality of WLAN standards such as 802.11ac, 802.11n, 802.11g, 802.11b, and 802.11a, or a subsequent version.

In embodiments of this application, the STA or the AP includes a hardware layer, an operating system layer running above the hardware layer, and an application layer running above the operating system layer. The hardware layer includes hardware such as a central processing unit (CPU), a memory management unit (MMU), and a memory (also referred to as a primary memory). An operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code for the method provided in embodiments of this application can be run to perform communication according to the method provided in embodiments of this application. For example, the execution body of the method provided in embodiments of this application may be the STA, the AP, or a functional module that is in the STA or the AP and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage device (for example, a hard disk, a floppy disk, or a magnetic tape), an optical disc (for example, a compact disc (CD) or a digital versatile disc (DVD)), a smart card, and a flash memory device (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, include, and/or carry instructions and/or data.

Embodiments of this application may further be applicable to a wireless local area network system, for example, an internet of things (IoT) network or a vehicle-to-everything (Vehicle to X, V2X) network. Certainly, embodiments of this application may further be applicable to other possible communication systems, for example, a long term evolution (long term evolution, LTE) system, an LTE frequency division duplex (FDD) system, an LTE time division duplex (TDD) system, a universal mobile telecommunication system (UMTS), a worldwide interoperability for microwave access (WiMAX) communication system, a $5^{th}$ generation (5G) communication system, and a future $6^{th}$ generation (6G) communication system.

The foregoing communication systems to which this application is applicable are merely examples for description, and the communication systems to which this application is applicable are not limited thereto. This is uniformly described herein.

FIG. 1 is a schematic diagram of a network architecture of a wireless local area network applicable to an embodiment of this application. As shown in (a) in FIG. 1, one BSS may include one AP and one or more STAs associated with the AP. The network architecture of the wireless local area network may further include a plurality of BSSs. For example, as shown in (b) in FIG. 1, the figure shows two BSSs, and the two BSSs partially overlap. To be specific, an overlapping part is an OBSS. A BSS #1 includes an AP #1, a STA 11, a STA 12, and a STA 13, and a BSS #2 includes an AP #2, a STA 21, a STA 22, and a STA 23. The STA 11, the STA 12, the STA 22, and the STA 23 are overlapping parts of the two BSSs. Each BSS includes one AP and a plurality of STAs. In one BSS, data may be transmitted between the AP and each STA, and data may be transmitted between the plurality of STAs. The AP #1 and the AP #2 may also communicate with each other, and the STAs included in two BSSs may also communicate with each other.

It should be understood that FIG. 1 is merely an example and should not constitute a limitation on the network architecture of the wireless local area network applicable to this application. For example, the network architecture may alternatively include more BSSs, each BSS may alternatively include more STAs, or some BSSs may alternatively not include an AP. An overlapping area of a plurality of BSSs may alternatively include more STAs, or the like. This is not limited herein in this embodiment of this application.

For ease of understanding embodiments of this application, the following first describes several nouns or terms in this application.

1. Subcarrier: Wireless communication signals are transmitted within a specific channel bandwidth. An orthogonal frequency division multiplexing (OFDM) technology may be used to divide a bandwidth into a plurality of frequency components within the channel bandwidth at a specific frequency spacing. These components are referred to as subcarriers.

2. Peak-to-Average Power Ratio

A peak-to-average power ratio (PAPR) may be a ratio, in one symbol, of an instantaneous power peak value of contiguous signals to an average signal power value.

3. Subcarrier Distribution (Tone Plan) Defined Based on Contiguous RUs

Figure 2:
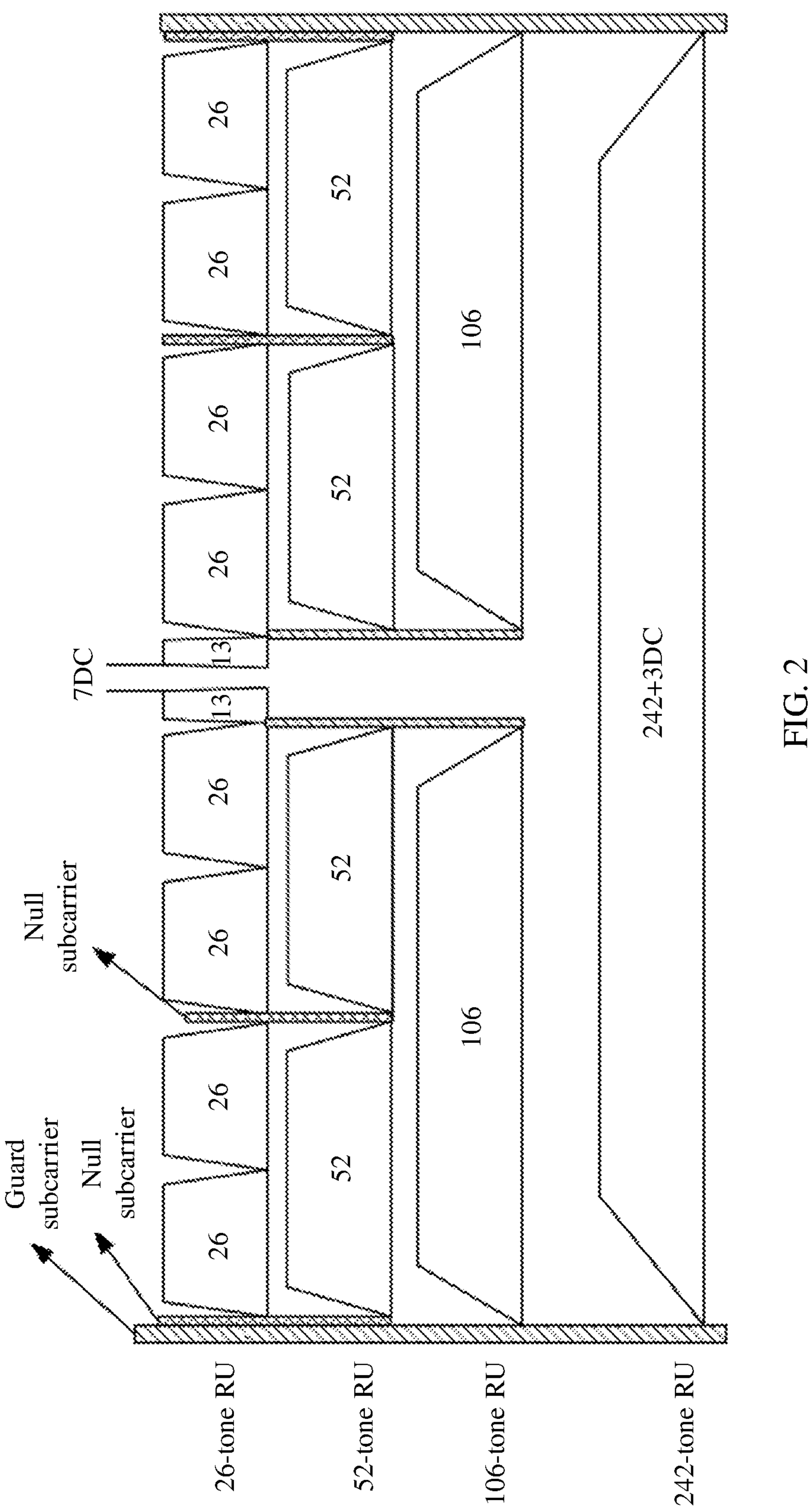
FIG. 2 is a schematic diagram of example subcarrier and RU allocations in a 20 MHz PPDU transmission.

FIG. 2 is a schematic diagram of subcarrier and RU allocations in a 20 MHz PPDU transmission, a bandwidth of 40 MHz, and a bandwidth of 80 MHz. As shown in FIG. 2, when the bandwidth is 20 MHz, the entire bandwidth may include one entire 242-tone RU, or may include a 26-tone RU, a 52-tone RU, a 106-tone RU, or a combination of at least two of the 26-tone RU, the 52-tone RU, and the 106-tone RU. The 26-tone RU indicates that the RU includes 26 subcarriers, the 52-tone RU indicates that the RU includes 52 subcarriers, the 106-tone RU indicates that the RU includes 106 subcarriers, and so on. In addition to a subcarrier used for data transmission, the RU further includes a pilot subcarrier. In addition to the subcarriers that form the RU, the bandwidth further includes some guard subcarriers, null subcarriers, or direct current (DC) subcarriers.

Figure 3:
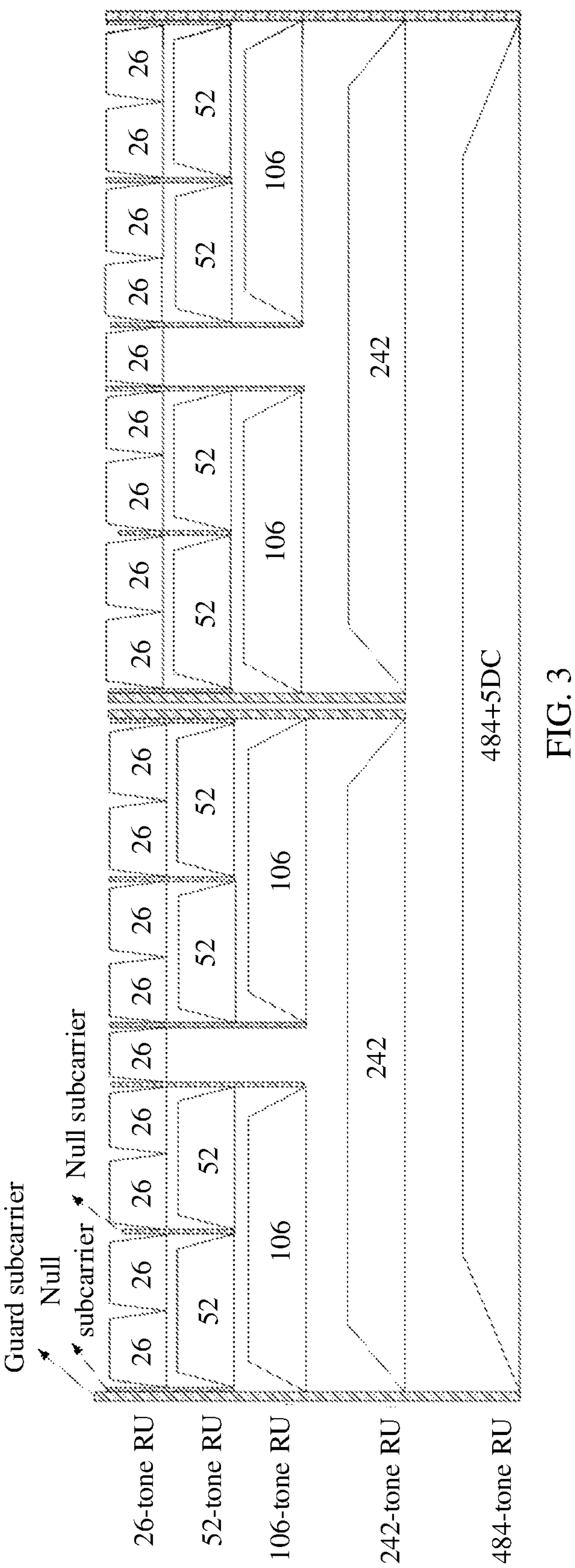
FIG. 3 is a schematic diagram of example subcarrier and RU allocations in a 40 MHz PPDU transmission.

FIG. 3 is a schematic diagram of subcarrier and RU allocations in a 40 MHz PPDU transmission. When the bandwidth is 40 MHz, subcarrier distribution of the entire bandwidth is approximately equivalent to a replication of subcarrier distribution of the 20 MHz bandwidth. The entire bandwidth may include one entire 484-tone RU, or may include any one of a 26-tone RU, a 52-tone RU, a 106-tone RU, and a 242-tone RU, or a combination of at least two of the 26-tone RU, the 52-tone RU, the 106-tone RU, and the 242-tone RU.

Figure 4:
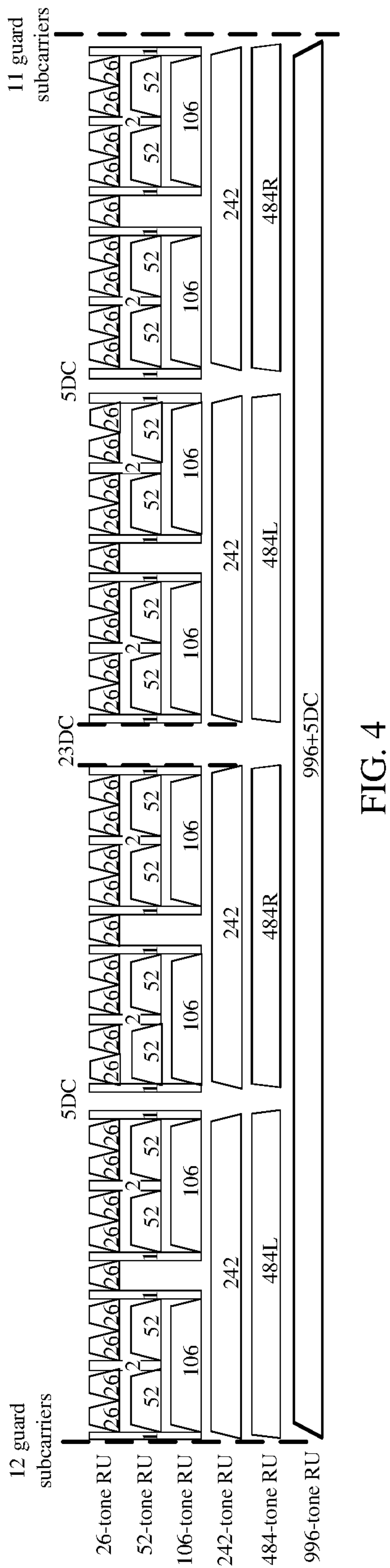
FIG. 4 is a schematic diagram of example subcarrier and RU allocations in an 80 MHz PPDU transmission.

FIG. 4 is a schematic diagram of subcarrier and RU allocations in a 80 MHz PPDU transmission. When the bandwidth is 80 MHz, the entire bandwidth may include 4 RUs in a form of a 242-tone RU, or may include an entire 996-tone RU, or may include various combinations of a 26-tone RU, a 52-tone RU, a 106-tone RU, a 242-tone RU, and a 484-tone RU. 484L and 484R are another representation method of 484+5DC in FIG. 4, and respectively represent a left half part and a right half part of the 484-tone RU. 484L and 484R each include 242 subcarriers. When the bandwidth is 160 MHz or 80+80 MHz, the entire bandwidth may be considered as a replication of subcarrier distribution of two 80 MHz bandwidths. The entire bandwidth may include an entire 2*996-tone RU, or may include any one of the 26-tone RU, the 52-tone RU, the 106-tone RU, the 242-tone RU, the 484-tone RU, and a 996-tone RU, or a combination of at least two of the 26-tone RU, the 52-tone RU, the 106-tone RU, the 242-tone RU, the 484-tone RU, and the 996-tone RU. When the bandwidth is 240 MHz or 160+80 MHz, the entire bandwidth may be considered as a replication of subcarrier distribution of three 80 MHz bandwidths. When the bandwidth is 320 MHz or 160+160 MHz, the entire bandwidth may be considered as a replication of subcarrier distribution of four 80 MHz bandwidths. Schematic distribution diagrams are not separately provided herein.

The following provides subcarrier index ranges of different types of RUs in different bandwidths.

First, a 20 MHz bandwidth is used for description. Because a subcarrier spacing of a current WLAN system is 78.125 kHz, the 20 MHz bandwidth includes 256 contiguous subcarriers in total. The subcarriers are numbered in ascending order of subcarrier frequencies, and subcarrier index values are −128, −127, . . . , 0, . . . , 126, 127, that is, starting from −128 and ending at 127 with a spacing of 1. Subcarriers in the RU are classified into two types: a data subcarrier and a pilot subcarrier. The data subcarrier is configured to carry data information from an upper layer. The pilot subcarrier transfers a fixed value, and is used by a receive end to estimate a phase and perform phase correction. Table 2 shows an index value of each RU in the 20 MHz bandwidth, a subcarrier index range corresponding to each RU, and a pilot subcarrier index. RU #represents an index of the RU. [a:b] represents that index values of subcarriers included in the RU start from a and end at b with a spacing of 1, and includes a and b. {x, y, . . . } represents indexes corresponding to pilot subcarriers included in the RU, and a quantity of digits in { } represents a quantity of pilot subcarriers.

TABLE 2

| RU type | RU index, subcarrier range, and pilot subcarrier index | | | | |
|---|---|---|---|---|---|
| 26-tone RU<br>2 pilot | RU 1<br>[−121:−96]<br>{−116, −102} | RU 2<br>[−95:−70]<br>{90, 76} | RU 3<br>[−68:−43]<br>{62, 48} | RU 4<br>[−42:−17]<br>{36, 22} | RU 5<br>[−16:−4, 4:16]<br>{10, 10} |
| | RU 6<br>[17:42]<br>{22, 36} | RU 7<br>[43:68]<br>{48, 62} | RU 8<br>[70:95]<br>{76, 90} | RU 9<br>[96:121]<br>{102, 116} | |
| 52-tone RU<br>4 pilot | RU 1<br>[−121:−70]<br>{116, 102, −90, 76} | RU 2<br>[−68:−17]<br>{62, 48, −36, 22} | RU 3<br>[17:68]<br>{22, 36, 48, 62} | RU 4<br>[70:121]<br>{76, 90, 102, 116} | |
| 106-tone RU<br>4 pilot | RU 1<br>[−122:−17]<br>{116, −90, −48, −22} | | RU 2<br>[17:122]<br>{22, 48, 90, 116} | | |
| 242-tone RU<br>8 pilot | RU 1<br>[−122:−2, 2:122]<br>{−116, −90, −48, −22, 22, 48, 90, 116} | | | | |

Second, when the bandwidth is 40 MHz, 512 subcarriers are included in total and are numbered in ascending order of subcarrier frequencies, and index values are −256 to 255. An index value of each resource unit is shown in the following table.

TABLE 3

| RU type | RU index, subcarrier range, and pilot subcarrier location | | | | |
|---|---|---|---|---|---|
| 26-tone RU | CRU 1<br>[−243:−218]<br>{−238, −224} | CRU 2<br>[−217:−192]<br>{−212, −198} | CRU 3<br>[−189:−164]<br>{−184, −170} | CRU 4<br>[−163:−138]<br>{−158, −144} | CRU 5<br>[−136:−111]<br>{−130, −116} |
| | CRU 6<br>[−109:−84]<br>{−104, −90} | CRU 7<br>[−83:−58]<br>{−78, −64} | CRU 8<br>[−55:−30]<br>{−50, −36} | CRU 9<br>[−29:−4]<br>{−24, −10} | |
| | CRU 10<br>[4:29]<br>{10, 24} | CRU 11<br>[30:55]<br>{36, 50} | CRU 12<br>[58:83]<br>{64, 78} | CRU 13<br>[84:109]<br>{90, 104} | CRU 14<br>[111:136]<br>{116, 130} |
| | CRU 15<br>[138:163]<br>{144, 158} | CRU 16<br>[164:189]<br>{170, 184} | CRU 17<br>[192:217]<br>{198, 212} | CRU 18<br>[218:243]<br>{224, 238} | |
| 52-tone RU | CRU 1<br>[−243:−192]<br>{−238, −224, −212, −198} | CRU 2<br>[−189:−138]<br>{−184, −170, −158, −144} | CRU 3<br>[−109:−58]<br>{−104, −90, −78, −64} | CRU 4<br>[−55:−4]<br>{−50, −36, −24, −10} | |
| | CRU 5<br>[4:55]<br>{10, 24, 36, 50} | CRU 6<br>[58:109]<br>{64, 78, 90, 104} | CRU 7<br>[138:189]<br>{144, 158, 170, 184} | CRU 8<br>[192:243]<br>{198, 212, 224, 238} | |
| 106-tone RU | CRU 1<br>[−243:−138]<br>{−238, −212, −170, −144} | CRU 2<br>[−109:−4]<br>{−104, −78, −36, −10} | CRU 3<br>[4:109]<br>{10, 36, 78, 104} | CRU 4<br>[138:243]<br>{144, 170, 212, 238} | |
| 242-tone RU | CRU 1<br>[−244:−3]<br>{−238, −212, −170, −144, −104, −78, −36, −10} | | CRU 2<br>[3:244]<br>{10, 36, 78, 104, 144, 170, 212, 238} | | |
| 484-tone RU<br>16 pilot | CRU 1<br>[−244:−3, 3:244]<br>{−238, −212, −170, −144, −104, −78, −36, −10, 10, 36, 78, 104, 144, 170, 212, 238} | | | | |

When the bandwidth is 80 MHz or higher, for 26/52/106/242/484-tone RUs, the subcarrier index range and pilot subcarrier index corresponding to each RU are as follows.

When the bandwidth is 80 MHz, 1024 subcarriers are included in total and are numbered in ascending order of subcarrier frequencies, and index values are −512 to 511.

When the bandwidth is 160 MHz, 2048 subcarriers are included in total and are numbered in ascending order of subcarrier frequencies, and index values are −1024 to 1023.

When the bandwidth is 320 MHz, 4096 subcarriers are included in total and are numbered in ascending order of subcarrier frequencies, and index values are −2048 to 2047.

For an n*996-tone RU, n is a positive integer greater than or equal to 1, and a pilot index of the 996-tone RU is as follows.

When the bandwidth is 80 MHz, pilot index values of the 996-tone RU are: P996={−468, −400, −334, −266, −220, −152, −86, −18, 18, 86, 152, 220, 266, 334, 400, 468}.

When the bandwidth is 160 MHz, pilot index values of the 996-tone RU are: {P996−512} and {P996+512}, and pilot index values of a 2*996-tone RU are: {P996−512, P996+512}.

When the bandwidth is 320 MHz, pilot index values of the 996-tone RU are: {P996−1536}, {P996−512}, {P996+512}, and {P996+1536}, pilot index values of the 2*996-tone RU are: {P996−1536, P996−512}, {P996+512, P996+1536}, and pilot index values of a 4*996-tone RU are: {P996−1536, P996−512, P996+512, P996+1536}.

In FIG. 2 to FIG. 4, in addition to the contiguous RUs in a strict sense, some special examples are further included, for example, the 26-tone RU including two contiguous 13-tones in FIG. 2, the 484-tone RU including two contiguous 242-tones (484L and 484R) in FIG. 3, and the 996-tone RU including two contiguous 498-tones (996L and 996R) in FIG. 4, and may also be referred to as contiguous RUs in a broad sense. In addition, a left index value of each RU may be considered as a lowest frequency of the RU, and a right index value of each RU may be considered as a highest frequency of the RU.

In addition to the foregoing several types of RUs, there is another type of RU including two or more RUs, namely, a multi-RU (MRU), for example, a 52+26-tone RU including one 52-tone RU and one 26-tone RU, a 106+26-tone RU including one 106-tone RU and one 26-tone RU, a 484+242-tone RU including one 484-tone RU and one 242-tone RU, a 996+484-tone RU including one 996-tone RU and one 484-tone RU, a 2*996+484-tone RU including two 996-tone RUs and one 484-tone RU, a 3*996-tone RU including 3 996-tone RUs, and a 3*996+484-tone RU including 3 996-tone RUs and one 484-tone RU.

4. Discrete RU

The discrete RU in this application includes a plurality of subcarriers that are discrete in frequency domain. The plurality of discrete subcarriers may be partially discrete, or may be completely discrete. In other words, the plurality of discrete subcarriers may include some subcarriers that are contiguous in frequencies, and include some subcarriers that are discontiguous in frequencies. Alternatively, the plurality of discrete subcarriers may be completely discontiguous in frequencies.

Alternatively, the discrete RU includes a plurality of subcarrier groups that are discrete in frequency domain, and one subcarrier group includes one subcarrier or a plurality of contiguous subcarriers. Quantities of subcarriers included in each of the plurality of subcarrier groups may be the same or may be different. For example, a quantity of subcarriers in each subcarrier group may be 1. For another example, a 26-tone RU may include 4 subcarrier groups, and quantities of subcarriers in the 4 subcarrier groups may sequentially be 7, 7, 6, and 6.

Discrete RUs may also be referred to as (discontiguous RU, DRU). Certainly, in another embodiment, the discrete RU may also be referred to as another name. The name of the discrete RU is not limited in this application. A quantity of subcarrier groups included in one discrete RU in this application is greater than 2.

In this application, unless otherwise specified, for same or similar parts of embodiments, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The following implementations of this application do not constitute a limitation on the protection scope of this application.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions.

Figure 5:
FIG. 5 is a schematic block diagram of an example method for sending a physical layer protocol data unit and an example method for receiving a physical layer protocol data unit according to an embodiment of this application.
Figure 5:
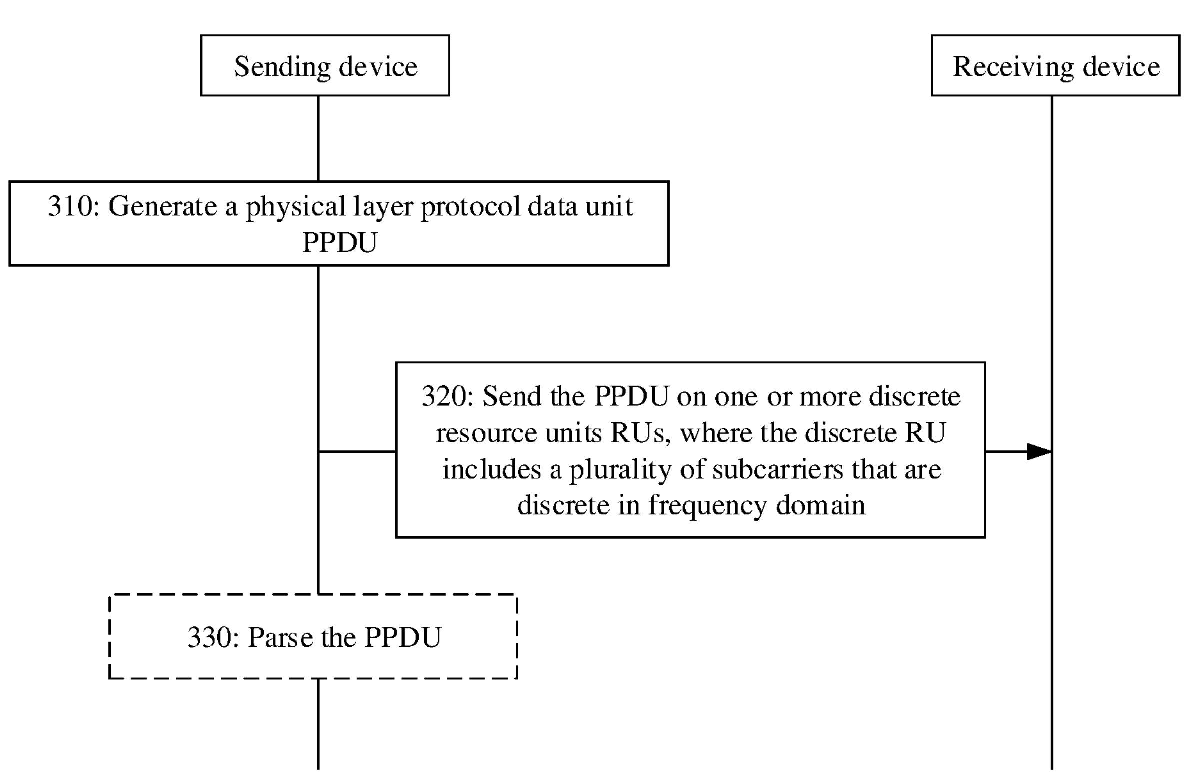

The following describes in detail the technical solutions provided in this application with reference to the accompanying drawings. FIG. 5 is a schematic block diagram of a method for sending a physical layer protocol data unit and a method for receiving a physical layer protocol data unit according to an embodiment of this application. The method 300 may be applied to the scenario shown in FIG. 1, or certainly may be applied to another communication scenario with an OBSS. This is not limited in this embodiment of this application. The following describes in detail steps of the method shown in FIG. 5. For example, a sending device in FIG. 5 may be an AP, and a receiving device may be a STA.

S310: The sending device generates a physical layer protocol data unit (PPDU).

S320: The sending device sends the PPDU on one or more discrete RUs, where the discrete RU includes a plurality of subcarriers that are discrete in frequency domain.

Correspondingly, the receiving device receives the PPDU on the one or more discrete RUs.

Optionally, the plurality of discrete RUs in this application are also referred to as discrete MRUs.

Optionally, in all subcarriers included in a bandwidth per each MHz or per MHz, there are a maximum of M subcarriers that belong to the discrete RU.

That in all subcarriers included in a bandwidth per each MHz or per MHz, there are a maximum of M subcarriers that belong to the discrete RU may also be understood as that in any 12 or 13 contiguous subcarriers, there are a maximum of M subcarriers that belong to the discrete RU.

Optionally, M=1, 2, 3, or 4.

Optionally, the discrete RU is any one of a 13-tone RU, a 26-tone RU, a 52-tone RU, a 106-tone RU, a 242-tone RU, a 484-tone RU, and a 996-tone RU.

Optionally, the discrete RU is a combination of any two RUs of the 13-tone RU, the 26-tone RU, the 52-tone RU, the 106-tone RU, the 242-tone RU, the 484-tone RU, and the 996-tone RU. For example, the discrete RU may be a 13+26-tone RU, a 52+26-tone RU, a 106+26-tone RU, a 484+242-tone RU, a 996+484-tone RU, a 2*996+484-tone RU, or a 3*996+484-tone RU.

Optionally, the discrete RU is the 26-tone RU, and the 26-tone RU may include two 13-tone RUs; or the discrete RU is the 52-tone RU, and the 52-tone RU may include two 26-tone RUs; or the discrete RU is the 52+26-tone RU, and the 52+26-tone RU may include one 52-tone RU and one 26-tone RU; or the discrete RU is the 106-tone RU, and the 106-tone RU may include two 52-tone RUs and two null subcarriers; or the discrete RU is the 242-tone RU, and the 242-tone RU may include a plurality of 26-tone RUs.

Optionally, the method may further include step 330. S330: The receiving device parses the PPDU.

For a specific parsing manner, refer to existing descriptions. This is not limited herein.

In addition, this application further provides a resource scheduling method. The method includes the following steps.

S410: A sending device generates resource scheduling information based on a plurality of resource units obtained by dividing a to-be-allocated frequency domain resource, where the resource scheduling information includes: resource unit allocation information that indicates one or more resource units, and station information of a station to which the one or more resource units are allocated, the one or more resource units allocated to one station include at least one discrete resource unit, and the discrete resource unit includes a plurality of subcarriers that are discrete in frequency domain.

S420: A transmit end sends the resource scheduling information.

Correspondingly, a receive end receives the resource scheduling information

An allocation status of a resource unit is determined based on the resource scheduling information.

Optionally, resource scheduling information in a contiguous RU mode is reused for the resource scheduling information.

Optionally, that resource scheduling information in a contiguous RU mode is reused for the resource scheduling information specifically means that a value of a resource unit allocation subfield in the contiguous RU mode is reused to indicate a discrete resource unit in a discrete RU mode.

Optionally, the method may further include step 430. S430: The receive end determines the allocation status of the resource unit based on the resource scheduling information.

Subcarriers in the discrete RU provided in this embodiment are discontiguous, so that the transmit end can transmit a PPDU at higher transmit power. For ease of understanding, a reason why transmit power of the discrete subcarriers increases is specifically described herein. Herein, an example in which 12 contiguous subcarriers are discretely distributed is used for description. For a user, if only one subcarrier in each 12 contiguous subcarriers is used, and other subcarriers are not used, power used by the used subcarrier to transmit a signal is 12 times the power of each of the 12 contiguous subcarriers in a case in which all the 12 contiguous subcarriers have same power. When only two subcarriers in the 12 contiguous subcarriers are used, power used by the two used subcarriers to transmit a signal is 6 times the power of each of the 12 contiguous subcarriers in a case in which all the 12 contiguous subcarriers have same signal power. By analogy, when N subcarriers in the 12 contiguous subcarriers are used, power used by the N used subcarriers to transmit a signal is (12 divided by N) times the power of each of the 12 contiguous subcarriers in a case in which all the 12 contiguous subcarriers have same signal power, where $1 \le N \le 12$. Therefore, when power spectral density is the same, transmit power of discrete subcarriers increases.

For ease of understanding, the following uses the 80 MHz bandwidth as an example to specifically describe a possible distribution status of the discrete RU in the 80 MHz bandwidth.

Because a subcarrier spacing in a WLAN is 78.125 kHz, the 80 MHz bandwidth may accommodate 1024 contiguous subcarriers in total. The 80 MHz bandwidth includes 1024 contiguous subcarriers. Indexes of the 1024 contiguous subcarriers start from −512 and end at 511 with a spacing of 1 in ascending order of subcarrier frequencies. 12 subcarriers −512:1:−501 and 11 subcarriers 501:1:511 serve as guard subcarriers and are not used, and $2N_{DC}+1$ subcarriers $-N_{DC}$:1:$N_{DC}$ serve as direct current subcarriers and also cannot be used, where $N_{DC} \ge 2$.

It should be noted that a:b:c represents an array, a first element in the array is a, and a difference between a latter element and a former element is b. If b>0, all elements in the array are not greater than c. If b<0, all elements in the array are not less than c. For example, in this application, X:12:Y indicates starting from X and ending at Y with a spacing of 12, and includes X and Y. In this application, X:1:Y indicates starting from X and ending at Y with a spacing of 1, and includes X and Y. For example, 10:12:48 represents a set of {10, 22, 34, 46}, and 3:1:6 represents a set of {3, 4, 5, 6}.

In an implementation, the 80 MHz bandwidth includes 72 13-tone RUs.

Specifically, after subcarriers that cannot be used are removed from the 80 MHz bandwidth, indexes of remaining subcarriers are $-(492+N_{DC})$:1:$-(12+N_{DC})$ and $(1+N_{DC})$:1:$(481+N_{DC})$, and the remaining subcarriers are discretely distributed with a spacing of 12 contiguous subcarriers. For example, indexes of the discrete subcarriers are $-(492+N_{DC})$:12:$-(12+N_{DC})$ and $(1+N_{DC})$:12:$(481+N_{DC})$. For ease of description, subcarriers corresponding to indexes-$(492+N_{DC})$:12:$-(12+N_{DC})$ are referred to as a first resource, and subcarriers corresponding to indexes $(1+N_{DC})$:12:$(481+N_{DC})$ are referred to as a second resource.

It may be learned that each of two discrete resources includes 41 (that is, 480/12+1) subcarriers, and a spacing between adjacent subcarriers in the 41 subcarriers is 12 contiguous subcarriers. In other words, the spacing between adjacent subcarriers in the discrete subcarriers is greater than 1 MHz, and there is only one subcarrier in any 1 MHz.

41 subcarriers included in each resource are divided into 3 13-tone RUs and 2 null subcarriers. The 2 null subcarriers are not adjacent and are located between any two RUs of the 3 13-tone RUs, or the 2 null subcarriers are adjacent and are located between any two RUs of the 3 13-tone RUs. This is not specifically limited in this application.

For example, RU indexes of 3 13-tone RUs obtained after the first resource is divided are respectively an RU 1, an RU 2, and an RU 3, and 2 null subcarriers are a null subcarrier #11 and a null subcarrier #12. In this case, a location relationship between the RUs and the null subcarriers in the first resource may be the RU 1, the null subcarrier #11, the RU 2, the null subcarrier #12, and the RU 3, or may be the RU 1, the null subcarrier #12, the RU 2, the null subcarrier #11, and the RU 3, or may be the RU 1, the null subcarrier #11, the null subcarrier #12, the RU 2, and the RU 3, or may be the RU 1, the null subcarrier #12, the null subcarrier #11, the RU 2, and the RU 3, or may be the RU 1, the RU 2, the null subcarrier #11, the null subcarrier #12, and the RU 3, or may be the RU 1, the RU 2, the null subcarrier #12, the null subcarrier #11, and the RU 3. Similarly, RU indexes of 3 13-tone RUs obtained after the second resource is divided are respectively an RU 4, an RU 5, and an RU 6, and 2 null subcarriers are a null subcarrier #21 and a null subcarrier #22. For a location relationship between the RUs and the null subcarriers in the second resource, refer to the location relationship between the 3 RUs and the null subcarriers in the first resource.

For ease of understanding, for example, the location relationship between the RUs and the null subcarriers in the first resource may be the RU 1, the null subcarrier #11, the RU 2, the null subcarrier #12, and the RU 3, and a location relationship between the RUs and the null subcarriers in the second resource may be the RU 4, the null subcarrier #21, the RU 5, the null subcarrier #22, and the RU 6. In this case, indexes of 6 13-tone RUs and 4 null subcarriers included in the 80 MHz bandwidth are:

an index of the RU 1 is $-(492+N_{DC})$:12:$-(348+N_{DC})$,
an index of the RU 2 is $-(324+N_{DC})$:12:$-(180+N_{DC})$,
an index of the RU 3 is $-(156+N_{DC})$:12:$-(12+N_{DC})$,
an index of the RU 4 is $(1+N_{DC})$:12:$(145+N_{DC})$,
an index of the RU 5 is $(169+N_{DC})$:12:$(313+N_{DC})$, and
an index of the RU 6 is $(337+N_{DC})$:12:$(481+N_{DC})$.

Indexes corresponding to 4 null subcarriers that exist between the RU 1 and the RU 6 are: $-(336+N_{DC})$, $-(168+N_{DC})$, and $(325+N_{DC})$. It may be learned that the null subcarrier with the index of $-(336+N_{DC})$ is sandwiched between the RU 1 and the RU 2, the null subcarrier with the index of $-(336+N_{DC})$ is sandwiched between the RU 2 and the RU 3, the null subcarrier with the index of $(157+N_{DC})$ is sandwiched between the RU 4 and the RU 5, and the null subcarrier with the index of $(325+N_{DC})$ is sandwiched between the RU 5 and the RU 6.

It may be learned from the foregoing that there are 11 subcarriers that are between two adjacent subcarriers in the first resource and the second resource and that are not allocated. Therefore, the RU 1 to the RU 6, the null subcarrier #11, the null subcarrier #12, the null subcarrier #21, and the null subcarrier #22 may be separately translated rightwards by 1 subcarrier spacing (the subcarrier spacing is 78.125 kHz), 2 subcarrier spacings, . . . , 10 subcarrier spacings, and 11 subcarrier spacings, to then separately obtain subcarrier indexes of an RU 7 to an RU 12, an RU 13 to an RU 18, . . . , an RU 61 to an RU 66, an RU 67 to an RU 72, and corresponding null subcarriers. That is, the 80 MHz bandwidth may include 72 13-tone RUs. For intuitive understanding, Table 4 provides the subcarrier indexes of the RU 1 to the RU 72 that may be allocated in the bandwidth of 80 MHz and the corresponding null subcarriers.

TABLE 4

| RU type | RU index and subcarrier index range corresponding to each RU | | | Null subcarrier index |
|---|---|---|---|---|
| 13-tone RU | RU 1<br>$-(492 + N_{DC})$:12:$-(348 + N_{DC})$ | RU 2<br>$-(324 + N_{DC})$:12:$-(180 + N_{DC})$ | RU 3<br>$-(156 + N_{DC})$:12:$-(12 + N_{DC})$ | $-(336 + N_{DC})$ and $-(168 + N_{DC})$ |

TABLE 4-continued

| RU type | RU index and subcarrier index range corresponding to each RU | | | Null subcarrier index |
|---|---|---|---|---|
| | RU 4<br>(1 + $N_{DC}$):12:(145 + $N_{DC}$) | RU 5<br>(165 + $N_{DC}$):12:(313 + $N_{DC}$) | RU 6<br>(337 + $N_{DC}$):12:(481 + $N_{DC}$) | (157 + $N_{DC}$) and (325 + $N_{DC}$) |
| | RU 7<br>−(491 + $N_{DC}$):12:−(347 + $N_{DC}$) | RU 8<br>−(323 + $N_{DC}$):12:−(179 + $N_{DC}$) | RU 9<br>−(155 + $N_{DC}$):12:−(11 + $N_{DC}$) | −(335 + $N_{DC}$) and −(167 + $N_{DC}$) |
| | RU 10<br>(2 + $N_{DC}$):12:(146 + $N_{DC}$) | RU 11<br>(170 + $N_{DC}$):12:(314 + $N_{DC}$) | RU 12<br>(338 + $N_{DC}$):12:(482 + $N_{DC}$) | (158 + $N_{DC}$) and (326 + $N_{DC}$) |
| | RU 13<br>−(490 + $N_{DC}$):12:−(346 + $N_{DC}$) | RU 14<br>−(322 + $N_{DC}$):12:−(178 + $N_{DC}$) | RU 15<br>−(154 + $N_{DC}$):12:−(10 + $N_{DC}$) | −(334 + $N_{DC}$) and −(166 + $N_{DC}$) |
| | RU 16<br>(3 + $N_{DC}$):12:(147 + $N_{DC}$) | RU 17<br>(171 + $N_{DC}$):12:(315 + $N_{DC}$) | RU 18<br>(339 + $N_{DC}$):12:(483 + $N_{DC}$) | (159 + $N_{DC}$) and (327 + $N_{DC}$) |
| | RU 19<br>−(489 + $N_{DC}$):12:−(345 + $N_{DC}$) | RU 20<br>−(321 + $N_{DC}$):12:−(178 + $N_{DC}$) | RU 21<br>−(153 + $N_{DC}$):12:−(9 + $N_{DC}$) | −(333 + $N_{DC}$) and −(165 + $N_{DC}$) |
| | RU 22<br>(4 + $N_{DC}$):12:(148 + $N_{DC}$) | RU 23<br>(172 + $N_{DC}$):12:(316 + $N_{DC}$) | RU 24<br>(340 + $N_{DC}$):12:(484 + $N_{DC}$) | (160 + $N_{DC}$) and (328 + $N_{DC}$) |
| | RU 25<br>−(488 + $N_{DC}$):12:−(344 + $N_{DC}$) | RU 26<br>−(320 + $N_{DC}$):12:−(176 + $N_{DC}$) | RU 27<br>−(152 + $N_{DC}$):12:−(8 + $N_{DC}$) | −(332 + $N_{DC}$) and −(164 + $N_{DC}$) |
| | RU 28<br>(5 + $N_{DC}$):12:(149 + $N_{DC}$) | RU 29<br>(173 + $N_{DC}$):12:(317 + $N_{DC}$) | RU 30<br>(341 + $N_{DC}$):12:(485 + $N_{DC}$) | (161 + $N_{DC}$) and (329 + $N_{DC}$) |
| | RU 31<br>−(487 + $N_{DC}$):12:−(343 + $N_{DC}$) | RU 32<br>−(319 + $N_{DC}$):12:−(175 + $N_{DC}$) | RU 33<br>−(151 + $N_{DC}$):12:−(7 + $N_{DC}$) | −(331 + $N_{DC}$) and −(163 + $N_{DC}$) |
| | RU 34<br>(6 + $N_{DC}$):12:(150 + $N_{DC}$) | RU 35<br>(174 + $N_{DC}$):12:(318 + $N_{DC}$) | RU 36<br>(342 + $N_{DC}$):12:(486 + $N_{DC}$) | (162 + $N_{DC}$) and (330 + $N_{DC}$) |
| | RU 37<br>—(486 + $N_{DC}$):12:−(342 + $N_{DC}$) | RU 38<br>−(318 + $N_{DC}$):12:−(174 + $N_{DC}$) | RU 39<br>−(150 + $N_{DC}$):12:−(6 + $N_{DC}$) | −(330 + $N_{DC}$) and −(162 + $N_{DC}$) |
| | RU 40<br>(7 + $N_{DC}$):12:(151 + $N_{DC}$) | RU 41<br>(175 + $N_{DC}$):12:(319 + $N_{DC}$) | RU 42<br>(343 + $N_{DC}$):12:(487 + $N_{DC}$) | (163 + $N_{DC}$) and (331 + $N_{DC}$) |
| | RU 43<br>−(485 + $N_{DC}$):12:−(341 + $N_{DC}$) | RU 44<br>−(317 + $N_{DC}$):12:−(173 + $N_{DC}$) | RU 45<br>−(149 + $N_{DC}$):12:−(5 + $N_{DC}$) | −(329 + $N_{DC}$) and −(161 + $N_{DC}$) |
| | RU 46<br>(8 + $N_{DC}$):12:(152 + $N_{DC}$) | RU 47<br>(176 + $N_{DC}$):12:(320 + $N_{DC}$) | RU 48<br>(344 + $N_{DC}$):12:(488 + $N_{DC}$) | (164 + $N_{DC}$) and (332 + $N_{DC}$) |
| | RU 49<br>−(484 + $N_{DC}$):12:−(340 + $N_{DC}$) | RU 50<br>−(316 + $N_{DC}$):12:−(172 + $N_{DC}$) | RU 51<br>−(148 + $N_{DC}$):12:−(4 + $N_{DC}$) | −(328 + $N_{DC}$) and −(160 + $N_{DC}$) |
| | RU 52<br>(9 + $N_{DC}$):12:(153 + $N_{DC}$) | RU 53<br>(177 + $N_{DC}$):12:(321 + $N_{DC}$) | RU 54<br>(345 + $N_{DC}$):12:(489 + $N_{DC}$) | (165 + $N_{DC}$) and (333 + $N_{DC}$) |
| | RU 55<br>−(483 + $N_{DC}$):12:−(339 + $N_{DC}$) | RU 56<br>−(315 + $N_{DC}$):12:−(171 + $N_{DC}$) | RU 57<br>−(147 + $N_{DC}$):12:−(3 + $N_{DC}$) | −(327 + $N_{DC}$) and −(159 + $N_{DC}$) |
| | RU 58<br>(10 + $N_{DC}$):12:(154 + $N_{DC}$) | RU 59<br>(178 + $N_{DC}$):12:(322 + $N_{DC}$) | RU 60<br>(346 + $N_{DC}$):12:(490 + $N_{DC}$) | (166 + $N_{DC}$) and (334 + $N_{DC}$) |
| | RU 61<br>−(482 + $N_{DC}$):12:−(338 + $N_{DC}$) | RU 62<br>−(314 + $N_{DC}$):12:−(170 + $N_{DC}$) | RU 63<br>−(146 + $N_{DC}$):12:−(2 + $N_{DC}$) | −(326 + $N_{DC}$) and −(158 + $N_{DC}$) |
| | RU 64<br>(11 + $N_{DC}$):12:(155 + $N_{DC}$) | RU 65<br>(179 + $N_{DC}$):12:(323 + $N_{DC}$) | RU 66<br>(347 + $N_{DC}$):12:(491 + $N_{DC}$) | (167 + $N_{DC}$) and (335 + $N_{DC}$) |
| | RU 67<br>−(481 + $N_{DC}$):12:−(337 + $N_{DC}$) | RU 68<br>−(313 + $N_{DC}$):12:−(169 + $N_{DC}$) | RU 69<br>−(145 + $N_{DC}$):12:−(1 + $N_{DC}$) | −(325 + $N_{DC}$) and −(157 + $N_{DC}$) |
| | RU 70<br>(12 + $N_{DC}$):12:(156 + $N_{DC}$) | RU 71<br>(180 + $N_{DC}$):12:(324 + $N_{DC}$) | RU 72<br>(348 + $N_{DC}$):12:(492 + $N_{DC}$) | (168 + $N_{DC}$) and (336 + $N_{DC}$) |

In another implementation, the 80 MHz bandwidth includes 36 26-tone RUs. For example, Table 5 provides subcarrier index ranges of 36 26-tone RUs that may be allocated in the bandwidth of 80 MHz and subcarrier indexes of null subcarriers, where an RU 1 to an RU 36 are RU indexes of the 36 26-tone RUs.

TABLE 5

| RU type | RU index and subcarrier index range corresponding to each RU | | | Null subcarrier index |
|---|---|---|---|---|
| 26-tone RU | RU 1<br>−(492 + $N_{DC}$):12:−(348 + $N_{DC}$) and −(324 + $N_{DC}$):12:−(180 + $N_{DC}$) | RU 2<br>−(156 + $N_{DC}$):12:−(12 + $N_{DC}$) and (1 + $N_{DC}$):12:(145 + $N_{DC}$) | RU 3<br>(165 + $N_{DC}$):12:(313 + $N_{DC}$) and (337 + $N_{DC}$):12:(481 + $N_{DC}$) | −(336 + $N_{DC}$), −(168 + $N_{DC}$), (157 + $N_{DC}$), and (325 + $N_{DC}$) |
| | RU 4<br>−(491 + $N_{DC}$):12:−(347 + $N_{DC}$) and −(323 + $N_{DC}$):12:−(179 + $N_{DC}$) | RU 5<br>−(155 + $N_{DC}$):12:−(11 + $N_{DC}$) and (2 + $N_{DC}$):12:(146 + $N_{DC}$) | RU 6<br>(170 + $N_{DC}$):12:(314 + $N_{DC}$) and (338 + $N_{DC}$):12:(482 + $N_{DC}$) | −(335 + $N_{DC}$), −(167 + $N_{DC}$), (158 + $N_{DC}$), and (326 + $N_{DC}$) |
| | RU 7<br>−(490 + $N_{DC}$):12:−(346 + $N_{DC}$) and −(322 + $N_{DC}$):12:−(178 + $N_{DC}$) | RU 8<br>−(154 + $N_{DC}$):12:−(10 + $N_{DC}$) and (3 + $N_{DC}$):12:(147 + $N_{DC}$) | RU 9<br>(171 + $N_{DC}$):12:(315 + $N_{DC}$) and (339 + $N_{DC}$):12:(483 + $N_{DC}$) | −(334 + $N_{DC}$), −(166 + $N_{DC}$), (159 + $N_{DC}$), and (327 + $N_{DC}$) |
| | RU 10<br>−(489 + $N_{DC}$):12:−(345 + $N_{DC}$) and −(321 + $N_{DC}$):12:−(178 + $N_{DC}$) | RU 11<br>−(153 + $N_{DC}$):12:−(9 + $N_{DC}$) and (4 + $N_{DC}$):12:(148 + $N_{DC}$) | RU 12<br>(172 + $N_{DC}$):12:(316 + $N_{DC}$) and (340 + $N_{DC}$):12:(484 + $N_{DC}$) | −(333 + $N_{DC}$), −(165 + $N_{DC}$), (160 + $N_{DC}$), and (328 + $N_{DC}$) |

TABLE 5-continued

| RU type | RU index and subcarrier index range corresponding to each RU | | | Null subcarrier index |
|---|---|---|---|---|
| | RU 13<br>−(488 + $N_{DC}$):12:−(344 + $N_{DC}$) and<br>−(320 + $N_{DC}$):12:−(176 + $N_{DC}$), | RU 14<br>−(152 + $N_{DC}$):12:−(8 + $N_{DC}$) and<br>(5 + $N_{DC}$):12:(149 + $N_{DC}$) | RU 15<br>(173 + $N_{DC}$):12:(317 + $N_{DC}$) and<br>(341 + $N_{DC}$):12:(485 + $N_{DC}$) | −(332 + $N_{DC}$),<br>−(164 + $N_{DC}$),<br>(161 + $N_{DC}$), and<br>(329 + $N_{DC}$) |
| | RU 16<br>(487 + $N_{DC}$):12:−(343 + $N_{DC}$) and<br>−(319 + $N_{DC}$):12:−(175 + $N_{DC}$) | RU 17<br>−(151 + $N_{DC}$):12:−(7 + $N_{DC}$) and<br>(6 + $N_{DC}$):12:(150 + $N_{DC}$) | RU 18<br>(174 + $N_{DC}$):12:(318 + $N_{DC}$) and<br>(342 + $N_{DC}$):12:(486 + $N_{DC}$) | −(331 + $N_{DC}$),<br>−(163 + $N_{DC}$),<br>(162 + $N_{DC}$), and<br>(330 + $N_{DC}$) |
| | RU 19<br>−(486 + $N_{DC}$):12:−(342 + $N_{DC}$) and<br>−(318 + $N_{DC}$):12:−(174 + $N_{DC}$) | RU 20<br>−(150 + $N_{DC}$):12:−(6 + $N_{DC}$) and<br>(7 + $N_{DC}$):12:(151 + $N_{DC}$) | RU 21<br>(175 + $N_{DC}$):12:(319 + $N_{DC}$) and<br>(343 + $N_{DC}$):12:(487 + $N_{DC}$) | −(330 + $N_{DC}$),<br>−(162 + $N_{DC}$),<br>(163 + $N_{DC}$), and<br>(331 + $N_{DC}$) |
| | RU 22<br>−(485 + $N_{DC}$):12:−(341 + $N_{DC}$) and<br>−(317 + $N_{DC}$):12:−(173 + $N_{DC}$) | RU 23<br>−(149 + $N_{DC}$):12:−(5 + $N_{DC}$) and<br>(8 + $N_{DC}$):12:(152 + $N_{DC}$) | RU 24<br>(176 + $N_{DC}$):12:(320 + $N_{DC}$) and<br>(344 + $N_{DC}$):12:(488 + $N_{DC}$) | −(329 + $N_{DC}$),<br>−(161 + $N_{DC}$),<br>(164 + $N_{DC}$), and<br>(332 + $N_{DC}$) |
| | RU 25<br>−(484 + $N_{DC}$):12:−(340 + $N_{DC}$) and<br>−(316 + $N_{DC}$):12:−(172 + $N_{DC}$) | RU 26<br>−(148 + $N_{DC}$):12:−(4 + $N_{DC}$) and<br>(9 + $N_{DC}$):12:(153 + $N_{DC}$) | RU 27<br>(177 + $N_{DC}$):12:(321 + $N_{DC}$) and<br>(345 + $N_{DC}$):12:(489 + $N_{DC}$) | −(328 + $N_{DC}$),<br>−(160 + $N_{DC}$),<br>(165 + $N_{DC}$), and<br>(333 + $N_{DC}$) |
| | RU 28<br>−(483 + $N_{DC}$):12:−(339 + $N_{DC}$) and<br>−(315 + $N_{DC}$):12:−(171 + $N_{DC}$) | RU 29<br>−(147 + $N_{DC}$):12:−(3 + $N_{DC}$) and<br>(10 + $N_{DC}$):12:(154 + $N_{DC}$) | RU 30<br>(178 + $N_{DC}$):12:(322 + $N_{DC}$) and<br>(346 + $N_{DC}$):12:(490 + $N_{DC}$) | −(327 + $N_{DC}$),<br>−(159 + $N_{DC}$),<br>(166 + $N_{DC}$), and<br>(334 + $N_{DC}$) |
| | RU 31<br>−(482 + $N_{DC}$):12:−(338 + $N_{DC}$) and<br>−(314 + $N_{DC}$):12:−(170 + $N_{DC}$) | RU 32<br>−(146 + $N_{DC}$):12:−(2 + $N_{DC}$) and<br>(11 + $N_{DC}$):12:(155 + $N_{DC}$) | RU 33<br>(179 + $N_{DC}$):12:(323 + $N_{DC}$) and<br>(347 + $N_{DC}$):12:(491 + $N_{DC}$) | −(326 + $N_{DC}$),<br>−(158 + $N_{DC}$),<br>(167 + $N_{DC}$), and<br>(335 + $N_{DC}$) |
| | RU 34<br>−(481 + $N_{DC}$):12:−(337 + $N_{DC}$) and<br>−(313 + $N_{DC}$):12:−(169 + $N_{DC}$) | RU 35<br>−(145 + $N_{DC}$):12:−(1 + $N_{DC}$) and<br>(12 + $N_{DC}$):12:(156 + $N_{DC}$) | RU 36<br>(180 + $N_{DC}$):12:(324 + $N_{DC}$) and<br>(348 + $N_{DC}$):12:(492 + $N_{DC}$) | −(325 + $N_{DC}$),<br>−(157 + $N_{DC}$),<br>(168 + $N_{DC}$), and<br>(336 + $N_{DC}$) |

It should be understood that Table 5 only provides an example of possible subcarrier index ranges of 36 26-tone RUs and subcarrier indexes of null subcarriers in the bandwidth of 80 MHz. The 80 MHz bandwidth may alternatively include 36 26-tone RUs that are different from those in Table 5. For example, subcarrier index ranges of the RU 1 in Table 5 may be −(492+$N_{DC}$):12:−(348+$N_{DC}$) and −(156+$N_{DC}$):12:−(12+$N_{DC}$), subcarrier index ranges of the RU 2 may be −(324+$N_{DC}$):12:−(180+$N_{DC}$) and (1+$N_{DC}$):12:(145+$N_{DC}$), subcarrier index ranges of the RU 3 may be (169+$N_{DC}$):12:(313+$N_{DC}$) and −(491+$N_{DC}$):12:−(347+$N_{DC}$), and other possible 26-tone RUs are not described one by one.

In another implementation, the 80 MHz bandwidth includes 24 52-tone RUs. For example, Table 6 provides subcarrier index ranges of 24 52-tone RUs that may be allocated in the bandwidth of 80 MHz and subcarrier indexes of null subcarriers, where an RU 1 to an RU 24 are RU indexes of the 24 52-tone RUs. It should be noted that because an RU (K) and an RU (K+12) in Table 6 include a same subcarrier, the RU (K) and the RU (K+12) cannot be simultaneously allocated. For example, the RU 1 and the RU 13 include a same subcarrier. Therefore, the RU 1 and the RU 13 cannot be simultaneously allocated.

TABLE 6

| RU type | RU index and subcarrier index range corresponding to each RU | | Null subcarrier index |
|---|---|---|---|
| 52-tone RU | RU 1<br>$-(492 + N_{DC}):12:-(348 + N_{DC})$,<br>$-(324 + N_{DC}):12:-(180 + N_{DC})$,<br>$-(156 + N_{DC}):12:-(12 + N_{DC})$,<br>and $(1 + N_{DC}):12:(145 + N_{DC})$ | RU 13<br>$-(156 + N_{DC}):12:-(12 + N_{DC})$,<br>$(1 + N_{DC}):12:(145 + N_{DC})$,<br>$(169 + N_{DC}):12:(313 + N_{DC})$,<br>and $(337 + N_{DC}):12:(481 + N_{DC})$ | $-(336 + NDC)$,<br>$-(168 + N_{DC})$,<br>$(157 + N_{DC})$, and<br>$(325 + N_{DC})$ |
| | RU 2<br>$-(491 + N_{DC}):12:-(347 + N_{DC})$,<br>$-(323 + N_{DC}):12:-(179 + N_{DC})$,<br>$-(155 + N_{DC}):12:-(11 + N_{DC})$,<br>and $(2 + N_{DC}):12:(146 + N_{DC})$ | RU 14<br>$-(155 + N_{DC}):12:-(11 + N_{DC})$,<br>$(2 + N_{DC}):12:(146 + N_{DC})$,<br>$(170 + N_{DC}):12:(314 + N_{DC})$,<br>and $(338 + N_{DC}):12:(482 + N_{DC})$ | $-(335 + N_{DC})$,<br>$-(167 + N_{DC})$,<br>$(158 + N_{DC})$, and<br>$(326 + N_{DC})$ |
| | RU 3<br>$-(490 + N_{DC}):12:-(346 + N_{DC})$,<br>$-(322 + N_{DC}):12:-(178 + N_{DC})$,<br>$-(154 + N_{DC}):12:-(10 + N_{DC})$,<br>and $(3 + N_{DC}):12:(147 + N_{DC})$ | RU 15<br>$-(154 + N_{DC}):12:-(10 + N_{DC})$,<br>$(3 + N_{DC}):12:(147 + N_{DC})$,<br>$(171 + N_{DC}):12:(315 + N_{DC})$,<br>and $(339 + N_{DC}):12:(483 + N_{DC})$ | $-(334 + N_{DC})$,<br>$-(166 + N_{DC})$,<br>$(159 + N_{DC})$, and<br>$(327 + N_{DC})$ |
| | RU 4<br>$-(489 + N_{DC}):12:-(345 + N_{DC})$,<br>$-(321 + N_{DC}):12:-(177 + N_{DC})$,<br>$-(153 + N_{DC}):12:-(9 + N_{DC})$,<br>and $(4 + N_{DC}):12:(148 + N_{DC})$ | RU 16<br>$-(153 + N_{DC}):12:-(9 + N_{DC})$,<br>$(4 + N_{DC}):12:(148 + N_{DC})$,<br>$(172 + N_{DC}):12:(316 + N_{DC})$,<br>and $(340 + N_{DC}):12:(484 + N_{DC})$ | $-(333 + N_{DC})$,<br>$-(165 + N_{DC})$,<br>$(160 + N_{DC})$, and<br>$(328 + N_{DC})$ |
| | RU 5<br>$-(488 + N_{DC}):12:-(344 + N_{DC})$,<br>$-(320 + N_{DC}):12:-(176 + N_{DC})$,<br>$-(152 + N_{DC}):12:-(8 + N_{DC})$,<br>and $(5 + N_{DC}):12:(149 + N_{DC})$ | RU 17<br>$-(152 + N_{DC}):12:-(8 + N_{DC})$,<br>$(5 + N_{DC}):12:(149 + N_{DC})$,<br>$(173 + N_{DC}):12:(317 + N_{DC})$,<br>and $(341 + N_{DC}):12:(485 + N_{DC})$ | $-(332 + N_{DC})$,<br>$-(164 + N_{DC})$,<br>$(161 + N_{DC})$, and<br>$(329 + N_{DC})$ |
| | RU 6<br>$-(487 + N_{DC}):12:-(343 + N_{DC})$,<br>$-(319 + N_{DC}):12:-(175 + N_{DC})$,<br>$-(151 + N_{DC}):12:-(7 + N_{DC})$,<br>and $(6 + N_{DC}):12:(150 + N_{DC})$ | RU 18<br>$-(151 + N_{DC}):12:-(7 + N_{DC})$,<br>$(6 + N_{DC}):12:(150 + N_{DC})$,<br>$(174 + N_{DC}):12:(318 + N_{DC})$,<br>and $(342 + N_{DC}):12:(486 + N_{DC})$ | $-(331 + N_{DC})$,<br>$-(163 + N_{DC})$,<br>$(162 + N_{DC})$, and<br>$(330 + N_{DC})$ |
| | RU 7<br>$-(486 + N_{DC}):12:-(342 + N_{DC})$,<br>$-(318 + N_{DC}):12:-(174 + N_{DC})$,<br>$-(150 + N_{DC}):12:-(6 + N_{DC})$,<br>and $(7 + N_{DC}):12:(151 + N_{DC})$ | RU 19<br>$-(150 + N_{DC}):12:-(6 + N_{DC})$,<br>$(7 + N_{DC}):12:(151 + N_{DC})$,<br>$(175 + N_{DC}):12:(319 + N_{DC})$,<br>and $(343 + N_{DC}):12:(487 + N_{DC})$ | $-(330 + N_{DC})$,<br>$-(162 + N_{DC})$,<br>$(163 + N_{DC})$, and<br>$(331 + N_{DC})$ |
| | RU 8<br>$-(485 + N_{DC}):12:-(341 + N_{DC})$,<br>$-(317 + N_{DC}):12:-(173 + N_{DC})$,<br>$-(149 + N_{DC}):12:-(5 + N_{DC})$,<br>and $(8 + N_{DC}):12:(152 + N_{DC})$ | RU 20<br>$-(149 + N_{DC}):12:-(5 + N_{DC})$,<br>$(8 + N_{DC}):12:(152 + N_{DC})$,<br>$(176 + N_{DC}):12:(320 + N_{DC})$,<br>and $(344 + N_{DC}):12:(488 + N_{DC})$ | $-(329 + N_{DC})$,<br>$-(161 + N_{DC})$,<br>$(164 + N_{DC})$, and<br>$(332 + N_{DC})$ |
| | RU 9<br>$-(484 + N_{DC}):12:-(340 + N_{DC})$,<br>$-(316 + N_{DC}):12:-(172 + N_{DC})$,<br>$-(148 + N_{DC}):12:-(4 + N_{DC})$,<br>and $(9 + N_{DC}):12:(153 + N_{DC})$ | RU 21<br>$-(148 + N_{DC}):12:-(4 + N_{DC})$,<br>$(9 + N_{DC}):12:(153 + N_{DC})$,<br>$(177 + N_{DC}):12:(321 + N_{DC})$,<br>and $(345 + N_{DC}):12:(489 + N_{DC})$ | $-(328 + N_{DC})$,<br>$-(160 + N_{DC})$,<br>$(165 + N_{DC})$, and<br>$(333 + N_{DC})$ |
| | RU 10<br>$-(483 + N_{DC}):12:-(339 + N_{DC})$,<br>$-(315 + N_{DC}):12:-(171 + N_{DC})$,<br>$-(147 + N_{DC}):12:-(3 + N_{DC})$,<br>and $(10 + N_{DC}):12:(154 + N_{DC})$ | RU 22<br>$-(147 + N_{DC}):12:-(3 + N_{DC})$,<br>$(10 + N_{DC}):12:(154 + N_{DC})$,<br>$(178 + N_{DC}):12:(322 + N_{DC})$,<br>and $(346 + N_{DC}):12:(490 + N_{DC})$ | $-(327 + N_{DC})$,<br>$-(159 + N_{DC})$,<br>$(166 + N_{DC})$, and<br>$(334 + N_{DC})$ |
| | RU 11<br>$-(482 + N_{DC}):12:-(338 + N_{DC})$,<br>$-(314 + N_{DC}):12:-(170 + N_{DC})$,<br>$-(146 + N_{DC}):12:-(2 + N_{DC})$,<br>and $(11 + N_{DC}):12:(155 + N_{DC})$ | RU 23<br>$-(146 + N_{DC}):12:-(2 + N_{DC})$,<br>$(11 + N_{DC}):12:(155 + N_{DC})$,<br>$(179 + N_{DC}):12:(323 + N_{DC})$,<br>and $(347 + N_{DC}):12:(491 + N_{DC})$ | $-(326 + N_{DC})$,<br>$-(158 + N_{DC})$,<br>$(167 + N_{DC})$, and<br>$(335 + N_{DC})$ |
| | RU 12<br>$-(481 + N_{DC}):12:-(337 + N_{DC})$,<br>$-(313 + N_{DC}):12:-(169 + N_{DC})$,<br>$-(145 + N_{DC}):12:-(1 + N_{DC})$,<br>and $(12 + N_{DC}):12:(156 + N_{DC})$ | RU 24<br>$-(145 + N_{DC}):12:-(1 + N_{DC})$,<br>$(12 + N_{DC}):12:(156 + N_{DC})$,<br>$(180 + N_{DC}):12:(324 + N_{DC})$,<br>and $(348 + N_{DC}):12:(492 + N_{DC})$ | $-(325 + N_{DC})$,<br>$-(157 + N_{DC})$,<br>$(168 + N_{DC})$, and<br>$(336 + N_{DC})$ |

Optionally, in an actual allocation process of the 52-tone RUs, an appropriate RU in Table 6 may be selected based on a puncturing status. For example, it is assumed that a frequency corresponding to a central location of the 80 MHz bandwidth is X. If a frequency corresponding to a puncturing location is less than X, an RU whose frequency is greater than X may be selected in the actual allocation process. If the frequency corresponding to the puncturing location is greater than X, an RU whose frequency is less than X may be selected in the actual allocation process.

Optionally, because the RU (K) and the RU (K+12) cannot be simultaneously allocated, only subcarriers of 12 52-tone RUs may be defined for the 80 MHz bandwidth. For example, the bandwidth of 80 MHz may include only 12 52-tone RUs corresponding to the RU 1 to the RU 12, or the bandwidth of 80 MHz may include only 12 52-tone RUs corresponding to the RU 13 to the RU 24.

In another implementation, the 80 MHz bandwidth includes 12 52+26-tone RUs. For example, Table 7 provides subcarrier index ranges of 12 52+26-tone RUs that may be allocated in the bandwidth of 80 MHz and subcarrier indexes of null subcarriers, where an RU 1 to an RU 12 are RU indexes of the 12 52+26-tone RUs.

TABLE 7

| RU type | RU index and subcarrier index range corresponding to each RU | Null subcarrier index |
|---|---|---|
| 52 + 26-tone RU | RU 1<br>−(492 + $N_{DC}$):12:−(348 + $N_{DC}$),<br>−(324 + $N_{DC}$):12:−(180 + $N_{DC}$),<br>−(156 + $N_{DC}$):12:−(12 + $N_{DC}$),<br>(1 + $N_{DC}$):12:(145 + $N_{DC}$),<br>(169 + $N_{DC}$):12:(313 + $N_{DC}$), and<br>(337 + $N_{DC}$):12:(481 + $N_{DC}$) | −(336 + $N_{DC}$),<br>−(168 + $N_{DC}$),<br>(157 + $N_{DC}$), and<br>(325 + $N_{DC}$) |
| | RU 2<br>−(491 + $N_{DC}$):12:−(347 + $N_{DC}$),<br>−(323 + $N_{DC}$):12:−(179 + $N_{DC}$),<br>−(155 + $N_{DC}$):12:−(11 + $N_{DC}$),<br>(2 + $N_{DC}$):12:(146 + $N_{DC}$),<br>(170 + $N_{DC}$):12:(314 + $N_{DC}$), and<br>(338 + $N_{DC}$):12:(482 + $N_{DC}$) | −(335 + $N_{DC}$),<br>−(167 + $N_{DC}$),<br>(158 + $N_{DC}$), and<br>(326 + $N_{DC}$) |
| | RU 3<br>−(490 + $N_{DC}$):12:−(346 + $N_{DC}$),<br>−(322 + $N_{DC}$):12:−(178 + $N_{DC}$),<br>−(154 + $N_{DC}$):12:−(10 + $N_{DC}$),<br>(3 + $N_{DC}$):12:(147 + $N_{DC}$),<br>(171 + $N_{DC}$):12:(315 + $N_{DC}$), and<br>(339 + $N_{DC}$):12:(483 + $N_{DC}$) | −(334 + $N_{DC}$),<br>−(166 + $N_{DC}$),<br>(159 + $N_{DC}$), and<br>(327 + $N_{DC}$) |
| | RU 4<br>−(489 + $N_{DC}$):12:−(345 + $N_{DC}$),<br>−(321 + $N_{DC}$):12:−(177 + $N_{DC}$),<br>−(153 + $N_{DC}$):12:−(9 + $N_{DC}$),<br>(4 + $N_{DC}$):12:(148 + $N_{DC}$),<br>(172 + $N_{DC}$):12:(316 + $N_{DC}$), and<br>(340 + $N_{DC}$):12:(484 + $N_{DC}$) | −(333 + $N_{DC}$),<br>−(165 + $N_{DC}$),<br>(160 + $N_{DC}$), and<br>(328 + $N_{DC}$) |
| | RU 5<br>−(488 + $N_{DC}$):12:−(344 + $N_{DC}$),<br>−(320 + $N_{DC}$):12:−(176 + $N_{DC}$),<br>−(152 + $N_{DC}$):12:−(8 + $N_{DC}$),<br>(5 + $N_{DC}$):12:(149 + $N_{DC}$),<br>(173 + $N_{DC}$):12:(317 + $N_{DC}$), and<br>(341 + $N_{DC}$):12:(485 + $N_{DC}$) | −(332 + $N_{DC}$),<br>−(164 + $N_{DC}$),<br>(161 + $N_{DC}$), and<br>(329 + $N_{DC}$) |
| | RU 6<br>−(487 + $N_{DC}$):12:−(343 + $N_{DC}$),<br>−(319 + $N_{DC}$):12:−(175 + $N_{DC}$),<br>−(151 + $N_{DC}$):12:−(7 + $N_{DC}$),<br>(6 + $N_{DC}$):12:(150 + $N_{DC}$),<br>(174 + $N_{DC}$):12:(318 + $N_{DC}$), and<br>(342 + $N_{DC}$):12:(486 + $N_{DC}$) | −(331 + $N_{DC}$),<br>−(163 + $N_{DC}$),<br>(162 + $N_{DC}$), and<br>(330 + $N_{DC}$) |
| | RU 7<br>−(486 + $N_{DC}$):12:−(342 + $N_{DC}$),<br>−(318 + $N_{DC}$):12:−(174 + $N_{DC}$),<br>−(150 + $N_{DC}$):12:−(6 + $N_{DC}$),<br>(7 + $N_{DC}$):12:(151 + $N_{DC}$),<br>(175 + $N_{DC}$):12:(319 + $N_{DC}$), and<br>(343 + $N_{DC}$):12:(487 + $N_{DC}$) | −(330 + $N_{DC}$),<br>−(162 + $N_{DC}$),<br>(163 + $N_{DC}$), and<br>(331 + $N_{DC}$) |
| | RU 8<br>−(485 + $N_{DC}$):12:−(341 + $N_{DC}$),<br>−(317 + $N_{DC}$):12:−(173 + $N_{DC}$),<br>−(149 + $N_{DC}$):12:−(5 + $N_{DC}$),<br>(8 + $N_{DC}$):12:(152 + $N_{DC}$),<br>(176 + $N_{DC}$):12:(320 + $N_{DC}$), and<br>(344 + $N_{DC}$):12:(488 + $N_{DC}$) | −(329 + $N_{DC}$),<br>−(161 + $N_{DC}$),<br>(164 + $N_{DC}$), and<br>(332 + $N_{DC}$) |
| | RU 9<br>−(484 + $N_{DC}$):12:−(340 + $N_{DC}$),<br>−(316 + $N_{DC}$):12:−(172 + $N_{DC}$),<br>−(148 + $N_{DC}$):12:−(4 + $N_{DC}$),<br>(9 + $N_{DC}$):12:(153 + $N_{DC}$),<br>(177 + $N_{DC}$):12:(321 + $N_{DC}$), and<br>(345 + $N_{DC}$):12:(489 + $N_{DC}$) | −(328 + $N_{DC}$),<br>−(160 + $N_{DC}$),<br>(165 + $N_{DC}$), and<br>(333 + $N_{DC}$) |
| | RU 10<br>−(483 + $N_{DC}$):12:−(339 + $N_{DC}$),<br>−(315 + $N_{DC}$):12:−(171 + $N_{DC}$),<br>−(147 + $N_{DC}$):12:−(3 + $N_{DC}$),<br>(10 + $N_{DC}$):12:(154 + $N_{DC}$),<br>(178 + $N_{DC}$):12:(322 + $N_{DC}$), and<br>(346 + $N_{DC}$):12:(490 + $N_{DC}$) | −(327 + $N_{DC}$),<br>−(159 + $N_{DC}$),<br>(166 + $N_{DC}$), and<br>(334 + $N_{DC}$) |
| | RU 11<br>−(482 + $N_{DC}$):12:−(338 + $N_{DC}$),<br>−(314 + $N_{DC}$):12:−(170 + $N_{DC}$),<br>−(146 + $N_{DC}$):12:−(2 + $N_{DC}$),<br>(11 + $N_{DC}$):12:(155 + $N_{DC}$),<br>(179 + $N_{DC}$):12:(323 + $N_{DC}$), and<br>(347 + $N_{DC}$):12:(491 + $N_{DC}$) | −(326 + $N_{DC}$),<br>−(158 + $N_{DC}$),<br>(167 + $N_{DC}$), and<br>(335 + $N_{DC}$) |
| | RU 12<br>−(481 + $N_{DC}$):12:−(337 + $N_{DC}$),<br>−(313 + $N_{DC}$):12:−(169 + $N_{DC}$),<br>−(145 + $N_{DC}$):12:−(1 + $N_{DC}$),<br>(12 + $N_{DC}$):12:(156 + $N_{DC}$),<br>(180 + $N_{DC}$):12:(324 + $N_{DC}$), and<br>(348 + $N_{DC}$):12:(492 + $N_{DC}$) | −(325 + $N_{DC}$),<br>−(157 + $N_{DC}$),<br>(168 + $N_{DC}$), and<br>(336 + $N_{DC}$) |

In another implementation, the 80 MHz bandwidth includes 12 106-tone RUs. For example, Table 8 provides subcarrier index ranges of 12 106-tone RUs that may be allocated in the bandwidth of 80 MHz and subcarrier indexes of null subcarriers, where an RU 1 to an RU 12 are RU indexes of the 12 106-tone RUs.

It should be noted that because an RU (K) and an RU (K+6) in Table 8 include a same subcarrier, the RU (K) and the RU (K+6) cannot be simultaneously allocated.

TABLE 8

| RU type | RU index and subcarrier index range corresponding to each RU | | Null subcarrier index |
|---|---|---|---|
| 106-tone RU | RU 1<br>−(492 + $N_{DC}$):12:−(12 + $N_{DC}$),<br>(1 + $N_{DC}$):12:(145 + $N_{DC}$),<br>−(491 + $N_{DC}$):12:−(347 + $N_{DC}$),<br>−(323 + $N_{DC}$):12:−(179 + $N_{DC}$),<br>−(155 + $N_{DC}$):12:−(11 + $N_{DC}$),<br>and (2 + $N_{DC}$):12:(146 + $N_{DC}$) | RU 7<br>−(156 + $N_{DC}$):12:−(12 + $N_{DC}$),<br>(1 + $N_{DC}$):12:(481 + $N_{DC}$),<br>(155 + $N_{DC}$):12:−(11 + $N_{DC}$),<br>(2 + $N_{DC}$):12:(146 + $N_{DC}$),<br>(170 + $N_{DC}$):12:(314 + $N_{DC}$),<br>and (338 + $N_{DC}$):12:(482 + $N_{DC}$) | −(335 + $N_{DC}$),<br>−(167 + $N_{DC}$),<br>(158 + $N_{DC}$), and<br>(326 + $N_{DC}$) |
| | RU 2<br>−(490 + $N_{DC}$):12:−(10 + $N_{DC}$),<br>(3 + $N_{DC}$):12:(147 + $N_{DC}$),<br>−(489 + $N_{DC}$):12:−(345 + $N_{DC}$),<br>−(321 + $N_{DC}$):12:−(177 + $N_{DC}$),<br>−(153 + $N_{DC}$):12:−(9 + $N_{DC}$),<br>and (4 + $N_{DC}$):12:(148 + $N_{DC}$) | RU 8<br>−(154 + $N_{DC}$):12:−(10 + $N_{DC}$),<br>(3 + $N_{DC}$):12:(483 + $N_{DC}$),<br>−(153 + $N_{DC}$):12:−(9 + $N_{DC}$),<br>(4 + $N_{DC}$):12:(148 + $N_{DC}$),<br>(172 + $N_{DC}$):12:(316 + $N_{DC}$),<br>and (340 + $N_{DC}$):12:(484 + $N_{DC}$) | −(333 + $N_{DC}$),<br>−(165 + $N_{DC}$),<br>(160 + $N_{DC}$), and<br>(328 + $N_{DC}$) |
| | RU 3<br>−(488 + $N_{DC}$):12:−(8 + $N_{DC}$),<br>(5 + $N_{DC}$):12:(149 + $N_{DC}$),<br>−(487 + $N_{DC}$):12:−(343 + $N_{DC}$),<br>−(319 + $N_{DC}$):12:−(175 + $N_{DC}$),<br>−(151 + $N_{DC}$):12:−(7 + $N_{DC}$),<br>and (6 + $N_{DC}$):12:(150 + $N_{DC}$) | RU 9<br>−(152 + $N_{DC}$):12:−(8 + $N_{DC}$),<br>(5 + $N_{DC}$):12:(485 + $N_{DC}$),<br>−(151 + $N_{DC}$):12:−(7 + $N_{DC}$),<br>(6 + $N_{DC}$):12:(150 + $N_{DC}$),<br>(174 + $N_{DC}$):12:(318 + $N_{DC}$),<br>and (342 + $N_{DC}$):12:(486 + $N_{DC}$) | −(331 + $N_{DC}$),<br>−(163 + $N_{DC}$),<br>(162 + $N_{DC}$), and<br>(330 + $N_{DC}$) |

TABLE 8-continued

| RU type | RU index and subcarrier index range corresponding to each RU | | Null subcarrier index |
|---|---|---|---|
| | RU 4<br>−(486 + $N_{DC}$):12:−(6 + $N_{DC}$),<br>(7 + $N_{DC}$):12:(151 + $N_{DC}$),<br>−(485 + $N_{DC}$):12:−(341 + $N_{DC}$),<br>−(317 + $N_{DC}$):12:−(173 + $N_{DC}$),<br>−(149 + $N_{DC}$):12:−(5 + $N_{DC}$),<br>and (8 + $N_{DC}$):12:(152 + $N_{DC}$) | RU 10<br>−(150 + $N_{DC}$):12:−(6 + $N_{DC}$),<br>(7 + $N_{DC}$):12:(487 + $N_{DC}$),<br>−(149 + $N_{DC}$):12:−(5 + $N_{DC}$),<br>(8 + $N_{DC}$):12:(152 + $N_{DC}$),<br>(176 + $N_{DC}$):12:(320 + $N_{DC}$),<br>and (344 + $N_{DC}$):12:(488 + $N_{DC}$) | −(329 + $N_{DC}$),<br>−(161 + $N_{DC}$),<br>(164 + $N_{DC}$), and<br>(332 + $N_{DC}$) |
| | RU 5<br>−(484 + $N_{DC}$):12:−(4 + $N_{DC}$),<br>(9 + $N_{DC}$):12:(153 + $N_{DC}$),<br>−(483 + $N_{DC}$):12:−(339 + $N_{DC}$),<br>−(315 + $N_{DC}$):12:−(171 + $N_{DC}$),<br>−(147 + $N_{DC}$):12:−(3 + $N_{DC}$),<br>and (10 + $N_{DC}$):12:(154 + $N_{DC}$) | RU 11<br>−(148 + $N_{DC}$):12:−(4 + $N_{DC}$),<br>(9 + $N_{DC}$):12:(489 + $N_{DC}$),<br>−(147 + $N_{DC}$):12:−(3 + $N_{DC}$),<br>(10 + $N_{DC}$):12:(154 + $N_{DC}$),<br>(178 + $N_{DC}$):12:(322 + $N_{DC}$),<br>and (346 + $N_{DC}$):12:(490 + $N_{DC}$) | −(327 + $N_{DC}$),<br>−(159 + $N_{DC}$),<br>(166 + $N_{DC}$), and<br>(334 + $N_{DC}$) |
| | RU 6<br>−(482 + $N_{DC}$):12:−(2 + $N_{DC}$),<br>(11 + $N_{DC}$):12:(155 + $N_{DC}$),<br>−(481 + $N_{DC}$):12:−(337 + $N_{DC}$),<br>−(313 + $N_{DC}$):12:−(169 + $N_{DC}$),<br>−(145 + $N_{DC}$):12:−(1 + $N_{DC}$),<br>and (12 + $N_{DC}$):12:(156 + $N_{DC}$) | RU 12<br>−(146 + $N_{DC}$):12:−(2 + $N_{DC}$),<br>(11 + $N_{DC}$):12:(491 + $N_{DC}$),<br>−(145 + $N_{DC}$):12:−(1 + $N_{DC}$),<br>(12 + $N_{DC}$):12:(156 + $N_{DC}$),<br>(180 + $N_{DC}$):12:(324 + $N_{DC}$),<br>and (348 + $N_{DC}$):12:(492 + $N_{DC}$) | −(325 + $N_{DC}$),<br>−(157 + $N_{DC}$),<br>(168 + $N_{DC}$), and<br>(336 + $N_{DC}$) |

Optionally, because the RU (K) and the RU (K+6) cannot be simultaneously allocated, only subcarriers of 6 52-tone RUs may be defined in the 80 MHz bandwidth. For example, the bandwidth of 80 MHz may include only 6 52-tone RUs corresponding to the RU 1 to the RU 6, or the bandwidth of 80 MHz may include only 6 52-tone RUs corresponding to the RU 7 to the RU 12.

In another implementation, the 80 MHz bandwidth includes 12 106-tone RUs that are different from those in Table 8. For example, Table 9 provides subcarrier index ranges of another type of 12 106-tone RUs that may be allocated in the bandwidth of 80 MHz and subcarrier indexes of null subcarriers, where an RU 1 to an RU 12 are RU indexes of the 12 106-tone RUs.

TABLE 9

| RU type | RU index and subcarrier index range corresponding to each RU | | Null subcarrier index |
|---|---|---|---|
| 106-tone RU | RU 1<br>−(492 + $N_{DC}$):6:−(336 + $N_{DC}$),<br>−(324 + $N_{DC}$):6:−(168 + $N_{DC}$),<br>(156 + $N_{DC}$):6:−(6 + $N_{DC}$), and<br>(1 + $N_{DC}$):6:(151 + $N_{DC}$) | RU 7<br>−(156 + $N_{DC}$):6:−(6 + $N_{DC}$),<br>(1 + $N_{DC}$):6:(157 + $N_{DC}$),<br>(169 + $N_{DC}$):6:(325 + $N_{DC}$), and<br>(337 + $N_{DC}$):6:(487 + $N_{DC}$) | −(330 + $N_{DC}$),<br>−(162 + $N_{DC}$),<br>(163 + $N_{DC}$),<br>and (331 + $N_{DC}$) |
| | RU 2<br>−(491 + $N_{DC}$):6:−(335 + $N_{DC}$),<br>−(323 + $N_{DC}$):6:−(167 + $N_{DC}$),<br>−(155 + $N_{DC}$):6:−(5 + $N_{DC}$),<br>and (2 + $N_{DC}$):6:(152 + $N_{DC}$) | RU 8<br>−(155 + $N_{DC}$):6:−(5 + $N_{DC}$),<br>(2 + $N_{DC}$):6:(158 + $N_{DC}$),<br>(170 + $N_{DC}$):6:(326 + $N_{DC}$), and<br>(338 + $N_{DC}$):6:(488 + $N_{DC}$) | −(329 + $N_{DC}$),<br>−(161 + $N_{DC}$),<br>(164 + $N_{DC}$),<br>and (332 + $N_{DC}$) |
| | RU 3<br>−(490 + $N_{DC}$):6:−(334 + $N_{DC}$),<br>−(322 + $N_{DC}$):6:−(166 + $N_{DC}$),<br>−(154 + $N_{DC}$):6:−(4 + $N_{DC}$),<br>and (3 + $N_{DC}$):6:(153 + $N_{DC}$) | RU 9<br>−(154 + $N_{DC}$):6:−(4 + $N_{DC}$),<br>(3 + $N_{DC}$):6:(159 + $N_{DC}$),<br>(171 + $N_{DC}$):6:(327 + $N_{DC}$), and<br>(339 + $N_{DC}$):12:(489 + $N_{DC}$) | −(328 + $N_{DC}$),<br>−(160 + $N_{DC}$),<br>(165 + $N_{DC}$),<br>and (333 + $N_{DC}$) |
| | RU 4<br>−(489 + $N_{DC}$):6:−(333 + $N_{DC}$),<br>−(321 + $N_{DC}$):6:−(165 + $N_{DC}$),<br>−(153 + $N_{DC}$):6:−(3 + $N_{DC}$),<br>and (4 + $N_{DC}$):6:(154 + $N_{DC}$) | RU 10<br>−(153 + $N_{DC}$):6:−(3 + $N_{DC}$),<br>(4 + $N_{DC}$):6:(160 + $N_{DC}$),<br>(172 + $N_{DC}$):6:(328 + $N_{DC}$), and<br>(340 + $N_{DC}$):6:(490 + $N_{DC}$) | −(327 + $N_{DC}$),<br>−(159 + $N_{DC}$),<br>(166 + $N_{DC}$),<br>and (334 + $N_{DC}$) |
| | RU 5<br>−(488 + $N_{DC}$):6:−(332 + $N_{DC}$),<br>−(320 + $N_{DC}$):6:−(164 + $N_{DC}$),<br>−(152 + $N_{DC}$):6:−(2 + $N_{DC}$),<br>and (5 + $N_{DC}$):6:(155 + $N_{DC}$) | RU 11<br>−(152 + $N_{DC}$):6:−(2 + $N_{DC}$),<br>(5 + $N_{DC}$):6:(161 + $N_{DC}$),<br>(173 + $N_{DC}$):6:(329 + $N_{DC}$), and<br>(341 + $N_{DC}$):6:(491 + $N_{DC}$) | −(326 + $N_{DC}$),<br>−(158 + $N_{DC}$),<br>(167 + $N_{DC}$),<br>and (335 + $N_{DC}$) |
| | RU 6<br>−(487 + $N_{DC}$):6:−(331 + $N_{DC}$),<br>−(319 + $N_{DC}$):6:−(163 + $N_{DC}$),<br>−(151 + $N_{DC}$):6:−(1 + $N_{DC}$),<br>and (6 + $N_{DC}$):6:(156 + $N_{DC}$) | RU 12<br>−(151 + $N_{DC}$):6:−(1 + $N_{DC}$),<br>(6 + $N_{DC}$):6:(162 + $N_{DC}$),<br>(174 + $N_{DC}$):6:(330 + $N_{DC}$), and<br>(342 + $N_{DC}$):6:(492 + $N_{DC}$) | −(325 + $N_{DC}$),<br>−(157 + $N_{DC}$),<br>(168 + $N_{DC}$),<br>and (336 + $N_{DC}$) |

In another implementation, the 80 MHz bandwidth includes 4 242-tone RUs. For example, Table 10 provides subcarrier index ranges of 4 242-tone RUs that may be allocated in the bandwidth of 80 MHz, where an RU 1 to an RU 4 are RU indexes of the 4 242-tone RUs.

TABLE 10

| RU type | RU index and subcarrier index range corresponding to each RU |
|---|---|
| 242-tone RU | RU 1<br>$-(492 + N_{DC})$:4:$-(12 + N_{DC})$ and $(9 + N_{DC})$:4:$(489 + N_{DC})$<br>RU 2<br>$-(491 + N_{DC})$:4:$-(11 + N_{DC})$ and $(10 + N_{DC})$:4:$(490 + N_{DC})$<br>RU 3<br>$-(490 + N_{DC})$:4:$-(10 + N_{DC})$ and $(11 + N_{DC})$:4:$(491 + N_{DC})$<br>RU 4<br>$-(489 + N_{DC})$:4:$-(9 + N_{DC})$ and $(12 + N_{DC})$:4:$(492 + N_{DC})$ |

In another implementation, the 80 MHz bandwidth includes 4 242-tone RUs that are different from those in Table 10. For example, Table 11 provides subcarrier index ranges of another type of 4 242-tone RUs that may be allocated in the bandwidth of 80 MHz, where an RU 1 to an RU 4 are RU indexes of the 4 242-tone RUs.

TABLE 11

| RU type | RU index and subcarrier index range corresponding to each RU |
|---|---|
| 242-tone RU | RU 1<br>$-(492 + N_{DC})$:12:$-(12 + N_{DC})$,<br>$-(491 + N_{DC})$:12:$-(23 + N_{DC})$,<br>$-(490 + N_{DC})$:12:$-(22 + N_{DC})$,<br>$(13 + N_{DC})$:12:$(481 + N_{DC})$,<br>$(14 + N_{DC})$:12:$(482 + N_{DC})$ and<br>$(3 + N_{DC})$:12:$(483 + N_{DC})$<br>RU 2<br>$-(489 + N_{DC})$:12:$-(9 + N_{DC})$,<br>$-(488 + N_{DC})$:12:$-(20 + N_{DC})$,<br>$-(487 + N_{DC})$:12:$-(19 + N_{DC})$,<br>$(16 + N_{DC})$:12:$(484 + N_{DC})$,<br>$(17 + N_{DC})$:12:$(485 + N_{DC})$ and<br>$(6 + N_{DC})$:12:$(486 + N_{DC})$<br>RU 3<br>$-(486 + N_{DC})$:12:$-(6 + N_{DC})$,<br>$-(485 + N_{DC})$:12:$-(17 + N_{DC})$,<br>$-(484 + N_{DC})$:12:$-(16 + N_{DC})$,<br>$(19 + N_{DC})$:12:$(487 + N_{DC})$,<br>$(20 + N_{DC})$:12:$(488 + N_{DC})$ and<br>$(9 + N_{DC})$:12:$(489 + N_{DC})$<br>RU 4<br>$-(483 + N_{DC})$:12:$-(3 + N_{DC})$,<br>$-(482 + N_{DC})$:12:$-(14 + N_{DC})$,<br>$-(481 + N_{DC})$:12:$-(13 + N_{DC})$,<br>$(22 + N_{DC})$:12:$(490 + N_{DC})$,<br>$(23 + N_{DC})$:12:$(491 + N_{DC})$ and<br>$(12 + N_{DC})$:12:$(492 + N_{DC})$ |

It can be learned that subcarriers that are discrete in the 80 MHz bandwidth are evenly distributed segment by segment. The RU 1 to the RU 6 in Table 4 are used as an example, the RU 1 to the RU 6 are each used as a resource unit and are distributed in the 80 MHz bandwidth segment by segment, and 13 subcarriers included in the RU 1 to the RU 6 are evenly and discretely distributed. In this way, it may be ensured that a large PAPR increase is not caused in a data part after subcarriers in an RU are discrete based on a common discrete method. A specific reason why the PAPR does not increase is specifically described herein. For a frequency domain sequence X={X(0), X(1), X(2), . . . , X(N−1)}, M 0s are inserted between adjacent elements of the frequency domain sequence to form a new frequency domain sequence Y={X(0), $0_M$, X(1), $0_M$, X(2), $0_M$, . . . , X(N−1)}. In this case, the new sequence Y and the original sequence X have an equal PAPR, and a time domain waveform corresponding to the sequence Y is equivalent to a waveform obtained by repeating a waveform corresponding to the sequence X M times in time domain. Therefore, the sequence X is evenly discrete in the frequency domain sequence, so that a PAPR of a time domain waveform of the sequence X does not change before and after discreteness. In other discrete modes, PAPR performance cannot be ensured.

Optionally, during RU division in this application, null subcarriers are reserved between RUs or in the RUs, and these null subcarriers may also be used as pilot subcarriers or data subcarriers. Optionally, during resource allocation, a one-to-one mapping relationship may be established between the RUs in this application and existing resource blocks with a same size. For a case in which a quantity of some resource blocks may be inconsistent with that specified in an existing standard, only some resource blocks defined in this application are selected for use. For ease of understanding, an example is used herein for description. For example, an 80 MHz bandwidth in an existing standard includes 36 26-tone RUs, and an 80 MHz bandwidth in this application includes 36 52-tone RUs. A quantity of the 26-tone RUs included in the 80 MHz bandwidth in the existing standard and a quantity of the 26-tone RUs included in the 80 MHz bandwidth in this application are the same. Therefore, the RU 1 to the RU 36 in Table 4 may be mapped, in a one-to-one manner, to the 36 26-tone RUs in the existing standard. For another example, the 80 MHz bandwidth in the existing standard includes 20 52-tone RUs, and the 80 MHz bandwidth in this application includes 24 52-tone RUs. A quantity of the 52-tone RUs included in the 80 MHz bandwidth in the existing standard and a quantity of the 52-tone RUs included in the 80 MHz bandwidth in this application are different. Therefore, the RU 1 to the RU 12 in Table 6 may be mapped, in a one-to-one manner, to 12 RUs in the 20 52-tone RUs in the existing standard. Alternatively, the RU 13 to the RU 24 in Table 6 may be mapped, in a one-to-one manner, to 12 RUs in the 20 52-tone RUs in the existing standard. In this way, without changing an original resource scheduling algorithm, an existing scheduling method may be reused when the RU defined in this application is used.

It should be understood that the foregoing tables provide only some possible division manners of different types of RUs in the 80 MHz bandwidth, and do not constitute any limitation on this application.

It should further be understood that for a case of a larger bandwidth, for example, a bandwidth of 160 M or 320 M, a resource block division method that is the same as that in this application may be used in each sub-band of 80 M.

The 80 MHz bandwidth is directly divided above, to obtain subcarrier ranges corresponding to different types of RUs included in the 80 MHz bandwidth. This application provides another division method below, and the subcarrier ranges corresponding to the different types of RUs included in the 80 MHz bandwidth may also be obtained.

In an implementation, any two non-repeated RUs may be selected from the 72 13-tone RUs provided in Table 4, to construct 36 26-tone RUs in the 80 MHz bandwidth. In a specific implementation, an index of a subcarrier included in an $n^{th}$ 26-tone RU satisfies Formula (1):

$$26\text{-Tone } RU(n) = \begin{cases} 13\text{-Tone } RU(6k+1) \cup 13\text{-Tone } RU(6k+2), n = 3k+1 \\ 13\text{-Tone } RU(6k+3) \cup 13\text{-Tone } RU(6k+4), n = 3k+2 \\ 13\text{-Tone } RU(6k+5) \cup 13\text{-Tone } RU(6k+6), n = 3k+3 \end{cases} \quad (1)$$

1≤n≤36, and n is an integer. 36 26-tone RUs obtained by using Formula (1) are the same as those in Table 5. There is one null subcarrier between two 13-tone RUs that form a 26-tone RU (3z−2), there is a null subcarrier in each of two 13-tone RUs that form a 26-tone RU (3z−1), and there is a null subcarrier between two 13-tone RUs that form a 26-tone RU (3z), where 1≤z≤12, and z is an integer.

In another implementation, the following 24 52-tone RUs may be constructed in the 80 MHz bandwidth based on the 26-tone RUs specified in Formula (1). For example, an index of a subcarrier included in an $m^{th}$ 26-tone RU satisfies Formula (2):

$$52\text{-Tone } RU(m) = \begin{cases} 26\text{-Tone } RU(3m-2) \cup 26\text{-Tone } RU(3m-1), m \le 12 \\ 26\text{-Tone } RU(3(m-12)-1) \cup 26\text{-Tone } RU(3(m-12)), m > 12 \end{cases} \quad (2)$$

1≤m≤24, and m is an integer. 24 52-tone RUs obtained by using Formula (1) are the same as those in Table 6. It should be noted that a $k^{th}$ 52-tone RU and a $(k+12)^{th}$ 52-tone RU in Table 6 cannot be simultaneously allocated. For example, if k=2, in Formula (2), a 52-tone RU (2) is formed by a union set of a 26-tone RU (4) and a 26-tone RU (5), and a 52-tone RU (14) is formed by a union set of the 26-tone RU (5) and a 26-tone RU (6). Because the 26-tone RU (5) is used in both the 52-tone RU (2) and the 52-tone RU (14), the $2^{nd}$ 52-tone RU and the $14^{th}$ 52-tone RU cannot be simultaneously allocated.

In another implementation, because the $k^{th}$ 52-tone RU and the $(k+12)^{th}$ 52-tone RU constructed in Formula (2) cannot be simultaneously allocated, the following 12 52+26-tone MRUs may be constructed in the 80 MHz bandwidth according to Formulas (1) and (2). For example, an index of a subcarrier included in a $l^{th}$ 52+26-tone MRU satisfies Formula (3):

$$52+26\text{-Tone } RU(l) = 52\text{-}RU(2l-1) \cup 26\text{-Tone } RU(3l) \quad (3)$$

1≤l≤12, and l is an integer. 12 52-tone RUs obtained by using Formula (3) are the same as those in Table 7.

In another implementation, the following 12 106-tone RUs may be constructed in the 80 MHz bandwidth according to Formula (2). For example, an index of a subcarrier included in a $t^{th}$ 106-tone RU satisfies Formula (4):

$$106\text{-Tone } RU(t) = 52\text{-}RU(2t-1) \cup 52\ RU(2t) \cup 2 \text{ Null tone} \quad (4)$$

1≤t≤12, and t is an integer. It may be learned that the 12 52-tone RUs obtained by using Formula (4) are the same as those in Table 8. It should be noted that a $k^{th}$ 106-tone RU and a $(k+6)^{th}$ 106-tone RU in Table 8 cannot be simultaneously allocated. For example, if k=2, it can be learned from Formula (4) that a 106-tone RU (2) includes a 52-tone RU (2) and a 52-tone RU (8), and a 106-tone RU (8) includes a 52-tone RU (14) and a 52-tone RU (20). It may be learned from the foregoing description that the 52-tone RU (2) and the 52-tone RU (14) cannot be simultaneously allocated, and the 52-tone RU (8) and the 52-tone RU (20) cannot be simultaneously allocated. Therefore, the $2^{nd}$ 52-tone RU and the $8^{th}$ 52-tone RU cannot be simultaneously allocated.

In another implementation, the following 12 106-tone RUs may be constructed in the 80 MHz bandwidth according to Formula (2). For example, an index of a subcarrier included in a $t^{th}$ 106-tone RU satisfies Formula (5):

$$106\text{-Tone } RU(t) = \begin{cases} 52\text{-Tone } RU(t) \cup 52\text{-Tone } RU(t+6) \cup 2 \text{ Null tone}, t <= 6 \\ 52\text{-Tone } RU(2t-1) \cup 52\text{-Tone } RU(2t) \cup 2 \text{ Null tone}, t > 6 \end{cases} \quad (5)$$

1≤t≤12, and tis an integer. 12 52-tone RUs obtained by using Formula (5) are the same as those in Table 9. It should be noted that a $k^{th}$ 106-tone RU and a $(k+6)^{th}$ 106-tone RU in Table 9 cannot be simultaneously allocated.

In another implementation, the following 4 242-tone RUs may be constructed in the 80 MHz bandwidth according to Formula (1). For example, an index of a subcarrier included in a $w^{th}$ 242-tone RU satisfies Formula (6):

$$242\text{-Tone } RU(w) = \bigcup_{k=1}^{3}\bigcup_{l=1}^{3} 26\text{-Tone } RU(3w+12k-l-9) \quad (6)$$

1≤w≤4, and w, k, and/are all integers. 12 52-tone RUs obtained by using Formula (6) are the same as those in Table 9.

It may be learned that the discrete subcarriers defined in the foregoing embodiment are evenly distributed with a spacing of 12 contiguous subcarriers. This application provides another type of discrete subcarriers that are evenly distributed with a spacing of 16 contiguous subcarriers.

It should be understood that a spacing between two adjacent discrete subcarriers is 16 contiguous subcarriers, and effect thereof is that there is a maximum of 1 discrete subcarrier in a bandwidth per MHz (that is, 13 contiguous subcarriers).

The 80 MHz bandwidth is still used as an example. Because the subcarrier spacing in the WLAN is 78.125 kHz, the 80 MHz bandwidth may accommodate 1024 contiguous subcarriers in total. The 80 MHz bandwidth includes 1024 contiguous subcarriers. Indexes of the 1024 contiguous subcarriers start from −512 and end at 511 with a spacing of 1 in ascending order of subcarrier frequencies. 12 subcarriers −512:1:−501 and 11 subcarriers 501:1:511 serve as guard subcarriers and are not used, and $2N_{DC}+1$ subcarriers $-N_{DC}$:1:$N_{DC}$ serve as direct current subcarriers and also cannot be used, where $N_{DC}$ is greater than or equal to 2.

In an implementation, the 80 MHz bandwidth includes 32 26-tone RUs.

Specifically, after the subcarriers that cannot be used in the 80 MHz bandwidth are removed, indexes of the remaining subcarriers are −500:1:−$(1+N_{DC})$ and $(1+N_{DC})$:1:500, and the remaining subcarriers are discretely distributed with the spacing of 16 contiguous subcarriers. For example, indexes of the discrete subcarriers may be −500:16:−20 and 5:16:485. It may be learned that each of two discrete resources includes 31 (that is, 480/16+1) subcarriers, and a spacing between adjacent subcarriers in the 31 subcarriers is 16 contiguous subcarriers. In other words, the spacing between adjacent subcarriers in the discrete subcarriers is greater than 1 MHz, and there is only one subcarrier in any 1 MHz. The discrete 31 subcarriers are divided into one 26-tone RU and 5 null subcarriers, where the null subcarriers may also be used as pilot subcarriers of a 26-tone RU resource block.

Because 15 subcarriers that are between two adjacent subcarriers in the two discrete resources are still not allocated, the obtained two groups of 26-tone RUs and 5 null subcarriers may be separately translated rightwards by 1 subcarrier spacing (the subcarrier spacing is 78.125 kHz), 2 subcarrier spacings, . . . , 14 subcarrier spacings, and 15 subcarrier spacings, to obtain 32 26-tone RUs in total. Table 12 provides subcarrier index ranges of 32 26-tone RUs that may be allocated in the bandwidth of 80 MHz, where an RU 1 to an RU 32 are RU indexes of the 32 26-tone RUs.

TABLE 12

| RU type | RU and corresponding null subcarrier index, and subcarrier range | |
|---|---|---|
| 26-tone RU + 5 null subcarriers (31 subcarriers in total) | RU 1<br>−500:16:−20 | RU 2<br>5:16:485 |
| | RU 3<br>−499:16:−19 | RU 4<br>6:16:486 |
| | RU 5<br>−498:16:−18 | RU 6<br>7:16:487 |
| | RU 7<br>−497:16:−17 | RU 8<br>8:16:488 |
| | RU 9<br>−496:16:−16 | RU 10<br>9:16:489 |
| | RU 11<br>−495:16:−15 | RU 12<br>10:16:490 |
| | RU 13<br>−494:16:−14 | RU 14<br>11:16:491 |
| | RU 15<br>−493:16:−13 | RU 16<br>12:16:492 |
| | RU 17<br>−492:16:−12 | RU 18<br>13:16:493 |
| | RU 19<br>−491:16:−11 | RU 20<br>14:16:494 |
| | RU 21<br>−490:16:−10 | RU 22<br>15:16:495 |
| | RU 23<br>−489:16:−9 | RU 24<br>16:16:496 |
| | RU 25<br>−488:16:−8 | RU 26<br>17:16:497 |
| | RU 27<br>−487:16:−7 | RU 28<br>18:16:498 |
| | RU 29<br>−486:16:−6 | RU 30<br>19:16:499 |
| | RU 31<br>−485:16:−5 | RU 32<br>20:16:500 |

It should be noted that if $N_{DC}$>4, each 26-tone RU has 4 null subcarriers, a last subcarrier (namely, a subcarrier whose subcarrier index is k−21) in an RU (2k−1) is used as a direct current subcarrier, and a first subcarrier (namely, a subcarrier whose subcarrier index is k+4) in an RU (2k) is used as a direct current subcarrier. For example, a last subcarrier (namely, a subcarrier whose subcarrier index is 16−21=−5) in the RU 31 is used as a direct current subcarrier, and a first subcarrier (namely, a subcarrier whose subcarrier index is 16+4=20) in the RU 32 is used as a direct current subcarrier.

In another implementation, the 80 MHz bandwidth includes 16 52-tone RUs. Table 13 provides subcarrier index ranges of 16 52-tone RUs that may be allocated in the bandwidth of 80 MHz and subcarrier indexes of null subcarriers, where an RU 1 to an RU 16 are RU indexes of the 16 52-tone RUs.

TABLE 13

| RU type | RU and null subcarrier index thereof, and subcarrier range |
|---|---|
| 52-tone RU + 10 null subcarriers | RU 1<br>−500:16:−20 and 5:16:485 |
| | RU 2<br>−499:16:−19 and 6:16:486 |
| | RU 3<br>−498:16:−18 and 7:16:487 |
| | RU 4<br>−497:16:−17 and 8:16:488 |
| | RU 5<br>−496:16:−16 and 9:16:489 |
| | RU 6<br>−495:16:−15 and 10:16:490 |
| | RU 7<br>−494:16:−14 and 11:16:491 |
| | RU 8<br>−493:16:−13 and 12:16:492 |
| | RU 9<br>−492:16:−12 and 13:16:493 |
| | RU 10<br>−491:16:−11 and 14:16:494 |
| | RU 11<br>−490:16:−10 and 15:16:495 |
| | RU 12<br>−489:16:−9 and 16:16:496 |
| | RU 13<br>−488:16:−8 and 17:16:497 |
| | RU 14<br>−487:16:−7 and 18:16:498 |
| | RU 15<br>−486:16:−6 and 19:16:499 |
| | RU 16<br>−485:16:−5 and 20:16:500 |

In another implementation, the 80 MHz bandwidth includes 8 106-tone RUs. Table 14 provides subcarrier index ranges of 8 106-tone RUs that may be allocated in the bandwidth of 80 MHz and subcarrier indexes of null subcarriers, where an RU 1 to an RU 8 are RU indexes of the 8 106-tone RUs.

TABLE 14

| RU type | RU and null subcarrier index thereof, and subcarrier range |
|---|---|
| 106-tone RU + 18 null subcarriers | RU 1<br>−500:8:−12 and 5:8:493 |
| | RU 2<br>−499:8:−11 and 6:8:494 |
| | RU 3<br>−498:8:−10 and 7:8:495 |
| | RU 4<br>−497:8:−9 and 8:8:496 |
| | RU 5<br>−496:8:−8 and 9:8:497 |
| | RU 6<br>−495:8:−7 and 10:8:498 |
| | RU 7<br>−494:8:−6 and 11:8:499 |
| | RU 8<br>−493:8:−5 and 12:8:500 |

In another implementation, the 80 MHz bandwidth includes 8 106-tone RUs. Table 15 provides subcarrier index ranges of 8 106-tone RUs that may be allocated in the bandwidth of 80 MHz and subcarrier indexes of null subcarriers, where an RU 1 to an RU 8 are RU indexes of the 8 106-tone RUs.

TABLE 15

| RU type | RU and null subcarrier index thereof, and subcarrier range |
|---|---|
| 106-tone RU + 18 null subcarriers | RU 1<br>−500:16:−20, 5:16:485,<br>−499:16:−19, and 6:16:486<br>RU 2<br>−498:16:−18, 7:16:487,<br>−497:16:−17, and 8:16:488<br>RU 3<br>−496:16:−16, 9:16:489,<br>−495:16:−15, and 10:16:490<br>RU 4<br>−494:16:−14, 11:16:491,<br>−493:16:−13, and 12:16:492<br>RU 5<br>−492:16:−12, 13:16:493,<br>−491:16:−11, and 14:16:494<br>RU 6<br>−490:16:−10, 15:16:495,<br>−489:16:−9, and 16:16:496<br>RU 7<br>−488:16:−8, 17:16:497,<br>−487:16:−7, and 18:16:498<br>RU 8<br>−486:16:−6, 19:16:499,<br>−485:16:−5, and 20:16:500 |

In another implementation, the 80 MHz bandwidth includes 4 242-tone RUs. Table 16 provides subcarrier index ranges of 4 242-tone RUs that may be allocated in the bandwidth of 80 MHz and subcarrier indexes of null subcarriers, where an RU 1 to an RU 8 are RU indexes of the 4 242-tone RUs.

TABLE 16

| RU type | RU index and subcarrier range |
|---|---|
| 242-tone RU + 6 null subcarriers | RU 1<br>−500:4:−8 and 5:4:497<br>RU 2<br>−499:4:−7 and 6:4:498<br>RU 3<br>−498:4:−6 and 7:4:499<br>RU 4<br>−497:4:−5 and 8:4:500 |

In another implementation, the 80 MHz bandwidth includes 4 242-tone RUs. Table 17 provides subcarrier index ranges of 4 242-tone RUs that may be allocated in the bandwidth of 80 MHz and subcarrier indexes of null subcarriers, where an RU 1 to an RU 8 are RU indexes of the 4 242-tone RUs.

TABLE 17

| RU type | RU index and subcarrier range |
|---|---|
| 242-tone RU 6 null subcarriers | RU 1<br>−500:16:−20, 5:16:485,<br>−499:16:−19, 6:16:486,<br>−498:16:−18, 7:16:487,<br>−497:16:−17, and 8:16:488<br>RU 2<br>−496:16:−16, 9:16:489,<br>−495:16:−15, 10:16:490,<br>−494:16:−14, 11:16:491,<br>−493:16:−13, and 12:16:492<br>RU 3<br>−492:16:−12, 13:16:493,<br>−491:16:−11, 14:16:494,<br>−490:16:−10, 15:16:495,<br>−489:16:−9, and 16:16:496<br>RU 4<br>−488:16:−8, 17:16:497,<br>−487:16:−7, 18:16:498,<br>−486:16:−6, 19:16:499,<br>−485:16:−5, and 20:16:500 |

The 80 MHz bandwidth is directly divided above, to obtain subcarrier ranges corresponding to different types of RUs included in the 80 MHz bandwidth. This application provides another division method below, and the subcarrier ranges corresponding to the different types of RUs included in the 80 MHz bandwidth may also be obtained.

In an implementation, any two non-repeated RUs may be selected from the 32 26-tone RUs provided in Table 12, to construct 16 52-tone RUs in the 80 MHz bandwidth. For example, an index of a subcarrier included in an $n^{th}$ 52-tone RU satisfies Formula (7):

$$\text{52-Tone } RU(n) = \text{26-Tone } RU(2n-1) \bigcup \text{26-Tone } RU(2n) \tag{7}$$

1≤n≤16, and n is an integer. 16 52-tone RUs obtained by using Formula (7) are the same as those in Table 13.

In another implementation, any two 52-tone RUs in 52-tone RUs specified in Formula (7) and two null subcarriers can be combined to obtain one 106-tone RU, and 8 106-tone RUs may be constructed in the 80 MHz bandwidth.

For example, an index of a subcarrier included in an $m^{th}$ 106-tone RU satisfies Formula (8):

$$\text{106-Tone RU(m)} = \text{52-Tone } RU(m) \bigcup \text{52-}RU(m+8) \bigcup \text{2 Null tone} \tag{8}$$

For another example, an index of a subcarrier included in an $m^{th}$ 106-tone RU satisfies Formula (9):

$$\text{1069-Tone } RU = \text{52-Tone } RU(2m-1) \bigcup \text{52-}RU(2m) \bigcup \text{2 Null tone} \tag{9}$$

In Formulas (8) and (9), 1≤m≤8, and m is an integer. 8 106-tones obtained by using Formula (8) are the same as those in Table 14, and 8 106-tones obtained by using Formula (9) are the same as those in Table 15.

In another implementation, any two 106-tone RUs in 106-tone RUs specified in Formula (9) and null subcarriers may construct a 242-tone RU, and 4 242-tone RUs may be constructed in the 80 MHz bandwidth.

For example, an index of a subcarrier included in a $k^{th}$ 242-tone RU satisfies Formula (10):

$$\text{242-Tone } RU(k) = \text{106-Tone } RU(k) \bigcup \text{106-Tone } RU(k+4) \bigcup \text{30Null tone} \tag{10}$$

For example, an index of a subcarrier included in a $k^{th}$ 242-tone RU satisfies Formula (11):

$$\text{242-Tone } RU(k) = \text{106-Tone } RU(2k) \cup \text{106-Tone } RU(2k-1) \cup \text{30 Null tone} \quad (11)$$

In Formulas (10) and (11), 1≤k≤4, and k is an integer. 4 242-tone RUs obtained by using Formula (10) are the same as those in Table 16, and 4 242-tone RUs obtained by using Formula (11) are the same as those in Table 17.

In addition, it should be understood that the foregoing process of constructing a larger-size RU by using a small-size RU is merely intended to facilitate understanding of an internal association relationship between the large-size RU and the small-size RU in this application, and is not intended to constitute a limitation that the small-size RU needs to be used to construct the large-size RU before RU allocation. Actually, in each bandwidth, an index of a subcarrier included in an RU of each size is predefined before resource allocation.

It may be learned that in this embodiment of this application, the discrete subcarriers in the 80 MHz bandwidth are evenly distributed segment by segment. In this way, it may be ensured that a large PAPR increase is not caused in a data part after subcarriers in an RU are discrete based on a common discrete method.

Optionally, during RU division in this application, null subcarriers are reserved between RUs or in the RUs, and these null subcarriers may also be used as pilot subcarriers or data subcarriers.

Optionally, during resource allocation, a one-to-one mapping relationship may be established between the RUs in this application and existing resource blocks with a same size. For a case in which a quantity of some resource blocks may be inconsistent with that specified in an existing standard, only some resource blocks defined in this application are selected for use. For ease of understanding, an example is used herein for description. For example, an 80 MHz bandwidth in an existing standard includes 36 26-tone RUs, and an 80 MHz bandwidth in this application includes 36 52-tone RUs. A quantity of the 26-tone RUs included in the 80 MHz bandwidth in the existing standard and a quantity of the 26-tone RUs included in the 80 MHz bandwidth in this application are the same. Therefore, the RU 1 to the RU 36 in Table 4 may be mapped, in a one-to-one manner, to the 36 26-tone RUs in the existing standard. For another example, the 80 MHz bandwidth in the existing standard includes 20 52-tone RUs, and the 80 MHz bandwidth in this application includes 24 52-tone RUs. A quantity of the 52-tone RUs included in the 80 MHz bandwidth in the existing standard and a quantity of the 52-tone RUs included in the 80 MHz bandwidth in this application are different. Therefore, the RU 1 to the RU 12 in Table 6 may be mapped, in a one-to-one manner, to 12 RUs in the 20 52-tone RUs in the existing standard. Alternatively, the RU 13 to the RU 24 in Table 6 may be mapped, in a one-to-one manner, to 12 RUs in the 20 52-tone RUs in the existing standard. In this way, without changing an original resource scheduling algorithm, an existing scheduling method may be reused when the RU defined in this application is used.

In the foregoing embodiment, that an existing scheduling method may be reused when the RU defined in this application is used specifically means that in a discrete RU mode, an index value in a resource unit allocation subfield (RU allocation subfield) used in an existing contiguous RU mode is reused to allocate and indicate the discrete RU. How to distinguish between the discrete RU mode and the contiguous RU mode may be explicitly or implicitly indicated. This is not a focus of discussion in this embodiment of this application, and It should be understood that the foregoing tables provide only some possible division manners of different types of RUs in the 80 MHz bandwidth, and do not constitute any limitation on this application.

It should further be understood that for a case of a larger bandwidth, for example, a bandwidth of 160 M or 320 M, a resource block division method that is the same as that in this application may be used in each sub-band of 80 M.

Figure 6:
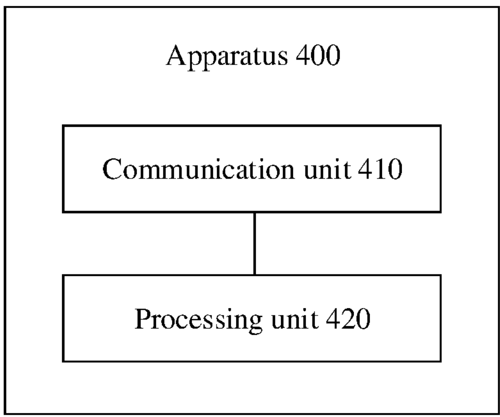
FIG. 6 is a schematic block diagram of an example apparatus for sending a physical layer protocol data unit and an example apparatus for receiving a physical layer protocol data unit according to an embodiment of this application.
Figure 7:
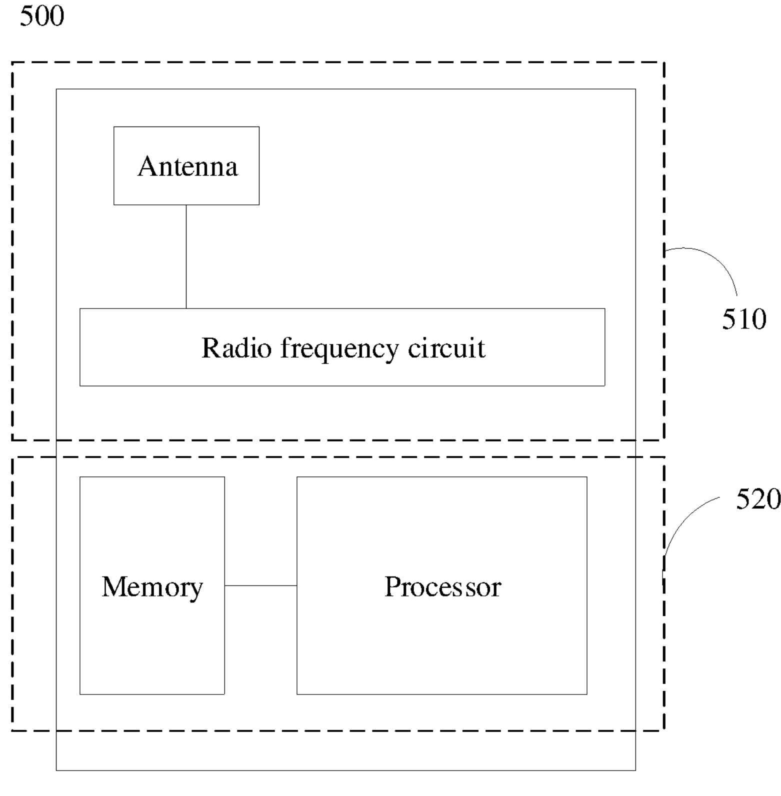
FIG. 7 is a schematic diagram of a structure of an example sending device according to an embodiment of this application.
Figure 8:
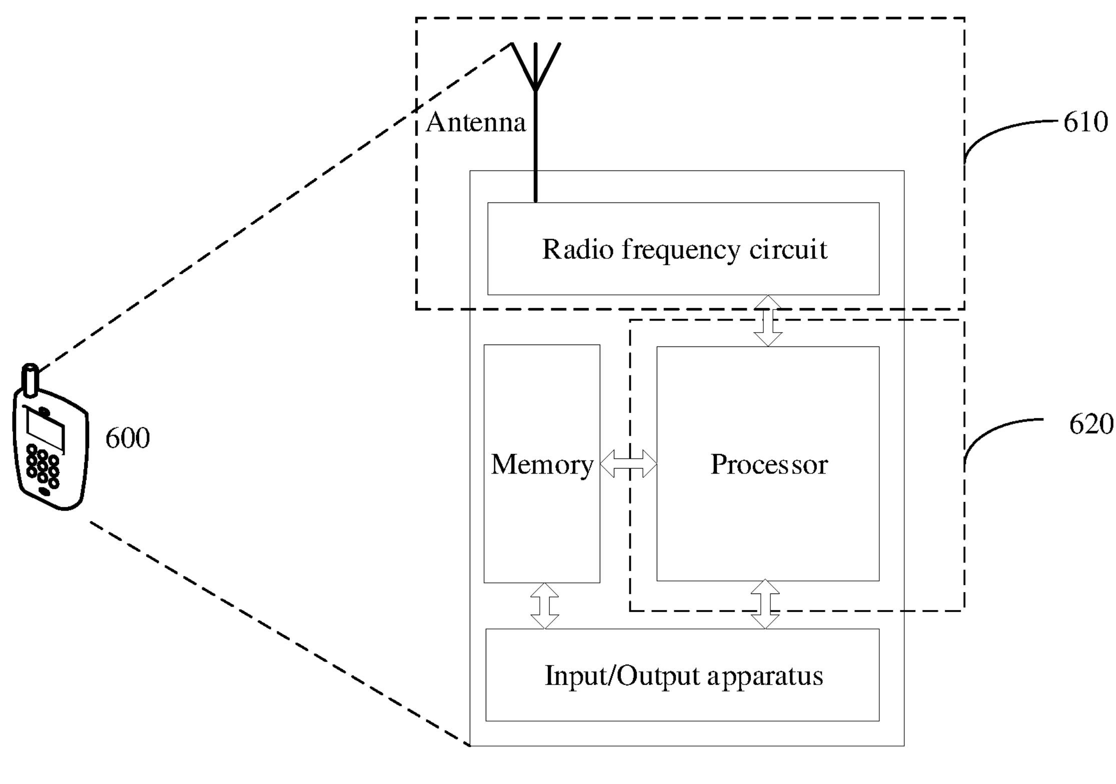
FIG. 8 is a schematic diagram of a structure of an example receiving device according to an embodiment of this application.

With reference to FIG. 1 to FIG. 5, the foregoing describes in detail the method for sending the physical layer protocol data unit and the method for receiving the physical layer protocol data unit that are provided in embodiments of this application. With reference to FIG. 6 to FIG. 8, the following describes in detail an apparatus for sending a physical layer protocol data unit and an apparatus for receiving a physical layer protocol data unit that are provided in an embodiment of this application.

FIG. 6 is a schematic block diagram of an apparatus for sending a physical layer protocol data unit and an apparatus for receiving a physical layer protocol data unit according to an embodiment of this application. As shown in FIG. 6, an apparatus 400 may include a communication unit 410 and a processing unit 420. The communication unit 410 may communicate with the outside, and the processing unit 420 is configured to process data. The communication unit 410 may also be referred to as a communication interface or a transceiver unit.

In an example embodiment, the apparatus 400 may implement steps or procedures that correspond to the foregoing method embodiments and that are performed by a transmitting device. For example, the apparatus 400 may be the transmitting device, or a chip or a circuit configured in a sending device. In this case, the apparatus 400 may be referred to as the transmitting device. The communication unit 410 is configured to perform a receiving/sending-related operation on a sending device side in the foregoing method embodiments, and the processing unit 420 is configured to perform a processing-related operation of the sending device in the foregoing method embodiments.

In a possible implementation, the processing unit 420 is configured to generate a physical layer protocol data unit (PPDU); and the communication unit 410 is configured to send the PPDU on one or more discrete resource units (RUs).

The communication unit 410 is configured to send the PPDU on one or more discrete resource units (RUS).

In another possible implementation, the processing unit 420 generates resource scheduling information based on a plurality of resource units obtained by dividing a to-be-allocated frequency domain resource, where the resource scheduling information includes resource unit allocation information that indicates one or more resource units, and station information of a station to which the one or more resource units are allocated, the one or more resource units allocated to one station include at least one discrete resource unit RU, and the discrete resource unit includes a plurality of subcarriers that are discrete in frequency domain.

The communication unit 410 is configured to send the resource scheduling information.

Optionally, resource scheduling information in a contiguous RU mode is reused for the resource scheduling information.

Optionally, that resource scheduling information in a contiguous RU mode is reused for the resource scheduling information specifically means that a value of a resource unit allocation subfield in the contiguous RU mode is reused to indicate a discrete resource unit in a discrete RU mode.

Optionally, in all subcarriers included in a bandwidth per each MHz or per MHz, there are a maximum of M subcarriers that belong to the discrete RU.

That in all subcarriers included in a bandwidth per each MHz or per MHz, there are a maximum of M subcarriers that belong to the discrete RU may also be understood as that in any 12 or 13 contiguous subcarriers, there are a maximum of M subcarriers that belong to the discrete RU.

Optionally, M=1, 2, 3, or 4.

Optionally, the discrete RU is an X-tone RU, where a value of X is any one or a combination of 13, 26, 52, 106, 242, 484, and 996, and the X-tone RU includes X subcarriers.

Optionally, the discrete RU is a 26-tone RU, and the 26-tone RU includes two 13-tone RUs; or the discrete RU is a 52-tone RU, and the 52-tone RU includes two 26-tone RUs; or the discrete RU is a 52+26-tone RU, and the 52+26-tone RU includes one 52-tone RU and one 26-tone RU; or the discrete RU is a 106-tone RU, and the 106-tone RU includes two 52-tone RUs and two null subcarriers; or the discrete RU is a 242-tone RU, and the 242-tone RU includes a plurality of 26-tone RUs.

Optionally, the discrete RU is located in first bandwidth, and the first bandwidth is a multiple of 80 MHz. The each 80 MHz includes 1024 contiguous subcarriers. Indexes of the 1024 contiguous subcarriers start from −512 and end at 511 with a spacing of 1 in ascending order of subcarrier frequencies. Indexes of direct current subcarriers in the 1024 contiguous subcarriers start from $-N_{DC}$ and end at $N_{DC}$ with a spacing of 1, and $N_{DC} \geq 2$.

The each 80 MHz includes 72 13-tone RUs, and subcarrier index ranges corresponding to the 72 13-tone RUs are shown below, where :12: indicates that an index difference between a latter subcarrier and a former subcarrier in two adjacent subcarriers is 12:

a subcarrier index range corresponding to an RU 1 is $-(492+N_{DC})$:12:$-(348+N_{DC})$,
a subcarrier index range corresponding to an RU 2 is $-(324+N_{DC})$:12:$-(180+N_{DC})$,
a subcarrier index range corresponding to an RU 3 is $-(156+N_{DC})$:12:$-(12+N_{DC})$,
a subcarrier index range corresponding to an RU 4 is $(1+N_{DC})$:12:$(145+N_{DC})$,
a subcarrier index range corresponding to an RU 5 is $(169+N_{DC})$:12:$(313+N_{DC})$,
a subcarrier index range corresponding to an RU 6 is $(337+N_{DC})$:12:$(481+N_{DC})$,
indexes corresponding to 4 null subcarriers that exist between the RU 1 and the RU 6 are: $-(336+N_{DC})$, $-(168+N_{DC})$, $(157+N_{DC})$, and $(325+N_{DC})$,
a subcarrier index range corresponding to an RU 7 is $-(491+N_{DC})$:12:$-(347+N_{DC})$,
a subcarrier index range corresponding to an RU 8 is $-(323+N_{DC})$:12:$-(179+N_{DC})$,
a subcarrier index range corresponding to an RU 9 is $-(155+N_{DC})$:12:$-(11+N_{DC})$,
a subcarrier index range corresponding to an RU 10 is $(2+N_{DC})$:12:$(146+N_{DC})$,
a subcarrier index range corresponding to an RU 11 is $(170+N_{DC})$:12:$(314+N_{DC})$,
a subcarrier index range corresponding to an RU 12 is $(338+N_{DC})$:12:$(482+N_{DC})$,
indexes corresponding to 4 null subcarriers that exist between the RU 7 and the RU 12 are: $-(335+N_{DC})$, $-(167+N_{DC})$, $(158+N_{DC})$, and $(326+N_{DC})$,
a subcarrier index range corresponding to an RU 13 is $-(490+N_{DC})$:12:$-(346+N_{DC})$,
a subcarrier index range corresponding to an RU 14 is $-(322+N_{DC})$:12:$-(178+N_{DC})$,
a subcarrier index range corresponding to an RU 15 is $-(154+N_{DC})$:12:$-(10+N_{DC})$,
a subcarrier index range corresponding to an RU 16 is $(3+N_{DC})$:12:$(147+N_{DC})$,
a subcarrier index range corresponding to an RU 17 is $(171+N_{DC})$:12:$(315+N_{DC})$,
a subcarrier index range corresponding to an RU 18 is $(339+N_{DC})$:12:$(483+N_{DC})$,
indexes corresponding to 4 null subcarriers that exist between the RU 13 and the RU 18 are: $-(334+N_{DC})$, $-(166+N_{DC})$, $(159+N_{DC})$, and $(327+N_{DC})$,
a subcarrier index range corresponding to an RU 19 is $-(489+N_{DC})$:12:$-(345+N_{DC})$,
a subcarrier index range corresponding to an RU 20 is $-(321+N_{DC})$:12:$-(178+N_{DC})$,
a subcarrier index range corresponding to an RU 21 is $-(153+N_{DC})$:12:$-(9+N_{DC})$,
a subcarrier index range corresponding to an RU 22 is $(4+N_{DC})$:12:$(148+N_{DC})$,
a subcarrier index range corresponding to an RU 23 is $(172+N_{DC})$:12:$(316+N_{DC})$,
a subcarrier index range corresponding to an RU 24 is $(340+N_{DC})$:12:$(484+N_{DC})$,
indexes corresponding to 4 null subcarriers that exist between the RU 19 and the RU 24 are: $-(333+N_{DC})$, $-(165+N_{DC})$, $(160+N_{DC})$, and $(328+N_{DC})$,
a subcarrier index range corresponding to an RU 25 is $-(488+N_{DC})$:12:$-(344+N_{DC})$,
a subcarrier index range corresponding to an RU 26 is $-(320+N_{DC})$:12:$-(176+N_{DC})$,
a subcarrier index range corresponding to an RU 27 is $-(152+N_{DC})$:12:$-(8+N_{DC})$,
a subcarrier index range corresponding to an RU 28 is $(5+N_{DC})$:12:$(149+N_{DC})$,
a subcarrier index range corresponding to an RU 29 is $(173+N_{DC})$:12:$(317+N_{DC})$,
a subcarrier index range corresponding to an RU 30 is $(341+N_{DC})$:12:$(485+N_{DC})$,
indexes corresponding to 4 null subcarriers that exist between the RU 25 and the RU are: $-(332+N_{DC})$, $-(164+N_{DC})$, $(161+N_{DC})$, and $(329+N_{DC})$,
a subcarrier index range corresponding to an RU 31 is $-(487+N_{DC})$:12:$-(343+N_{DC})$,
a subcarrier index range corresponding to an RU 32 is $-(319+N_{DC})$:12:$-(175+N_{DC})$,
a subcarrier index range corresponding to an RU 33 is $-(151+N_{DC})$:12:$-(7+N_{DC})$,
a subcarrier index range corresponding to an RU 34 is $(6+N_{DC})$:12:$(150+N_{DC})$,
a subcarrier index range corresponding to an RU 35 is $(174+N_{DC})$:12:$(318+N_{DC})$,
a subcarrier index range corresponding to an RU 36 is $(342+N_{DC})$:12:$(486+N_{DC})$,
indexes corresponding to 4 null subcarriers that exist between the RU 31 and the RU 36 are: $-(331+N_{DC})$, $-(163+N_{DC})$, $(162+N_{DC})$, and $(330+N_{DC})$, a subcarrier index range corresponding to an RU 37 is $-(486+N_{DC}):12:-(342+N_{DC})$,
a subcarrier index range corresponding to an RU 38 is $-(318+N_{DC}):12:-(174+N_{DC})$,
a subcarrier index range corresponding to an RU 39 is $-(150+N_{DC}):12:-(6+N_{DC})$,
a subcarrier index range corresponding to an RU 40 is $(7+N_{DC}):12:(151+N_{DC})$,
a subcarrier index range corresponding to an RU 41 is $(175+N_{DC}):12:(319+N_{DC})$,
a subcarrier index range corresponding to an RU 42 is $(343+N_{DC}):12:(487+N_{DC})$,
indexes corresponding to 4 null subcarriers that exist between the RU 37 and the RU 42 are: $-(330+N_{DC})$, $-(162+N_{DC})$, $(163+N_{DC})$, and $(331+N_{DC})$,
a subcarrier index range corresponding to an RU 43 is $-(485+N_{DC}):12:-(341+N_{DC})$,
a subcarrier index range corresponding to an RU 44 is $-(317+N_{DC}):12:-(173+N_{DC})$,
a subcarrier index range corresponding to an RU 45 is $-(149+N_{DC}):12:-(5+N_{DC})$,
a subcarrier index range corresponding to an RU 46 is $(8+N_{DC}):12:(152+N_{DC})$,
a subcarrier index range corresponding to an RU 47 is $(176+N_{DC}):12:(320+N_{DC})$,
a subcarrier index range corresponding to an RU 48 is $(344+N_{DC}):12:(488+N_{DC})$,
indexes corresponding to 4 null subcarriers that exist between the RU 43 and the RU 48 are: $-(329+N_{DC})$, $-(161+N_{DC})$, $(164+N_{DC})$, and $(332+N_{DC})$,
a subcarrier index range corresponding to an RU 49 is $-(484+N_{DC}):12:-(340+N_{DC})$,
a subcarrier index range corresponding to an RU 50 is $-(316+N_{DC}):12:-(172+N_{DC})$,
a subcarrier index range corresponding to an RU 51 is $-(148+N_{DC}):12:-(4+N_{DC})$,
a subcarrier index range corresponding to an RU 52 is $(9+N_{DC}):12:(153+N_{DC})$,
a subcarrier index range corresponding to an RU 53 is $(177+N_{DC}):12:(321+N_{DC})$,
a subcarrier index range corresponding to an RU 54 is $(345+N_{DC}):12:(489+N_{DC})$,
indexes corresponding to 4 null subcarriers that exist between the RU 49 and the RU 54 are: $-(328+N_{DC})$, $-(160+N_{DC})$, $(165+N_{DC})$, and $(333+N_{DC})$,
a subcarrier index range corresponding to an RU 55 is $-(483+N_{DC}):12:-(339+N_{DC})$,
a subcarrier index range corresponding to an RU 56 is $-(315+N_{DC}):12:-(171+N_{DC})$,
a subcarrier index range corresponding to an RU 57 is $-(147+N_{DC}):12:-(3+N_{DC})$,
a subcarrier index range corresponding to an RU 58 is $(10+N_{DC}):12:(154+N_{DC})$,
a subcarrier index range corresponding to an RU 59 is $(178+N_{DC}):12:(322+N_{DC})$,
a subcarrier index range corresponding to an RU 60 is $(346+N_{DC}):12:(490+N_{DC})$,
indexes corresponding to 4 null subcarriers that exist between the RU 55 and the RU 60 are: $-(327+N_{DC})$, $-(159+N_{DC})$, $(166+N_{DC})$, and $(334+N_{DC})$,
a subcarrier index range corresponding to an RU 61 is $-(482+N_{DC}):12:-(338+N_{DC})$,
a subcarrier index range corresponding to an RU 62 is $-(314+N_{DC}):12:-(170+N_{DC})$,
a subcarrier index range corresponding to an RU 63 is $-(146+N_{DC}):12:-(2+N_{DC})$,
a subcarrier index range corresponding to an RU 64 is $(11+N_{DC}):12:(155+N_{DC})$,
a subcarrier index range corresponding to an RU 65 is $(179+N_{DC}):12:(323+N_{DC})$,
a subcarrier index range corresponding to an RU 66 is $(347+N_{DC}):12:(491+N_{DC})$,
indexes corresponding to 4 null subcarriers that exist between the RU 61 and the RU 66 are: $-(326+N_{DC})$, $-(158+N_{DC})$, $(167+N_{DC})$, and $(335+N_{DC})$,
a subcarrier index range corresponding to an RU 67 is $-(481+N_{DC}):12:-(337+N_{DC})$,
a subcarrier index range corresponding to an RU 68 is $-(313+N_{DC}):12:-(169+N_{DC})$,
a subcarrier index range corresponding to an RU 69 is $-(145+N_{DC}):12:-(1+N_{DC})$,
a subcarrier index range corresponding to an RU 70 is $(12+N_{DC}):12:(156+N_{DC})$,
a subcarrier index range corresponding to an RU 71 is $(180+N_{DC}):12:(324+N_{DC})$,
a subcarrier index range corresponding to an RU 72 is $(348+N_{DC}):12:(492+N_{DC})$, and
indexes corresponding to 4 null subcarriers that exist between the RU 67 and the RU 72 are: $-(325+N_{DC})$, $-(157+N_{DC})$, $(168+N_{DC})$, and $(336+N_{DC})$ ; or an 80 MHz bandwidth includes 36 26-tone RUs, and subcarrier index ranges corresponding to the 36 26-tone RUs are shown below, where :12: indicates that an index difference between a latter subcarrier and a former subcarrier in two adjacent subcarriers is 12: subcarrier index ranges corresponding to an RU 1 are $-(492+N_{DC}):12:-(348+N_{DC})$ and $(324+N_{DC}):12:-(180+N_{DC})$,
subcarrier index ranges corresponding to an RU 2 are $-(156+N_{DC}):12:-(12+N_{DC})$ and $(1+N_{DC}):12:(145+N_{DC})$,
subcarrier index ranges corresponding to an RU 3 are $(169+N_{DC}):12:(313+N_{DC})$ and $(337+N_{DC}):12:(481+N_{DC})$,
indexes corresponding to 4 null subcarriers that exist in the RU 1 to the RU 3 are: $-(336+N_{DC})$, $-(168+N_{DC})$, $(157+N_{DC})$, and $(325+N_{DC})$,
subcarrier index ranges corresponding to an RU 4 are $-(491+N_{DC}):12:-(347+N_{DC})$ and $-(323+N_{DC}):12:-(179+N_{DC})$,
subcarrier index ranges corresponding to an RU 5 are $-(155+N_{DC}):12:-(11+N_{DC})$ and $(2+N_{DC}):12:(146+N_{DC})$,
subcarrier index ranges corresponding to an RU 6 are $(170+N_{DC}):12:(314+N_{DC})$ and $(338+N_{DC}):12:(482+N_{DC})$,
indexes corresponding to 4 null subcarriers that exist in the RU 1 to the RU 3 are: $-(335+N_{DC})$, $-(167+N_{DC})$, $(158+N_{DC})$, and $(326+N_{DC})$,
subcarrier index ranges corresponding to an RU 7 are $-(490+N_{DC}):12:-(346+N_{DC})$ and $-(322+N_{DC}):12:-(178+N_{DC})$,
subcarrier index ranges corresponding to an RU 8 are $-(154+N_{DC}):12:-(10+N_{DC})$ and $(3+N_{DC}):12:(147+N_{DC})$,
subcarrier index ranges corresponding to an RU 9 are $(171+N_{DC}):12:(315+N_{DC})$ and $(339+N_{DC}):12:(483+N_{DC})$,
indexes corresponding to 4 null subcarriers that exist in the RU 7 to the RU 9 are: $-(334+N_{DC})$, $-(166+N_{DC})$, $(159+N_{DC})$, and $(327+N_{DC})$,
subcarrier index ranges corresponding to an RU 10 are $-(489+N_{DC}):12:-(345+N_{DC})$ and $-(321+N_{DC}):12:-(178+N_{DC})$, subcarrier index ranges corresponding to an RU 11 are $-(153+N_{DC})$:12:$-(9+N_{DC})$ and $(4+N_{DC})$:12:$(148+N_{DC})$, subcarrier index ranges corresponding to an RU 12 are $(172+N_{DC})$:12:$(316+N_{DC})$ and $(340+N_{DC})$:12:$(484+N_{DC})$, indexes corresponding to 4 null subcarriers that exist in the RU 10 to the RU 12 are: $-(333+N_{DC})$, $-(165+N_{DC})$, $(160+N_{DC})$, and $(328+N_{DC})$, subcarrier index ranges corresponding to an RU 13 are $-(488+N_{DC})$:12:$-(344+N_{DC})$ and $-(320+N_{DC})$:12:$-(176+N_{DC})$, subcarrier index ranges corresponding to an RU 14 are $-(152+N_{DC})$:12:$-(8+N_{DC})$ and $(5+N_{DC})$:12:$(149+N_{DC})$, subcarrier index ranges corresponding to an RU 15 are $(173+N_{DC})$:12:$(317+N_{DC})$ and $(341+N_{DC})$:12:$(485+N_{DC})$, indexes corresponding to 4 null subcarriers that exist in the RU 13 to the RU 15 are: $-(332+N_{DC})$, $-(164+N_{DC})$, $(161+N_{DC})$, and $(329+N_{DC})$, subcarrier index ranges corresponding to an RU 16 are $-(487+N_{DC})$:12:$-(343+N_{DC})$ and $-(319+N_{DC})$:12:$-(175+N_{DC})$, subcarrier index ranges corresponding to an RU 17 are $-(151+N_{DC})$:12:$-(7+N_{DC})$ and $(6+N_{DC})$:12:$(150+N_{DC})$, subcarrier index ranges corresponding to an RU 18 are $(174+N_{DC})$:12:$(318+N_{DC})$ and $(342+N_{DC})$:12:$(486+N_{DC})$, indexes corresponding to 4 null subcarriers that exist in the RU 16 to the RU 18 are: $-(331+N_{DC})$, $-(163+N_{DC})$, $(162+N_{DC})$, and $(330+N_{DC})$, subcarrier index ranges corresponding to an RU 19 are $-(486+N_{DC})$:12:$-(342+N_{DC})$ and $-(318+N_{DC})$:12:$-(174+N_{DC})$, subcarrier index ranges corresponding to an RU 20 are $-(150+N_{DC})$:12:$-(6+N_{DC})$ and $(7+N_{DC})$:12:$(151+N_{DC})$, subcarrier index ranges corresponding to an RU 21 are $(175+N_{DC})$:12:$(319+N_{DC})$ and $(343+N_{DC})$:12:$(487+N_{DC})$, indexes corresponding to 4 null subcarriers that exist in the RU 19 to the RU 21 are: $-(330+N_{DC})$, $-(162+N_{DC})$, $(163+N_{DC})$, and $(331+N_{DC})$, subcarrier index ranges corresponding to an RU 22 are $-(485+N_{DC})$:12:$-(341+N_{DC})$ and $-(317+N_{DC})$:12:$-(173+N_{DC})$, subcarrier index ranges corresponding to an RU 23 are $-(149+N_{DC})$:12:$-(5+N_{DC})$ and $(8+N_{DC})$:12:$(152+N_{DC})$, subcarrier index ranges corresponding to an RU 24 are $(176+N_{DC})$:12:$(320+N_{DC})$ and $(344+N_{DC})$:12:$(488+N_{DC})$, indexes corresponding to 4 null subcarriers that exist in the RU 22 to the RU 24 are: $-(329+N_{DC})$, $-(161+N_{DC})$, $(164+N_{DC})$, and $(332+N_{DC})$, subcarrier index ranges corresponding to an RU 25 are $-(484+N_{DC})$:12:$-(340+N_{DC})$ and $-(316+N_{DC})$:12:$-(172+N_{DC})$, subcarrier index ranges corresponding to an RU 26 are $-(148+N_{DC})$:12:$-(4+N_{DC})$ and $(9+N_{DC})$:12:$(153+N_{DC})$, subcarrier index ranges corresponding to an RU 27 are $(177+N_{DC})$:12:$(321+N_{DC})$ and $(345+N_{DC})$:12:$(489+N_{DC})$, indexes corresponding to 4 null subcarriers that exist in the RU 25 to the RU 27 are: $-(328+N_{DC})$, $-(160+N_{DC})$, $(165+N_{DC})$, and $(333+N_{DC})$, subcarrier index ranges corresponding to an RU 28 are $-(483+N_{DC})$:12:$-(339+N_{DC})$ and $-(315+N_{DC})$:12:$-(171+N_{DC})$, subcarrier index ranges corresponding to an RU 29 are $-(147+N_{DC})$:12:$-(3+N_{DC})$ and $(10+N_{DC})$:12:$(154+N_{DC})$, subcarrier index ranges corresponding to an RU 30 are $(178+N_{DC})$:12:$(322+N_{DC})$ and $(346+N_{DC})$:12:$(490+N_{DC})$, indexes corresponding to 4 null subcarriers that exist in the RU 28 to the RU 30 are: $-(327+N_{DC})$, $-(159+N_{DC})$, $(166+N_{DC})$, and $(334+N_{DC})$, subcarrier index ranges corresponding to an RU 31 are $-(482+N_{DC})$:12:$-(338+N_{DC})$ and $-(314+N_{DC})$:12:$-(170+N_{DC})$, subcarrier index ranges corresponding to an RU 32 are $-(146+N_{DC})$:12:$-(2+N_{DC})$ and $(11+N_{DC})$:12:$(155+N_{DC})$, subcarrier index ranges corresponding to an RU 33 are $(179+N_{DC})$:12:$(323+N_{DC})$ and $(347+N_{DC})$:12:$(491+N_{DC})$, indexes corresponding to 4 null subcarriers that exist in the RU 31 to the RU 33 are: $-(326+N_{DC})$, $-(158+N_{DC})$, $(167+N_{DC})$, and $(335+N_{DC})$, subcarrier index ranges corresponding to an RU 34 are $-(481+N_{DC})$:12:$-(337+N_{DC})$ and $-(313+N_{DC})$:12:$-(169+N_{DC})$, subcarrier index ranges corresponding to an RU 35 are $-(145+N_{DC})$:12:$-(1+N_{DC})$ and $(12+N_{DC})$:12:$(156+N_{DC})$, subcarrier index ranges corresponding to an RU 36 are $(180+N_{DC})$:12:$(324+N_{DC})$ and $(348+N_{DC})$:12:$(492+N_{DC})$, and indexes corresponding to 4 null subcarriers that exist in the RU 34 to the RU 36 are: $-(325+N_{DC})$, $-(157+N_{DC})$, $(168+N_{DC})$, and $(336+N_{DC})$; or an 80 MHz bandwidth includes 24 52-tone RUs, and subcarrier index ranges corresponding to the 24 52-tone RUs are shown below, where :12: indicates that an index difference between a latter subcarrier and a former subcarrier in two adjacent subcarriers is 12:

subcarrier index ranges corresponding to an RU 1 are $-(492+N_{DC})$:12:$-(348+N_{DC})$, $-(324+N_{DC})$:12:$-(180+N_{DC})$, $-(156+N_{DC})$:12:$-(12+N_{DC})$, and $(1+N_{DC})$:12:$(145+N_{DC})$, indexes corresponding to 2 null subcarriers that exist in the RU 1 are: $-(336+N_{DC})$ and $-(168+N_{DC})$, subcarrier index ranges corresponding to an RU 2 are $-(491+N_{DC})$:12:$-(347+N_{DC})$, $-(323+N_{DC})$:12:$-(179+N_{DC})$, $-(155+N_{DC})$:12:$-(11+N_{DC})$, and $(2+N_{DC})$:12:$(146+N_{DC})$, indexes corresponding to 2 null subcarriers that exist in the RU 2 are: $-(335+N_{DC})$ and $-(167+N_{DC})$, subcarrier index ranges corresponding to an RU 3 are $-(490+N_{DC})$:12:$-(346+N_{DC})$, $-(322+N_{DC})$:12:$-(178+N_{DC})$, $-(154+N_{DC})$:12:$-(10+N_{DC})$, and $(3+N_{DC})$:12:$(147+N_{DC})$, indexes corresponding to 2 null subcarriers that exist in the RU 3 are: $-(334+N_{DC})$ and $-(166+N_{DC})$, subcarrier index ranges corresponding to an RU 4 are $-(489+N_{DC})$:12:$-(345+N_{DC})$, $-(321+N_{DC})$:12:$-(178+N_{DC})$, $-(153+N_{DC})$:12:$-(9+N_{DC})$, and $(4+N_{DC})$:12:$(148+N_{DC})$, indexes corresponding to 2 null subcarriers that exist in the RU 4 are: −(333+$N_{DC}$) and −(165+$N_{DC}$), subcarrier index ranges corresponding to an RU 5 are −(488+$N_{DC}$):12:−(344+$N_{DC}$), −(320+$N_{DC}$):12:−(176+$N_{DC}$), −(152+$N_{DC}$):12:−(8+$N_{DC}$), and (5+$N_{DC}$):12:(149+$N_{DC}$), indexes corresponding to 2 null subcarriers that exist in the RU 5 are: −(332+$N_{DC}$) and −(164+$N_{DC}$), subcarrier index ranges corresponding to an RU 6 are −(487+$N_{DC}$):12:−(343+$N_{DC}$), −(319+$N_{DC}$):12:−(175+$N_{DC}$), −(151+$N_{DC}$):12:−(7+$N_{DC}$), and (6+$N_{DC}$):12:(150+$N_{DC}$), indexes corresponding to 2 null subcarriers that exist in the RU 6 are: −(331+$N_{DC}$) and −(163+$N_{DC}$), subcarrier index ranges corresponding to an RU 7 are −(486+$N_{DC}$):12:−(342+$N_{DC}$), −(318+$N_{DC}$):12:−(174+$N_{DC}$), −(150+$N_{DC}$):12:−(6+$N_{DC}$), and (7+$N_{DC}$):12:(151+$N_{DC}$), indexes corresponding to 2 null subcarriers that exist in the RU 7 are: −(330+$N_{DC}$) and −(162+$N_{DC}$), subcarrier index ranges corresponding to an RU 8 are −(485+$N_{DC}$):12:−(341+$N_{DC}$), −(317+$N_{DC}$):12:−(173+$N_{DC}$), −(149+$N_{DC}$):12:−(5+$N_{DC}$), and (8+$N_{DC}$):12:(152+$N_{DC}$), indexes corresponding to 2 null subcarriers that exist in the RU 8 are: −(329+$N_{DC}$) and −(161+$N_{DC}$), subcarrier index ranges corresponding to an RU 9 are −(484+$N_{DC}$):12:−(340+$N_{DC}$), −(316+$N_{DC}$):12:−(172+$N_{DC}$), −(148+$N_{DC}$):12:−(4+$N_{DC}$), and (9+$N_{DC}$):12:(153+$N_{DC}$), indexes corresponding to 2 null subcarriers that exist in the RU 9 are: −(328+$N_{DC}$) and −(160+$N_{DC}$), subcarrier index ranges corresponding to an RU 10 are −(483+$N_{DC}$):12:−(339+$N_{DC}$), −(315+$N_{DC}$):12:−(171+$N_{DC}$), −(147+$N_{DC}$):12:−(3+$N_{DC}$), and (10+$N_{DC}$):12:(154+$N_{DC}$), indexes corresponding to 2 null subcarriers that exist in the RU 10 are: −(327+$N_{DC}$) and −(159+$N_{DC}$), subcarrier index ranges corresponding to an RU 11 are −(482+$N_{DC}$):12:−(338+$N_{DC}$), −(314+$N_{DC}$):12:−(170+$N_{DC}$), −(146+$N_{DC}$):12:−(2+$N_{DC}$), and (11+$N_{DC}$):12:(155+$N_{DC}$), indexes corresponding to 2 null subcarriers that exist in the RU 11 are: −(326+$N_{DC}$) and subcarrier index ranges corresponding to an RU 12 are −(481+$N_{DC}$):12:−(337+$N_{DC}$), −(313+$N_{DC}$):12:−(169+$N_{DC}$), −(145+$N_{DC}$):12:−(1+$N_{DC}$), and (12+$N_{DC}$):12:(156+$N_{DC}$), indexes corresponding to 2 null subcarriers that exist in the RU 12 are: −(325+$N_{DC}$) and −(157+$N_{DC}$), −(158+$N_{DC}$), subcarrier index ranges corresponding to an RU 13 are −(156+$N_{DC}$):12:−(12+$N_{DC}$), (1+$N_{DC}$):12:(145+$N_{DC}$), (169+$N_{DC}$):12:(313+$N_{DC}$), and (337+$N_{DC}$):12:(481+$N_{DC}$), indexes corresponding to 2 null subcarriers that exist in the RU 13 are: (157+$N_{DC}$) and (325+$N_{DC}$), subcarrier index ranges corresponding to an RU 14 are −(155+$N_{DC}$):12:−(11+$N_{DC}$), (2+$N_{DC}$):12:(146+$N_{DC}$), (170+$N_{DC}$):12:(314+$N_{DC}$), and (338+$N_{DC}$):12:(482+$N_{DC}$), indexes corresponding to 2 null subcarriers that exist in the RU 14 are: (158+$N_{DC}$) and (326+$N_{DC}$), subcarrier index ranges corresponding to an RU 15 are −(154+$N_{DC}$):12:−(10+$N_{DC}$), (3+$N_{DC}$):12:(147+$N_{DC}$), (171+$N_{DC}$):12:(315+$N_{DC}$), and (339+$N_{DC}$):12:(483+$N_{DC}$), indexes corresponding to 2 null subcarriers that exist in the RU 15 are: (159+$N_{DC}$) and (327+$N_{DC}$), subcarrier index ranges corresponding to an RU 16 are −(153+$N_{DC}$):12:−(9+$N_{DC}$), (4+$N_{DC}$):12:(148+$N_{DC}$), (172+$N_{DC}$):12:(316+$N_{DC}$), and (340+$N_{DC}$):12:(484+$N_{DC}$), indexes corresponding to 2 null subcarriers that exist in the RU 16 are: (160+$N_{DC}$) and (328+$N_{DC}$), subcarrier index ranges corresponding to an RU 17 are −(152+$N_{DC}$):12:−(8+$N_{DC}$), (5+$N_{DC}$):12:(149+$N_{DC}$), (173+$N_{DC}$):12:(317+$N_{DC}$), and (341+$N_{DC}$):12:(485+$N_{DC}$), indexes corresponding to 2 null subcarriers that exist in the RU 17 are: (161+$N_{DC}$) and (329+$N_{DC}$), subcarrier index ranges corresponding to an RU 18 are −(151+$N_{DC}$):12:−(7+$N_{DC}$), (6+$N_{DC}$):12:(150+$N_{DC}$), (174+$N_{DC}$):12:(318+$N_{DC}$), and (342+$N_{DC}$):12:(486+$N_{DC}$), indexes corresponding to 2 null subcarriers that exist in the RU 18 are: (162+$N_{DC}$) and (330+$N_{DC}$), subcarrier index ranges corresponding to an RU 19 are −(150+$N_{DC}$):12:−(6+$N_{DC}$), (7+$N_{DC}$):12:(151+$N_{DC}$), (175+$N_{DC}$):12:(319+$N_{DC}$), and (343+$N_{DC}$):12:(487+$N_{DC}$), indexes corresponding to 2 null subcarriers that exist in the RU 19 are: (163+$N_{DC}$) and (331+$N_{DC}$), subcarrier index ranges corresponding to an RU 20 are −(149+$N_{DC}$):12:−(5+$N_{DC}$), (8+$N_{DC}$):12:(152+$N_{DC}$), (176+$N_{DC}$):12:(320+$N_{DC}$), and (344+$N_{DC}$):12:(488+$N_{DC}$), indexes corresponding to 2 null subcarriers that exist in the RU 20 are: (164+$N_{DC}$) and (332+$N_{DC}$), subcarrier index ranges corresponding to an RU 21 are −(148+$N_{DC}$):12:−(4+$N_{DC}$), (9+$N_{DC}$):12:(153+$N_{DC}$), (177+$N_{DC}$):12:(321+$N_{DC}$), and (345+$N_{DC}$):12:(489+$N_{DC}$), indexes corresponding to 2 null subcarriers that exist in the RU 21 are: (165+$N_{DC}$) and (333+$N_{DC}$), subcarrier index ranges corresponding to an RU 22 are −(147+$N_{DC}$):12:−(3+$N_{DC}$), (10+$N_{DC}$):12:(154+$N_{DC}$), (178+$N_{DC}$):12:(322+$N_{DC}$), and (346+$N_{DC}$):12:(490+$N_{DC}$), indexes corresponding to 2 null subcarriers that exist in the RU 22 are: (166+$N_{DC}$) and (334+$N_{DC}$), subcarrier index ranges corresponding to an RU 23 are −(146+$N_{DC}$):12:−(2+$N_{DC}$), (11+$N_{DC}$):12:(155+$N_{DC}$), (179+$N_{DC}$):12:(323+$N_{DC}$), and (347+$N_{DC}$):12:(491+$N_{DC}$), indexes corresponding to 2 null subcarriers that exist in the RU 23 are: (167+$N_{DC}$) and (335+$N_{DC}$), subcarrier index ranges corresponding to an RU 24 are −(145+$N_{DC}$):12:−(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 2 null subcarriers that exist in the RU 24 are: (168+$N_{DC}$) and (336+$N_{DC}$); or an 80 MHz bandwidth includes 12 52+26-tone RUs, and subcarrier index ranges corresponding to the 12 52+26-tone RUs are shown below, where :12: indicates that an index difference between a latter subcarrier and a former subcarrier in two adjacent subcarriers is 12:

subcarrier index ranges corresponding to an RU 1 are −(492+$N_{DC}$):12:−(348+$N_{DC}$), −(324+$N_{DC}$):12:−(180+$N_{DC}$), (156+$N_{DC}$):12:−(12+$N_{DC}$), (1+$N_{DC}$):12:(145+$N_{DC}$), (169+$N_{DC}$):12:(313+$N_{DC}$), and (337+$N_{DC}$):12:(481+$N_{DC}$), indexes corresponding to 4 null subcarriers that exist in the RU 1 are: –(336+$N_{DC}$), –(168+$N_{DC}$), (157+$N_{DC}$), and (325+$N_{DC}$), subcarrier index ranges corresponding to an RU 2 are –(491+$N_{DC}$):12:–(347+$N_{DC}$), –(323+$N_{DC}$):12:–(179+$N_{DC}$), –(155+$N_{DC}$):12:–(11+$N_{DC}$), (2+$N_{DC}$):12:(146+$N_{DC}$), (170+$N_{DC}$):12:(314+$N_{DC}$), and (338+$N_{DC}$):12:(482+$N_{DC}$), indexes corresponding to 4 null subcarriers that exist in the RU 2 are: –(335+$N_{DC}$), –(167+$N_{DC}$), (158+$N_{DC}$), and (326+$N_{DC}$), subcarrier index ranges corresponding to an RU 3 are –(490+$N_{DC}$):12:–(346+$N_{DC}$), –(322+$N_{DC}$):12:–(178+$N_{DC}$), (154+$N_{DC}$):12:–(10+$N_{DC}$), (3+$N_{DC}$):12:(147+$N_{DC}$), (171+$N_{DC}$):12:(315+$N_{DC}$), and (339+$N_{DC}$):12:(483+$N_{DC}$), indexes corresponding to 4 null subcarriers that exist in the RU 3 are: –(334+$N_{DC}$), –(166+$N_{DC}$), (159+$N_{DC}$), and (327+$N_{DC}$), subcarrier index ranges corresponding to an RU 4 are –(489+$N_{DC}$):12:–(345+$N_{DC}$), –(321+$N_{DC}$):12:–(178+$N_{DC}$), (153+$N_{DC}$):12:–(9+$N_{DC}$), (4+$N_{DC}$):12:(148+$N_{DC}$), (172+$N_{DC}$):12:(316+$N_{DC}$), and (340+$N_{DC}$):12:(484+$N_{DC}$), indexes corresponding to 4 null subcarriers that exist in the RU 4 comprises: –(333+$N_{DC}$) and –(165+$N_{DC}$), subcarrier index ranges corresponding to an RU 5 are –(488+$N_{DC}$):12:–(344+$N_{DC}$), –(320+$N_{DC}$):12:–(176+$N_{DC}$), –(152+$N_{DC}$):12:–(8+$N_{DC}$), and (5+$N_{DC}$):12:(149+$N_{DC}$), indexes corresponding to 4 null subcarriers that exist in the RU 5 are: –(333+$N_{DC}$), –(165+$N_{DC}$), (160+$N_{DC}$), and (328+$N_{DC}$), subcarrier index ranges corresponding to an RU 6 are –(487+$N_{DC}$):12:–(343+$N_{DC}$), –(319+$N_{DC}$):12:–(175+$N_{DC}$), –(151+$N_{DC}$):12:–(7+$N_{DC}$), (6+$N_{DC}$):12:(150+$N_{DC}$), (174+$N_{DC}$):12:(318+$N_{DC}$), and (342+$N_{DC}$):12:(486+$N_{DC}$), indexes corresponding to 4 null subcarriers that exist in the RU 6 are: –(331+$N_{DC}$), –(163+$N_{DC}$), (162+$N_{DC}$), and (330+$N_{DC}$), subcarrier index ranges corresponding to an RU 7 are –(486+$N_{DC}$):12:–(342+$N_{DC}$), –(318+$N_{DC}$):12:–(174+$N_{DC}$), –(150+$N_{DC}$):12:–(6+$N_{DC}$), (7+$N_{DC}$):12:(151+$N_{DC}$), (175+$N_{DC}$):12:(319+$N_{DC}$), and (343+$N_{DC}$):12:(487+$N_{DC}$), indexes corresponding to 4 null subcarriers that exist in the RU 7 are: –(330+$N_{DC}$), –(162+$N_{DC}$), (163+$N_{DC}$), and (331+$N_{DC}$), subcarrier index ranges corresponding to an RU 8 are –(485+$N_{DC}$):12:–(341+$N_{DC}$), –(317+$N_{DC}$):12:–(173+$N_{DC}$), –(149+$N_{DC}$):12:–(5+$N_{DC}$), (8+$N_{DC}$):12:(152+$N_{DC}$), (176+$N_{DC}$):12:(320+$N_{DC}$), and (344+$N_{DC}$):12:(488+$N_{DC}$), indexes corresponding to 4 null subcarriers that exist in the RU 8 are: –(329+$N_{DC}$), –(161+$N_{DC}$), (164+$N_{DC}$), and (332+$N_{DC}$), subcarrier index ranges corresponding to an RU 9 are –(484+$N_{DC}$):12:–(340+$N_{DC}$), –(316+$N_{DC}$):12:–(172+$N_{DC}$), (148+$N_{DC}$):12:–(4+$N_{DC}$), (9+$N_{DC}$):12:(153+$N_{DC}$), (177+$N_{DC}$):12:(321+$N_{DC}$), and (345+$N_{DC}$):12:(489+$N_{DC}$), indexes corresponding to 4 null subcarriers that exist in the RU 9 are: –(328+$N_{DC}$), –(160+$N_{DC}$), (165+$N_{DC}$), and (333+$N_{DC}$), subcarrier index ranges corresponding to an RU 10 are –(483+$N_{DC}$):12:–(339+$N_{DC}$), –(315+$N_{DC}$):12:–(171+$N_{DC}$), –(147+$N_{DC}$):12:–(3+$N_{DC}$), (10+$N_{DC}$):12:(154+$N_{DC}$), (178+$N_{DC}$):12:(322+$N_{DC}$), and (346+$N_{DC}$):12:(490+$N_{DC}$), indexes corresponding to 4 null subcarriers that exist in the RU 10 are: –(327+$N_{DC}$), –(159+$N_{DC}$), (166+$N_{DC}$), and (334+$N_{DC}$), subcarrier index ranges corresponding to an RU 11 are –(482+$N_{DC}$):12:–(338+$N_{DC}$), –(314+$N_{DC}$):12:–(170+$N_{DC}$), (146+$N_{DC}$):12:–(2+$N_{DC}$), (11+$N_{DC}$):12:(155+$N_{DC}$), (179+$N_{DC}$):12:(323+$N_{DC}$), and (347+$N_{DC}$):12:(491+$N_{DC}$), indexes corresponding to 4 null subcarriers that exist in the RU 11 are: –(326+$N_{DC}$), –(158+$N_{DC}$), (167+$N_{DC}$), and (335+$N_{DC}$), subcarrier index ranges corresponding to an RU 12 are –(481+$N_{DC}$):12:–(337+$N_{DC}$), –(313+$N_{DC}$):12:–(169+$N_{DC}$), (145+$N_{DC}$):12:–(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 4 null subcarriers that exist in the RU 12 are: –(325+$N_{DC}$), –(157+$N_{DC}$), (168+$N_{DC}$), and (336+$N_{DC}$); or an 80 MHz bandwidth includes 12 106-tone RUs, and subcarrier index ranges corresponding to the 12 106-tone RUs are shown below, where :12: indicates that an index difference between a latter subcarrier and a former subcarrier in two adjacent subcarriers is 12:

subcarrier index ranges corresponding to an RU 1 are –(492+$N_{DC}$):12:–(12+$N_{DC}$), (1+$N_{DC}$):12:(145+$N_{DC}$), –(491+$N_{DC}$):12:–(347+$N_{DC}$), –(323+$N_{DC}$):12:–(179+$N_{DC}$), –(155+$N_{DC}$):12:–(11+$N_{DC}$), and (2+$N_{DC}$):12:(146+$N_{DC}$), indexes corresponding to 2 null subcarriers that exist in the RU 1 are: –(335+$N_{DC}$) and –(167+$N_{DC}$), subcarrier index ranges corresponding to an RU 2 are –(490+$N_{DC}$):12–(10+$N_{DC}$), (3+$N_{DC}$):12:(147+$N_{DC}$), –(489+$N_{DC}$):12:–(345+$N_{DC}$), –(321+$N_{DC}$):12:–(178+$N_{DC}$), –(153+$N_{DC}$):12:–(9+$N_{DC}$), and (4+$N_{DC}$):12:(148+$N_{DC}$), indexes corresponding to 2 null subcarriers that exist in the RU 2 are: –(333+$N_{DC}$) and –(165+$N_{DC}$), subcarrier index ranges corresponding to an RU 3 are –(488+$N_{DC}$):12–(8+$N_{DC}$), (5+$N_{DC}$):12:(149+$N_{DC}$), –(487+$N_{DC}$):12:–(343+$N_{DC}$), –(319+$N_{DC}$):12:–(175+$N_{DC}$), –(151+$N_{DC}$):12:–(7+$N_{DC}$), and (6+$N_{DC}$):12:(150+$N_{DC}$), indexes corresponding to 2 null subcarriers that exist in the RU 3 are: –(331+$N_{DC}$) and –(163+$N_{DC}$), subcarrier index ranges corresponding to an RU 4 are –(486+$N_{DC}$):12–(6+$N_{DC}$), (7+$N_{DC}$):12:(151+$N_{DC}$), –(485+$N_{DC}$):12:–(341+$N_{DC}$), –(317+$N_{DC}$):12:–(173+$N_{DC}$), –(149+$N_{DC}$):12:–(5+$N_{DC}$), and (8+$N_{DC}$):12:(152+$N_{DC}$), indexes corresponding to 2 null subcarriers that exist in the RU 4 are: –(329+$N_{DC}$) and (161+$N_{DC}$), subcarrier index ranges corresponding to an RU 5 are –(484+$N_{DC}$):12–(4+$N_{DC}$), (9+$N_{DC}$):12:(153+$N_{DC}$), –(483+$N_{DC}$):12:–(339+$N_{DC}$), –(315+$N_{DC}$):12:–(171+$N_{DC}$), –(147+$N_{DC}$):12:–(3+$N_{DC}$), and (10+$N_{DC}$):12:(154+$N_{DC}$), indexes corresponding to 2 null subcarriers that exist in the RU 5 are: –(327+$N_{DC}$) and –(159+$N_{DC}$), subcarrier index ranges corresponding to an RU 6 are –(482+$N_{DC}$):12:–(2+$N_{DC}$), (11+$N_{DC}$):12:(155+$N_{DC}$), –(481+$N_{DC}$):12:–(337+$N_{DC}$), –(313+$N_{DC}$):12:–(169+$N_{DC}$), –(145+$N_{DC}$):12:–(1+$N_{DC}$), and (12+$N_{DC}$):12:(156+$N_{DC}$), indexes corresponding to 2 null subcarriers that exist in the RU 6 are: $-(325+N_{DC})$ and $-(157+N_{DC})$, subcarrier index ranges corresponding to an RU 7 are $-(156+N_{DC})$:12:$-(12+N_{DC})$, $(1+N_{DC})$:12:$(481+N_{DC})$, $(155+N_{DC})$:12:$-(11+N_{DC})$, $(2+N_{DC})$:12:$(146+N_{DC})$, $(170+N_{DC})$:12:$(314+N_{DC})$, and $(338+N_{DC})$:12:$(482+N_{DC})$, indexes corresponding to 2 null subcarriers that exist in the RU 7 are: $(158+N_{DC})$ and $(326+N_{DC})$, subcarrier index ranges corresponding to an RU 8 are $-(154+N_{DC})$:12:$-(10+N_{DC})$, $(3+N_{DC})$:12:$(483+N_{DC})$, $(153+N_{DC})$:12:$-(9+N_{DC})$, $(4+N_{DC})$:12:$(148+N_{DC})$, $(172+N_{DC})$:12:$(316+N_{DC})$, and $(340+N_{DC})$:12:$(484+N_{DC})$, indexes corresponding to 2 null subcarriers that exist in the RU 8 are: $(160+N_{DC})$ and $(328+N_{DC})$, subcarrier index ranges corresponding to an RU 9 are $-(152+N_{DC})$:12:$-(8+N_{DC})$, $(5+N_{DC})$:12:$(485+N_{DC})$, $(151+N_{DC})$:12:$-(7+N_{DC})$, $(6+N_{DC})$:12:$(150+N_{DC})$, $(174+N_{DC})$:12:$(318+N_{DC})$, and $(342+N_{DC})$:12:$(486+N_{DC})$, indexes corresponding to 2 null subcarriers that exist in the RU 9 are: $(162+N_{DC})$ and $(330+N_{DC})$, subcarrier index ranges corresponding to an RU 10 are $-(150+N_{DC})$:12:$-(6+N_{DC})$, $(7+N_{DC})$:12:$(487+N_{DC})$, $(149+N_{DC})$:12:$-(5+N_{DC})$, $(8+N_{DC})$:12:$(152+N_{DC})$, $(176+N_{DC})$:12:$(320+N_{DC})$, and $(344+N_{DC})$:12:$(488+N_{DC})$, indexes corresponding to 2 null subcarriers that exist in the RU 10 are: $(164+N_{DC})$ and $(332+N_{DC})$, subcarrier index ranges corresponding to an RU 11 are $-(148+N_{DC})$:12:$-(4+N_{DC})$, $(9+N_{DC})$:12:$(489+N_{DC})$, $-(147+N_{DC})$:12:$-(3+N_{DC})$, $(10+N_{DC})$:12:$(154+N_{DC})$, $(178+N_{DC})$:12:$(322+N_{DC})$, and $(346+N_{DC})$:12:$(490+N_{DC})$, indexes corresponding to 2 null subcarriers that exist in the RU 11 are: $(166+N_{DC})$ and $(334+N_{DC})$, subcarrier index ranges corresponding to an RU 12 are $-(146+N_{DC})$:12:$-(2+N_{DC})$, $(11+N_{DC})$:12:$(491+N_{DC})$, $(145+N_{DC})$:12:$-(1+N_{DC})$, $(12+N_{DC})$:12:$(156+N_{DC})$, $(180+N_{DC})$:12:$(324+N_{DC})$, and $(348+N_{DC})$:12:$(492+N_{DC})$, and indexes corresponding to 2 null subcarriers that exist in the RU 12 are: $(168+N_{DC})$ and $(336+N_{DC})$; or an 80 MHz bandwidth includes 4 242-tone RUs, and subcarrier index ranges corresponding to the 4 242-tone RUs are shown below, where :12: indicates that an index difference between a latter subcarrier and a former subcarrier in two adjacent subcarriers is 12:

subcarrier index ranges corresponding to an RU 1 are $-(492+N_{DC})$:12:$-(12+N_{DC})$, $-(491+N_{DC})$:12:$-(23+N_{DC})$, $-(490+N_{DC})$:12:$-(22+N_{DC})$, $(13+N_{DC})$:12:$(481+N_{DC})$, $(14+N_{DC})$:12:$(482+N_{DC})$, and $(3+N_{DC})$:12:$(483+N_{DC})$, subcarrier index ranges corresponding to an RU 2 are $-(489+N_{DC})$:12:$-(9+N_{DC})$, $-(488+N_{DC})$:12:$-(20+N_{DC})$, $-(487+N_{DC})$:12:$-(19+N_{DC})$, $(16+N_{DC})$:12:$(484+N_{DC})$, $(17+N_{DC})$:12:$(485+N_{DC})$, and $(6+N_{DC})$:12:$(486+N_{DC})$, subcarrier index ranges corresponding to an RU 3 are $-(486+N_{DC})$:12:$-(6+N_{DC})$, $-(485+N_{DC})$:12:$-(17+N_{DC})$, $-(484+N_{DC})$:12:$-(16+N_{DC})$, $(19+N_{DC})$:12:$(487+N_{DC})$, $(20+N_{DC})$:12:$(488+N_{DC})$, and $(9+N_{DC})$:12:$(489+N_{DC})$, and subcarrier index ranges corresponding to an RU 4 are $-(483+N_{DC})$:12:$-(3+N_{DC})$, $-(482+N_{DC})$:12:$-(14+N_{DC})$, $-(481+N_{DC})$:12:$-(13+N_{DC})$, $(22+N_{DC})$:12:$(490+N_{DC})$, $(23+N_{DC})$:12:$(491+N_{DC})$, and $(12+N_{DC})$:12:$(492+N_{DC})$.

Specifically, the apparatus 400 may include a module configured to perform the method performed by the sending device in the foregoing method 300. In addition, modules in the apparatus 400 and the foregoing other operations and/or functions are separately intended to implement corresponding procedures of the method 300 in FIG. 5.

When the apparatus 400 is configured to perform the method 300 in FIG. 5, the processing unit 420 may be configured to perform step 310 in the method 300, and the communication unit 410 may be configured to perform step 320 in the method 300.

It should be understood that a specific process in which the modules perform the foregoing corresponding steps is described in detail in the foregoing method embodiments.

It should further be understood that the processing unit 420 in the apparatus 400 may correspond to a processor 520 in a sending device 500 shown in FIG. 7, and the communication unit 410 may correspond to a transceiver 510 in the sending device 500 shown in FIG. 7.

In another example embodiment, the apparatus 400 may implement steps or procedures performed by a receiving device in the foregoing method embodiments. For example, the apparatus 400 may be the receiving device, or a chip or a circuit configured in the receiving device. In this case, the apparatus 400 may be referred to as the receiving device. The communication unit 410 is configured to perform a receiving/sending-related operation on a receiving device side in the foregoing method embodiments, and the processing unit 420 is configured to perform a processing-related operation of the receiving device in the foregoing method embodiments.

In a possible implementation, the communication unit 410 is configured to receive the physical layer protocol data unit (PPDU) on one or more discrete resource units (RUs), where the discrete RU includes a plurality of subcarriers that are discrete in a frequency domain. The processing unit 420 is configured to parse the PPDU.

In another possible implementation, the communication unit 410 receives resource scheduling information, where the resource scheduling information includes: resource unit allocation information that indicates one or more resource units, and station information of a station to which the one or more resource units are allocated, the one or more resource units allocated to one station include at least one discrete resource unit RU, and the discrete resource unit includes a plurality of subcarriers that are discrete in frequency domain. The communication unit 410 is configured to determine an allocation status of a resource unit based on the resource scheduling information.

Optionally, resource scheduling information in a contiguous RU mode is reused for the resource scheduling information.

Optionally, that resource scheduling information in a contiguous RU mode is reused for the resource scheduling information specifically means that a value of a resource unit allocation subfield in the contiguous RU mode is reused to indicate a discrete resource unit in a discrete RU mode.

Optionally, in all subcarriers included in a bandwidth per each MHz or per MHz, there are a maximum of M subcarriers that belong to the discrete RU.

That in all subcarriers included in a bandwidth per each MHz or per MHz, there are a maximum of M subcarriers that belong to the discrete RU may also be understood as that in any 12 or 13 contiguous subcarriers, there are a maximum of M subcarriers that belong to the discrete RU.

Optionally, M=1, 2, 3, or 4.

Optionally, the discrete RU is an X-tone RU, where a value of X is any one or a combination of 13, 26, 52, 106, 242, 484, and 996, and the X-tone RU includes X subcarriers.

Optionally, the discrete RU is a 26-tone RU, and the 26-tone RU includes two 13-tone RUs;

the discrete RU is a 52-tone RU, and the 52-tone RU includes two 26-tone RUs;

the discrete RU is a 52+26-tone RU, and the 52+26-tone RU includes one 52-tone RU and one 26-tone RU;

the discrete RU is a 106-tone RU, and the 106-tone RU includes two 52-tone RUs and two null subcarriers; or the discrete RU is a 242-tone RU, and the 242-tone RU includes a plurality of 26-tone RUs.

Optionally, the discrete RU is located in first bandwidth, and the first bandwidth is a multiple of 80 MHz. The each 80 MHz includes 1024 contiguous subcarriers. Indexes of the 1024 contiguous subcarriers start from −512 and end at 511 with a spacing of 1 in ascending order of subcarrier frequencies. Indexes of direct current subcarriers in the 1024 contiguous subcarriers start from $-N_{DC}$ and end at $N_{DC}$ with a spacing of 1, and $N_{DC} \geq 2$.

The each 80 MHz includes 72 13-tone RUs, and subcarrier index ranges corresponding to the 72 13-tone RUs are shown below, where :12: indicates that an index difference between a latter subcarrier and a former subcarrier in two adjacent subcarriers is 12:

a subcarrier index range corresponding to an RU 1 is $-(492+N_{DC}):12:-(348+N_{DC})$, a subcarrier index range corresponding to an RU 2 is $-(324+N_{DC}):12:-(180+N_{DC})$, a subcarrier index range corresponding to an RU 3 is $-(156+N_{DC}):12:-(12+N_{DC})$, a subcarrier index range corresponding to an RU 4 is $(1+N_{DC}):12:(145+N_{DC})$, a subcarrier index range corresponding to an RU 5 is $(169+N_{DC}):12:(313+N_{DC})$, a subcarrier index range corresponding to an RU 6 is $(337+N_{DC}):12:(481+N_{DC})$, indexes corresponding to 4 null subcarriers that exist between the RU 1 and the RU 6 are: $-(336+N_{DC})$, $-(168+N_{DC})$, $(157+N_{DC})$, and $(325+N_{DC})$, a subcarrier index range corresponding to an RU 7 is $-(491+N_{DC}):12:-(347+N_{DC})$, a subcarrier index range corresponding to an RU 8 is $-(323+N_{DC}):12:-(179+N_{DC})$, a subcarrier index range corresponding to an RU 9 is $-(155+N_{DC}):12:-(11+N_{DC})$, a subcarrier index range corresponding to an RU 10 is $(2+N_{DC}):12:(146+N_{DC})$, a subcarrier index range corresponding to an RU 11 is $(170+N_{DC}):12:(314+N_{DC})$, a subcarrier index range corresponding to an RU 12 is $(338+N_{DC}):12:(482+N_{DC})$, indexes corresponding to 4 null subcarriers that exist between the RU 7 and the RU 12 are: $-(335+N_{DC})$, $(167+N_{DC})$, $(158+N_{DC})$, and $(326+N_{DC})$, a subcarrier index range corresponding to an RU 13 is $-(490+N_{DC}):12:-(346+N_{DC})$, a subcarrier index range corresponding to an RU 14 is $-(322+N_{DC}):12:-(178+N_{DC})$, a subcarrier index range corresponding to an RU 15 is $-(154+N_{DC}):12:-(10+N_{DC})$, a subcarrier index range corresponding to an RU 16 is $(3+N_{DC}):12:(147+N_{DC})$, a subcarrier index range corresponding to an RU 17 is $(171+N_{DC}):12:(315+N_{DC})$, a subcarrier index range corresponding to an RU 18 is $(339+N_{DC}):12:(483+N_{DC})$, indexes corresponding to 4 null subcarriers that exist between the RU 13 and the RU 18 are: $-(334+N_{DC})$, $-(166+N_{DC})$, $(159+N_{DC})$, and $(327+N_{DC})$, a subcarrier index range corresponding to an RU 19 is $-(489+N_{DC}):12:-(345+N_{DC})$, a subcarrier index range corresponding to an RU 20 is $-(321+N_{DC}):12:-(178+N_{DC})$, a subcarrier index range corresponding to an RU 21 is $-(153+N_{DC}):12:-(9+N_{DC})$, a subcarrier index range corresponding to an RU 22 is $(4+N_{DC}):12:(148+N_{DC})$, a subcarrier index range corresponding to an RU 23 is $(172+N_{DC}):12:(316+N_{DC})$, a subcarrier index range corresponding to an RU 24 is $(340+N_{DC}):12:(484+N_{DC})$, indexes corresponding to 4 null subcarriers that exist between the RU 19 and the RU 24 are: $-(333+N_{DC})$, $-(165+N_{DC})$, $(160+N_{DC})$, and $(328+N_{DC})$, a subcarrier index range corresponding to an RU 25 is $-(488+N_{DC}):12:-(344+N_{DC})$, a subcarrier index range corresponding to an RU 26 is $-(320+N_{DC}):12:-(176+N_{DC})$, a subcarrier index range corresponding to an RU 27 is $-(152+N_{DC}):12:-(8+N_{DC})$, a subcarrier index range corresponding to an RU 28 is $(5+N_{DC}):12:(149+N_{DC})$, a subcarrier index range corresponding to an RU 29 is $(173+N_{DC}):12:(317+N_{DC})$, a subcarrier index range corresponding to an RU 30 is $(341+N_{DC}):12:(485+N_{DC})$, indexes corresponding to 4 null subcarriers that exist between the RU 25 and the RU are: $-(332+N_{DC})$, $-(164+N_{DC})$, $(161+N_{DC})$, and $(329+N_{DC})$, a subcarrier index range corresponding to an RU 31 is $-(487+N_{DC}):12:-(343+N_{DC})$, a subcarrier index range corresponding to an RU 32 is $-(319+N_{DC}):12:-(175+N_{DC})$, a subcarrier index range corresponding to an RU 33 is $-(151+N_{DC}):12:-(7+N_{DC})$, a subcarrier index range corresponding to an RU 34 is $(6+N_{DC}):12:(150+N_{DC})$, a subcarrier index range corresponding to an RU 35 is $(174+N_{DC}):12:(318+N_{DC})$, a subcarrier index range corresponding to an RU 36 is $(342+N_{DC}):12:(486+N_{DC})$, indexes corresponding to 4 null subcarriers that exist between the RU 31 and the RU 36 are: $-(331+N_{DC})$, $-(163+N_{DC})$, $(162+N_{DC})$, and $(330+N_{DC})$, a subcarrier index range corresponding to an RU 37 is $-(486+N_{DC}):12:-(342+N_{DC})$, a subcarrier index range corresponding to an RU 38 is $-(318+N_{DC}):12:-(174+N_{DC})$, a subcarrier index range corresponding to an RU 39 is $-(150+N_{DC}):12:-(6+N_{DC})$, a subcarrier index range corresponding to an RU 40 is $(7+N_{DC}):12:(151+N_{DC})$, a subcarrier index range corresponding to an RU 41 is $(175+N_{DC}):12:(319+N_{DC})$, a subcarrier index range corresponding to an RU 42 is $(343+N_{DC}):12:(487+N_{DC})$, indexes corresponding to 4 null subcarriers that exist between the RU 37 and the RU 42 are: −(330+$N_{DC}$), −(162+$N_{DC}$), (163+$N_{DC}$), and (331+$N_{DC}$), a subcarrier index range corresponding to an RU 43 is −(485+$N_{DC}$):12:−(341+$N_{DC}$), a subcarrier index range corresponding to an RU 44 is −(317+$N_{DC}$):12:−(173+$N_{DC}$), a subcarrier index range corresponding to an RU 45 is −(149+$N_{DC}$):12:−(5+$N_{DC}$), a subcarrier index range corresponding to an RU 46 is (8+$N_{DC}$):12:(152+$N_{DC}$), a subcarrier index range corresponding to an RU 47 is (176+$N_{DC}$):12:(320+$N_{DC}$), a subcarrier index range corresponding to an RU 48 is (344+$N_{DC}$):12:(488+$N_{DC}$), indexes corresponding to 4 null subcarriers that exist between the RU 43 and the RU 48 are: −(329+$N_{DC}$), −(161+$N_{DC}$), (164+$N_{DC}$), and (332+$N_{DC}$), a subcarrier index range corresponding to an RU 49 is −(484+$N_{DC}$):12:−(340+$N_{DC}$), a subcarrier index range corresponding to an RU 50 is −(316+$N_{DC}$):12:−(172+$N_{DC}$), a subcarrier index range corresponding to an RU 51 is −(148+$N_{DC}$):12:−(4+$N_{DC}$), a subcarrier index range corresponding to an RU 52 is (9+$N_{DC}$):12:(153+$N_{DC}$), a subcarrier index range corresponding to an RU 53 is (177+$N_{DC}$):12:(321+$N_{DC}$), a subcarrier index range corresponding to an RU 54 is (345+$N_{DC}$):12:(489+$N_{DC}$), indexes corresponding to 4 null subcarriers that exist between the RU 49 and the RU 54 are: −(328+$N_{DC}$), −(160+$N_{DC}$), (165+$N_{DC}$), and (333+$N_{DC}$), a subcarrier index range corresponding to an RU 55 is −(483+$N_{DC}$):12:−(339+$N_{DC}$), a subcarrier index range corresponding to an RU 56 is −(315+$N_{DC}$):12:−(171+$N_{DC}$), a subcarrier index range corresponding to an RU 57 is −(147+$N_{DC}$):12:−(3+$N_{DC}$), a subcarrier index range corresponding to an RU 58 is (10+$N_{DC}$):12:(154+$N_{DC}$), a subcarrier index range corresponding to an RU 59 is (178+$N_{DC}$):12:(322+$N_{DC}$), a subcarrier index range corresponding to an RU 60 is (346+$N_{DC}$):12:(490+$N_{DC}$), indexes corresponding to 4 null subcarriers that exist between the RU 55 and the RU 60 are: −(327+$N_{DC}$), (159+$N_{DC}$), (166+$N_{DC}$), and (334+$N_{DC}$), a subcarrier index range corresponding to an RU 61 is −(482+$N_{DC}$):12:−(338+$N_{DC}$), a subcarrier index range corresponding to an RU 62 is −(314+$N_{DC}$):12:−(170+$N_{DC}$), a subcarrier index range corresponding to an RU 63 is −(146+$N_{DC}$):12:−(2+$N_{DC}$), a subcarrier index range corresponding to an RU 64 is (11+$N_{DC}$):12:(155+$N_{DC}$), a subcarrier index range corresponding to an RU 65 is (179+$N_{DC}$):12:(323+$N_{DC}$), a subcarrier index range corresponding to an RU 66 is (347+$N_{DC}$):12:(491+$N_{DC}$), indexes corresponding to 4 null subcarriers that exist between the RU 61 and the RU 66 are: −(326+$N_{DC}$), −(158+$N_{DC}$), (167+$N_{DC}$), and (335+$N_{DC}$), a subcarrier index range corresponding to an RU 67 is −(481+$N_{DC}$):12:−(337+$N_{DC}$), a subcarrier index range corresponding to an RU 68 is −(313+$N_{DC}$):12:−(169+$N_{DC}$), a subcarrier index range corresponding to an RU 69 is −(145+$N_{DC}$):12:−(1+$N_{DC}$), a subcarrier index range corresponding to an RU 70 is (12+$N_{DC}$):12:(156+$N_{DC}$), a subcarrier index range corresponding to an RU 71 is (180+$N_{DC}$):12:(324+$N_{DC}$), a subcarrier index range corresponding to an RU 72 is (348+$N_{DC}$):12:(492+$N_{DC}$), and indexes corresponding to 4 null subcarriers that exist between the RU 67 and the RU 72 are: −(325+$N_{DC}$), −(157+$N_{DC}$), (168+$N_{DC}$), and (336+$N_{DC}$) ; or the each 80 MHz includes 36 26-tone RUs, and subcarrier index ranges corresponding to the 36 26-tone RUs are shown below, where :12: indicates that an index difference between a latter subcarrier and a former subcarrier in two adjacent subcarriers is 12:

subcarrier index ranges corresponding to an RU 1 are −(492+$N_{DC}$):12:−(348+$N_{DC}$) and −(324+$N_{DC}$):12:−(180+$N_{DC}$), subcarrier index ranges corresponding to an RU 2 are −(156+$N_{DC}$):12:−(12+$N_{DC}$) and (1+$N_{DC}$):12:(145+$N_{DC}$), subcarrier index ranges corresponding to an RU 3 are (169+$N_{DC}$):12:(313+$N_{DC}$) and (337+$N_{DC}$):12:(481+$N_{DC}$), indexes corresponding to 4 null subcarriers that exist in the RU 1 to the RU 3 are: −(336+$N_{DC}$), −(168+$N_{DC}$), (157+$N_{DC}$), and (325+$N_{DC}$), subcarrier index ranges corresponding to an RU 4 are −(491+$N_{DC}$):12:−(347+$N_{DC}$) and −(323+$N_{DC}$):12:−(179+$N_{DC}$), subcarrier index ranges corresponding to an RU 5 are −(155+$N_{DC}$):12:−(11+$N_{DC}$) and (2+$N_{DC}$):12:(146+$N_{DC}$), subcarrier index ranges corresponding to an RU 6 are (170+$N_{DC}$):12:(314+$N_{DC}$) and (338+$N_{DC}$):12:(482+$N_{DC}$), indexes corresponding to 4 null subcarriers that exist in the RU 1 to the RU 3 are: −(335+$N_{DC}$), −(167+$N_{DC}$), (158+$N_{DC}$), and (326+$N_{DC}$), subcarrier index ranges corresponding to an RU 7 are −(490+$N_{DC}$):12:−(346+$N_{DC}$) and −(322+$N_{DC}$):12:−(178+$N_{DC}$), subcarrier index ranges corresponding to an RU 8 are −(154+$N_{DC}$):12:−(10+$N_{DC}$) and (3+$N_{DC}$):12:(147+$N_{DC}$), subcarrier index ranges corresponding to an RU 9 are (171+$N_{DC}$):12:(315+$N_{DC}$) and (339+$N_{DC}$):12:(483+$N_{DC}$), indexes corresponding to 4 null subcarriers that exist in the RU 7 to the RU 9 are: −(334+$N_{DC}$), −(166+$N_{DC}$), (159+$N_{DC}$), and (327+$N_{DC}$), subcarrier index ranges corresponding to an RU 10 are −(489+$N_{DC}$):12:−(345+$N_{DC}$) and −(321+$N_{DC}$):12:−(178+$N_{DC}$), subcarrier index ranges corresponding to an RU 11 are −(153+$N_{DC}$):12:−(9+$N_{DC}$) and (4+$N_{DC}$):12:(148+$N_{DC}$), subcarrier index ranges corresponding to an RU 12 are (172+$N_{DC}$):12:(316+$N_{DC}$) and (340+$N_{DC}$):12:(484+$N_{DC}$), indexes corresponding to 4 null subcarriers that exist in the RU 10 to the RU 12 are: −(333+$N_{DC}$), −(165+$N_{DC}$), (160+$N_{DC}$), and (328+$N_{DC}$), subcarrier index ranges corresponding to an RU 13 are −(488+$N_{DC}$):12:−(344+$N_{DC}$) and −(320+$N_{DC}$):12:−(176+$N_{DC}$), subcarrier index ranges corresponding to an RU 14 are $-(152+N_{DC})$:12:$-(8+N_{DC})$ and $(5+N_{DC})$:12:$(149+N_{DC})$, subcarrier index ranges corresponding to an RU 15 are $(173+N_{DC})$:12:$(317+N_{DC})$ and $(341+N_{DC})$:12:$(485+N_{DC})$, indexes corresponding to 4 null subcarriers that exist in the RU 13 to the RU 15 are: $-(332+N_{DC})$, $-(164+N_{DC})$, $(161+N_{DC})$, and $(329+N_{DC})$, subcarrier index ranges corresponding to an RU 16 are $-(487+N_{DC})$:12:$-(343+N_{DC})$ and $-(319+N_{DC})$:12:$-(175+N_{DC})$, subcarrier index ranges corresponding to an RU 17 are $-(151+N_{DC})$:12:$-(7+N_{DC})$ and $(6+N_{DC})$:12:$(150+N_{DC})$, subcarrier index ranges corresponding to an RU 18 are $(174+N_{DC})$:12:$(318+N_{DC})$ and $(342+N_{DC})$:12:$(486+N_{DC})$, indexes corresponding to 4 null subcarriers that exist in the RU 16 to the RU 18 are: $-(331+N_{DC})$, $-(163+N_{DC})$, $(162+N_{DC})$, and $(330+N_{DC})$, subcarrier index ranges corresponding to an RU 19 are $-(486+N_{DC})$:12:$-(342+N_{DC})$ and $-(318+N_{DC})$:12:$-(174+N_{DC})$, subcarrier index ranges corresponding to an RU 20 are $-(150+N_{DC})$:12:$-(6+N_{DC})$ and $(7+N_{DC})$:12:$(151+N_{DC})$, subcarrier index ranges corresponding to an RU 21 are $(175+N_{DC})$:12:$(319+N_{DC})$ and $(343+N_{DC})$:12:$(487+N_{DC})$, indexes corresponding to 4 null subcarriers that exist in the RU 19 to the RU 21 are: $-(330+N_{DC})$, $-(162+N_{DC})$, $(163+N_{DC})$, and $(331+N_{DC})$, subcarrier index ranges corresponding to an RU 22 are $-(485+N_{DC})$:12:$-(341+N_{DC})$ and $-(317+N_{DC})$:12:$-(173+N_{DC})$, subcarrier index ranges corresponding to an RU 23 are $-(149+N_{DC})$:12:$-(5+N_{DC})$ and $(8+N_{DC})$:12:$(152+N_{DC})$, subcarrier index ranges corresponding to an RU 24 are $(176+N_{DC})$:12:$(320+N_{DC})$ and $(344+N_{DC})$:12:$(488+N_{DC})$, indexes corresponding to 4 null subcarriers that exist in the RU 22 to the RU 24 are: $-(329+N_{DC})$, $-(161+N_{DC})$, $(164+N_{DC})$, and $(332+N_{DC})$, subcarrier index ranges corresponding to an RU 25 are $-(484+N_{DC})$:12:$-(340+N_{DC})$ and $-(316+N_{DC})$:12:$-(172+N_{DC})$, subcarrier index ranges corresponding to an RU 26 are $-(148+N_{DC})$:12:$-(4+N_{DC})$ and $(9+N_{DC})$:12:$(153+N_{DC})$, subcarrier index ranges corresponding to an RU 27 are $(177+N_{DC})$:12:$(321+N_{DC})$ and $(345+N_{DC})$:12:$(489+N_{DC})$, indexes corresponding to 4 null subcarriers that exist in the RU 25 to the RU 27 are: $-(328+N_{DC})$, $-(160+N_{DC})$, $(165+N_{DC})$, and $(333+N_{DC})$, subcarrier index ranges corresponding to an RU 28 are $-(483+N_{DC})$:12:$-(339+N_{DC})$ and $-(315+N_{DC})$:12:$-(171+N_{DC})$, subcarrier index ranges corresponding to an RU 29 are $-(147+N_{DC})$:12:$-(3+N_{DC})$ and $(10+N_{DC})$:12:$(154+N_{DC})$, subcarrier index ranges corresponding to an RU 30 are $(178+N_{DC})$:12:$(322+N_{DC})$ and $(346+N_{DC})$:12:$(490+N_{DC})$, indexes corresponding to 4 null subcarriers that exist in the RU 28 to the RU 30 are: $-(327+N_{DC})$, $-(159+N_{DC})$, $(166+N_{DC})$, and $(334+N_{DC})$, subcarrier index ranges corresponding to an RU 31 are $-(482+N_{DC})$:12:$-(338+N_{DC})$ and $-(314+N_{DC})$:12:$-(170+N_{DC})$, subcarrier index ranges corresponding to an RU 32 are $-(146+N_{DC})$:12:$-(2+N_{DC})$ and $(11+N_{DC})$:12:$(155+N_{DC})$, subcarrier index ranges corresponding to an RU 33 are $(179+N_{DC})$:12:$(323+N_{DC})$ and $(347+N_{DC})$:12:$(491+N_{DC})$, indexes corresponding to 4 null subcarriers that exist in the RU 31 to the RU 33 are: $-(326+N_{DC})$, $-(158+N_{DC})$, $(167+N_{DC})$, and $(335+N_{DC})$, subcarrier index ranges corresponding to an RU 34 are $-(481+N_{DC})$:12:$-(337+N_{DC})$ and $-(313+N_{DC})$:12:$-(169+N_{DC})$, subcarrier index ranges corresponding to an RU 35 are $-(145+N_{DC})$:12:$-(1+N_{DC})$ and $(12+N_{DC})$:12:$(156+N_{DC})$, subcarrier index ranges corresponding to an RU 36 are $(180+N_{DC})$:12:$(324+N_{DC})$ and $(348+N_{DC})$:12:$(492+N_{DC})$, and indexes corresponding to 4 null subcarriers that exist in the RU 34 to the RU 36 are: $-(325+N_{DC})$, $-(157+N_{DC})$, $(168+N_{DC})$, and $(336+N_{DC})$; or the each 80 MHz includes 24 52-tone RUs, and subcarrier index ranges corresponding to the 24 52-tone RUs are shown below, where :12: indicates that an index difference between a latter subcarrier and a former subcarrier in two adjacent subcarriers is 12:

subcarrier index ranges corresponding to an RU 1 are $-(492+N_{DC})$:12:$-(348+N_{DC})$, $-(324+N_{DC})$:12:$-(180+N_{DC})$, $-(156+N_{DC})$:12:$-(12+N_{DC})$, and $(1+N_{DC})$:12:$(145+N_{DC})$, indexes corresponding to 2 null subcarriers that exist in the RU 1 are: $-(336+N_{DC})$ and $-(168+N_{DC})$, subcarrier index ranges corresponding to an RU 2 are $-(491+N_{DC})$:12:$-(347+N_{DC})$, $-(323+N_{DC})$:12:$-(179+N_{DC})$, $-(155+N_{DC})$:12:$-(11+N_{DC})$, and $(2+N_{DC})$:12:$(146+N_{DC})$, indexes corresponding to 2 null subcarriers that exist in the RU 2 are: $-(335+N_{DC})$ and $-(167+N_{DC})$, subcarrier index ranges corresponding to an RU 3 are $-(490+N_{DC})$:12:$-(346+N_{DC})$, $-(322+N_{DC})$:12:$-(178+N_{DC})$, $-(154+N_{DC})$:12:$-(10+N_{DC})$, and $(3+N_{DC})$:12:$(147+N_{DC})$, indexes corresponding to 2 null subcarriers that exist in the RU 3 are: $-(334+N_{DC})$ and $-(166+N_{DC})$, subcarrier index ranges corresponding to an RU 4 are $-(489+N_{DC})$:12:$-(345+N_{DC})$, $-(321+N_{DC})$:12:$-(178+N_{DC})$, $-(153+N_{DC})$:12:$-(9+N_{DC})$, and $(4+N_{DC})$:12:$(148+N_{DC})$, indexes corresponding to 2 null subcarriers that exist in the RU 4 are: $-(333+N_{DC})$ and $-(165+N_{DC})$, subcarrier index ranges corresponding to an RU 5 are $-(488+N_{DC})$:12:$-(344+N_{DC})$, $-(320+N_{DC})$:12:$-(176+N_{DC})$, $-(152+N_{DC})$:12:$-(8+N_{DC})$, and $(5+N_{DC})$:12:$(149+N_{DC})$, indexes corresponding to 2 null subcarriers that exist in the RU 5 are: $-(332+N_{DC})$ and $-(164+N_{DC})$, subcarrier index ranges corresponding to an RU 6 are $-(487+N_{DC})$:12:$-(343+N_{DC})$, $-(319+N_{DC})$:12:$-(175+N_{DC})$, $-(151+N_{DC})$:12:$-(7+N_{DC})$, and $(6+N_{DC})$:12:$(150+N_{DC})$, indexes corresponding to 2 null subcarriers that exist in the RU 6 are: −(331+$N_{DC}$) and −(163+$N_{DC}$), subcarrier index ranges corresponding to an RU 7 are −(486+$N_{DC}$):12:−(342+$N_{DC}$), −(318+$N_{DC}$):12:−(174+$N_{DC}$), −(150+$N_{DC}$):12:−(6+$N_{DC}$), and (7+$N_{DC}$):12:(151+$N_{DC}$), indexes corresponding to 2 null subcarriers that exist in the RU 7 are: −(330+$N_{DC}$) and −(162+$N_{DC}$), subcarrier index ranges corresponding to an RU 8 are −(485+$N_{DC}$):12:−(341+$N_{DC}$), −(317+$N_{DC}$):12:−(173+$N_{DC}$), −(149+$N_{DC}$):12:−(5+$N_{DC}$), and (8+$N_{DC}$):12:(152+$N_{DC}$), indexes corresponding to 2 null subcarriers that exist in the RU 8 are: −(329+$N_{DC}$) and (161+$N_{DC}$), subcarrier index ranges corresponding to an RU 9 are −(484+$N_{DC}$):12:−(340+$N_{DC}$), −(316+$N_{DC}$):12:−(172+$N_{DC}$), −(148+$N_{DC}$):12:−(4+$N_{DC}$), and (9+$N_{DC}$):12:(153+$N_{DC}$), indexes corresponding to 2 null subcarriers that exist in the RU 9 are: −(328+$N_{DC}$) and −(160+$N_{DC}$), subcarrier index ranges corresponding to an RU 10 are −(483+$N_{DC}$):12:−(339+$N_{DC}$), −(315+$N_{DC}$):12:−(171+$N_{DC}$), −(147+$N_{DC}$):12:−(3+$N_{DC}$), and (10+$N_{DC}$):12:(154+$N_{DC}$), indexes corresponding to 2 null subcarriers that exist in the RU 10 are: −(327+$N_{DC}$) and −(159+$N_{DC}$), subcarrier index ranges corresponding to an RU 11 are −(482+$N_{DC}$):12:−(338+$N_{DC}$), −(314+$N_{DC}$):12:−(170+$N_{DC}$), −(146+$N_{DC}$):12:−(2+$N_{DC}$), and (11+$N_{DC}$):12:(155+$N_{DC}$), indexes corresponding to 2 null subcarriers that exist in the RU 11 are: −(326+$N_{DC}$) and −(158+$N_{DC}$), subcarrier index ranges corresponding to an RU 12 are −(481+$N_{DC}$):12:−(337+$N_{DC}$), −(313+$N_{DC}$):12:−(169+$N_{DC}$), −(145+$N_{DC}$):12:−(1+$N_{DC}$), and (12+$N_{DC}$):12:(156+$N_{DC}$), indexes corresponding to 2 null subcarriers that exist in the RU 12 are: −(325+$N_{DC}$) and −(157+$N_{DC}$), subcarrier index ranges corresponding to an RU 13 are −(156+$N_{DC}$):12:−(12+$N_{DC}$), (1+$N_{DC}$):12:(145+$N_{DC}$), (169+$N_{DC}$):12:(313+$N_{DC}$), and (337+$N_{DC}$):12:(481+$N_{DC}$), indexes corresponding to 2 null subcarriers that exist in the RU 13 are: (157+$N_{DC}$) and (325+$N_{DC}$), subcarrier index ranges corresponding to an RU 14 are −(155+$N_{DC}$):12:−(11+$N_{DC}$), (2+$N_{DC}$):12:(146+$N_{DC}$), (170+$N_{DC}$):12:(314+$N_{DC}$), and (338+$N_{DC}$):12:(482+$N_{DC}$), indexes corresponding to 2 null subcarriers that exist in the RU 14 are: (158+$N_{DC}$) and (326+$N_{DC}$), subcarrier index ranges corresponding to an RU 15 are −(154+$N_{DC}$):12:−(10+$N_{DC}$), (3+$N_{DC}$):12:(147+$N_{DC}$), (171+$N_{DC}$):12:(315+$N_{DC}$), and (339+$N_{DC}$):12:(483+$N_{DC}$), indexes corresponding to 2 null subcarriers that exist in the RU 15 are: (159+$N_{DC}$) and (327+$N_{DC}$), subcarrier index ranges corresponding to an RU 16 are −(153+$N_{DC}$):12:−(9+$N_{DC}$), (4+$N_{DC}$):12:(148+$N_{DC}$), (172+$N_{DC}$):12:(316+$N_{DC}$), and (340+$N_{DC}$):12:(484+$N_{DC}$), indexes corresponding to 2 null subcarriers that exist in the RU 16 are: (160+$N_{DC}$) and (328+$N_{DC}$), subcarrier index ranges corresponding to an RU 17 are −(152+$N_{DC}$):12:−(8+$N_{DC}$), (5+$N_{DC}$):12:(149+$N_{DC}$), (173+$N_{DC}$):12:(317+$N_{DC}$), and (341+$N_{DC}$):12:(485+$N_{DC}$), indexes corresponding to 2 null subcarriers that exist in the RU 17 are: (161+$N_{DC}$) and (329+$N_{DC}$), subcarrier index ranges corresponding to an RU 18 are −(151+$N_{DC}$):12:−(7+$N_{DC}$), (6+$N_{DC}$):12:(150+$N_{DC}$), (174+$N_{DC}$):12:(318+$N_{DC}$), and (342+$N_{DC}$):12:(486+$N_{DC}$), indexes corresponding to 2 null subcarriers that exist in the RU 18 are: (162+$N_{DC}$) and (330+$N_{DC}$), subcarrier index ranges corresponding to an RU 19 are −(150+$N_{DC}$):12:−(6+$N_{DC}$), (7+$N_{DC}$):12:(151+$N_{DC}$), (175+$N_{DC}$):12:(319+$N_{DC}$), and (343+$N_{DC}$):12:(487+$N_{DC}$), indexes corresponding to 2 null subcarriers that exist in the RU 19 are: (163+$N_{DC}$) and (331+$N_{DC}$), subcarrier index ranges corresponding to an RU 20 are −(149+$N_{DC}$):12:−(5+$N_{DC}$), (8+$N_{DC}$):12:(152+$N_{DC}$), (176+$N_{DC}$):12:(320+$N_{DC}$), and (344+$N_{DC}$):12:(488+$N_{DC}$), indexes corresponding to 2 null subcarriers that exist in the RU 20 are: (164+$N_{DC}$) and (332+$N_{DC}$), subcarrier index ranges corresponding to an RU 21 are −(148+$N_{DC}$):12:−(4+$N_{DC}$), (9+$N_{DC}$):12:(153+$N_{DC}$), (177+$N_{DC}$):12:(321+$N_{DC}$), and (345+$N_{DC}$):12:(489+$N_{DC}$), indexes corresponding to 2 null subcarriers that exist in the RU 21 are: (165+$N_{DC}$) and (333+$N_{DC}$), subcarrier index ranges corresponding to an RU 22 are −(147+$N_{DC}$):12:−(3+$N_{DC}$), (10+$N_{DC}$):12:(154+$N_{DC}$), (178+$N_{DC}$):12:(322+$N_{DC}$), and (346+$N_{DC}$):12:(490+$N_{DC}$), indexes corresponding to 2 null subcarriers that exist in the RU 22 are: (166+$N_{DC}$) and (334+$N_{DC}$), subcarrier index ranges corresponding to an RU 23 are −(146+$N_{DC}$):12:−(2+$N_{DC}$), (11+$N_{DC}$):12:(155+$N_{DC}$), (179+$N_{DC}$):12:(323+$N_{DC}$), and (347+$N_{DC}$):12:(491+$N_{DC}$), indexes corresponding to 2 null subcarriers that exist in the RU 23 are: (167+$N_{DC}$) and (335+$N_{DC}$), subcarrier index ranges corresponding to an RU 24 are −(145+$N_{DC}$):12:−(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 2 null subcarriers that exist in the RU 24 are: (168+$N_{DC}$) and (336+$N_{DC}$); or the each 80 MHz includes 12 52+26-tone RUs, and subcarrier index ranges corresponding to the 12 52+26-tone RUs are shown below, where :12: indicates that an index difference between a latter subcarrier and a former subcarrier in two adjacent subcarriers is 12:

subcarrier index ranges corresponding to an RU 1 are −(492+$N_{DC}$):12:−(348+$N_{DC}$), −(324+$N_{DC}$):12:−(180+$N_{DC}$), −(156+$N_{DC}$):12:−(12+$N_{DC}$), (1+$N_{DC}$):12:(145+$N_{DC}$), (169+$N_{DC}$):12:(313+$N_{DC}$), and (337+$N_{DC}$):12:(481+$N_{DC}$), indexes corresponding to 4 null subcarriers that exist in the RU 1 are: −(336+$N_{DC}$), −(168+$N_{DC}$), (157+$N_{DC}$), and (325+$N_{DC}$), subcarrier index ranges corresponding to an RU 2 are −(491+$N_{DC}$):12:−(347+$N_{DC}$), −(323+$N_{DC}$):12:−(179+$N_{DC}$), (155+$N_{DC}$):12:−(11+$N_{DC}$), (2+$N_{DC}$):12:(146+$N_{DC}$), (170+$N_{DC}$):12:(314+$N_{DC}$), and (338+$N_{DC}$):12:(482+$N_{DC}$), indexes corresponding to 4 null subcarriers that exist in the RU 2 are: −(335+$N_{DC}$), −(167+$N_{DC}$), (158+$N_{DC}$), and (326+$N_{DC}$), subcarrier index ranges corresponding to an RU 3 are −(490+$N_{DC}$):12:−(346+$N_{DC}$), −(322+$N_{DC}$):12:−(178+

$N_{DC}$), −(154+$N_{DC}$):12:−(10+$N_{DC}$), (3+$N_{DC}$):12:(147+$N_{DC}$), (171+$N_{DC}$):12:(315+$N_{DC}$), and (339+$N_{DC}$):12:(483+$N_{DC}$), indexes corresponding to 4 null subcarriers that exist in the RU 3 are: −(334+$N_{DC}$), −(166+$N_{DC}$), (159+$N_{DC}$), and (327+$N_{DC}$), subcarrier index ranges corresponding to an RU 4 are −(489+$N_{DC}$):12:−(345+$N_{DC}$), −(321+$N_{DC}$):12:−(178+$N_{DC}$), −(153+$N_{DC}$):12:−(9+$N_{DC}$), (4+$N_{DC}$):12:(148+$N_{DC}$), (172+$N_{DC}$):12:(316+$N_{DC}$), and (340+$N_{DC}$):12:(484+$N_{DC}$), indexes corresponding to 4 null subcarriers that exist in the RU 4 comprises: −(333+$N_{DC}$) and −(165+$N_{DC}$), subcarrier index ranges corresponding to an RU 5 are −(488+$N_{DC}$):12:−(344+$N_{DC}$), −(320+$N_{DC}$):12:−(176+$N_{DC}$), −(152+$N_{DC}$):12:−(8+$N_{DC}$), and (5+$N_{DC}$):12:(149+$N_{DC}$), indexes corresponding to 4 null subcarriers that exist in the RU 5 are: −(333+$N_{DC}$), −(165+$N_{DC}$), (160+$N_{DC}$), and (328+$N_{DC}$), subcarrier index ranges corresponding to an RU 6 are −(487+$N_{DC}$):12:−(343+$N_{DC}$), −(319+$N_{DC}$):12:−(175+$N_{DC}$), (151+$N_{DC}$):12:−(7+$N_{DC}$), (6+$N_{DC}$):12:(150+$N_{DC}$), (174+$N_{DC}$):12:(318+$N_{DC}$), and (342+$N_{DC}$):12:(486+$N_{DC}$), indexes corresponding to 4 null subcarriers that exist in the RU 6 are: −(331+$N_{DC}$), −(163+$N_{DC}$), (162+$N_{DC}$), and (330+$N_{DC}$), subcarrier index ranges corresponding to an RU 7 are −(486+$N_{DC}$):12:−(342+$N_{DC}$), −(318+$N_{DC}$):12:−(174+$N_{DC}$), −(150+$N_{DC}$):12:−(6+$N_{DC}$), (7+$N_{DC}$):12:(151+$N_{DC}$), (175+$N_{DC}$):12:(319+$N_{DC}$), and (343+$N_{DC}$):12:(487+$N_{DC}$), indexes corresponding to 4 null subcarriers that exist in the RU 7 are: −(330+$N_{DC}$), −(162+$N_{DC}$), (163+$N_{DC}$), and (331+$N_{DC}$), subcarrier index ranges corresponding to an RU 8 are −(485+$N_{DC}$):12:−(341+$N_{DC}$), −(317+$N_{DC}$):12:−(173+$N_{DC}$), −(149+$N_{DC}$):12:−(5+$N_{DC}$), (8+$N_{DC}$):12:(152+$N_{DC}$), (176+$N_{DC}$):12:(320+$N_{DC}$), and (344+$N_{DC}$):12:(488+$N_{DC}$), indexes corresponding to 4 null subcarriers that exist in the RU 8 are: −(329+$N_{DC}$), −(161+$N_{DC}$), (164+$N_{DC}$), and (332+$N_{DC}$), subcarrier index ranges corresponding to an RU 9 are −(484+$N_{DC}$):12:−(340+$N_{DC}$), −(316+$N_{DC}$):12:−(172+$N_{DC}$), −(148+$N_{DC}$):12:−(4+$N_{DC}$), (9+$N_{DC}$):12:(153+$N_{DC}$), (177+$N_{DC}$):12:(321+$N_{DC}$), and (345+$N_{DC}$):12:(489+$N_{DC}$), indexes corresponding to 4 null subcarriers that exist in the RU 9 are: −(328+$N_{DC}$), −(160+$N_{DC}$), (165+$N_{DC}$), and (333+$N_{DC}$), subcarrier index ranges corresponding to an RU 10 are −(483+$N_{DC}$):12:−(339+$N_{DC}$), −(315+$N_{DC}$):12:−(171+$N_{DC}$), −(147+$N_{DC}$):12:−(3+$N_{DC}$), (10+$N_{DC}$):12:(154+$N_{DC}$), (178+$N_{DC}$):12:(322+$N_{DC}$), and (346+$N_{DC}$):12:(490+$N_{DC}$), indexes corresponding to 4 null subcarriers that exist in the RU 10 are: −(327+$N_{DC}$), −(159+$N_{DC}$), (166+$N_{DC}$), and (334+$N_{DC}$), subcarrier index ranges corresponding to an RU 11 are −(482+$N_{DC}$):12:−(338+$N_{DC}$), −(314+$N_{DC}$):12:−(170+$N_{DC}$), (146+$N_{DC}$):12:−(2+$N_{DC}$), (11+$N_{DC}$):12:(155+$N_{DC}$), (179+$N_{DC}$):12:(323+$N_{DC}$), and (347+$N_{DC}$):12:(491+$N_{DC}$), indexes corresponding to 4 null subcarriers that exist in the RU 11 are: −(326+$N_{DC}$), −(158+$N_{DC}$), (167+$N_{DC}$), and (335+$N_{DC}$), subcarrier index ranges corresponding to an RU 12 are −(481+$N_{DC}$):12:−(337+$N_{DC}$), −(313+$N_{DC}$):12:−(169+$N_{DC}$), (145+$N_{DC}$):12:−(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 4 null subcarriers that exist in the RU 12 are: −(325+$N_{DC}$), −(157+$N_{DC}$), (168+$N_{DC}$), and (336+$N_{DC}$); or the each 80 MHz includes 12 106-tone RUs, and subcarrier index ranges corresponding to the 12 106-tone RUs are shown below, where :12: indicates that an index difference between a latter subcarrier and a former subcarrier in two adjacent subcarriers is 12:

subcarrier index ranges corresponding to an RU 1 are −(492+$N_{DC}$):12:−(12+$N_{DC}$), (1+$N_{DC}$):12:(145+$N_{DC}$), −(491+$N_{DC}$):12:−(347+$N_{DC}$), −(323+$N_{DC}$):12:−(179+$N_{DC}$), −(155+$N_{DC}$):12:−(11+$N_{DC}$), and (2+$N_{DC}$):12:(146+$N_{DC}$), indexes corresponding to 2 null subcarriers that exist in the RU 1 are: −(335+$N_{DC}$) and −(167+$N_{DC}$), subcarrier index ranges corresponding to an RU 2 are −(490+$N_{DC}$):12−(10+$N_{DC}$), (3+$N_{DC}$):12:(147+$N_{DC}$), −(489+$N_{DC}$):12:−(345+$N_{DC}$), −(321+$N_{DC}$):12:−(178+$N_{DC}$), −(153+$N_{DC}$):12:−(9+$N_{DC}$), and (4+$N_{DC}$):12:(148+$N_{DC}$), indexes corresponding to 2 null subcarriers that exist in the RU 2 are: −(333+$N_{DC}$) and −(165+$N_{DC}$), subcarrier index ranges corresponding to an RU 3 are −(488+$N_{DC}$):12−(8+$N_{DC}$), (5+$N_{DC}$):12:(149+$N_{DC}$), −(487+$N_{DC}$):12:−(343+$N_{DC}$), −(319+$N_{DC}$):12:−(175+$N_{DC}$), −(151+$N_{DC}$):12:−(7+$N_{DC}$), and (6+$N_{DC}$):12:(150+$N_{DC}$), indexes corresponding to 2 null subcarriers that exist in the RU 3 are: −(331+$N_{DC}$) and (163+$N_{DC}$), subcarrier index ranges corresponding to an RU 4 are −(486+$N_{DC}$):12−(6+$N_{DC}$), (7+$N_{DC}$):12:(151+$N_{DC}$), −(485+$N_{DC}$):12:−(341+$N_{DC}$), −(317+$N_{DC}$):12:−(173+$N_{DC}$), −(149+$N_{DC}$):12:−(5+$N_{DC}$), and (8+$N_{DC}$):12:(152+$N_{DC}$), indexes corresponding to 2 null subcarriers that exist in the RU 4 are: −(329+$N_{DC}$) and −(161+$N_{DC}$), subcarrier index ranges corresponding to an RU 5 are −(484+$N_{DC}$):12−(4+$N_{DC}$), (9+$N_{DC}$):12:(153+$N_{DC}$), −(483+$N_{DC}$):12:−(339+$N_{DC}$), −(315+$N_{DC}$):12:−(171+$N_{DC}$), −(147+$N_{DC}$):12:−(3+$N_{DC}$), and (10+$N_{DC}$):12:(154+$N_{DC}$), indexes corresponding to 2 null subcarriers that exist in the RU 5 are: −(327+$N_{DC}$) and (159+$N_{DC}$), subcarrier index ranges corresponding to an RU 6 are −(482+$N_{DC}$):12:−(2+$N_{DC}$), (11+$N_{DC}$):12:(155+$N_{DC}$), −(481+$N_{DC}$):12:−(337+$N_{DC}$), −(313+$N_{DC}$):12:−(169+$N_{DC}$), −(145+$N_{DC}$):12:−(1+$N_{DC}$), and (12+$N_{DC}$):12:(156+$N_{DC}$), indexes corresponding to 2 null subcarriers that exist in the RU 6 are: −(325+$N_{DC}$) and −(157+$N_{DC}$), subcarrier index ranges corresponding to an RU 7 are −(156+$N_{DC}$):12:−(12+$N_{DC}$), (1+$N_{DC}$):12:(481+$N_{DC}$), −(155+$N_{DC}$):12:−(11+$N_{DC}$), (2+$N_{DC}$):12:(146+$N_{DC}$), (170+$N_{DC}$):12:(314+$N_{DC}$), and (338+$N_{DC}$):12:(482+$N_{DC}$), indexes corresponding to 2 null subcarriers that exist in the RU 7 are: (158+$N_{DC}$) and (326+$N_{DC}$), subcarrier index ranges corresponding to an RU 8 are −(154+$N_{DC}$):12:−(10+$N_{DC}$), (3+$N_{DC}$):12:(483+$N_{DC}$), $(153+N_{DC})$:12:$-(9+N_{DC})$, $(4+N_{DC})$:12:$(148+N_{DC})$, $(172+N_{DC})$:12:$(316+N_{DC})$, and $(340+N_{DC})$:12:$(484+N_{DC})$, indexes corresponding to 2 null subcarriers that exist in the RU 8 are: $(160+N_{DC})$ and $(328+N_{DC})$, subcarrier index ranges corresponding to an RU 9 are $-(152+N_{DC})$:12:$-(8+N_{DC})$, $(5+N_{DC})$:12:$(485+N_{DC})$, $(151+N_{DC})$:12:$-(7+N_{DC})$, $(6+N_{DC})$:12:$(150+N_{DC})$, $(174+N_{DC})$:12:$(318+N_{DC})$, and $(342+N_{DC})$:12:$(486+N_{DC})$, indexes corresponding to 2 null subcarriers that exist in the RU 9 are: $(162+N_{DC})$ and $(330+N_{DC})$, subcarrier index ranges corresponding to an RU 10 are $-(150+N_{DC})$:12:$-(6+N_{DC})$, $(7+N_{DC})$:12:$(487+N_{DC})$, $(149+N_{DC})$:12:$-(5+N_{DC})$, $(8+N_{DC})$:12:$(152+N_{DC})$, $(176+N_{DC})$:12:$(320+N_{DC})$, and $(344+N_{DC})$:12:$(488+N_{DC})$, indexes corresponding to 2 null subcarriers that exist in the RU 10 are: $(164+N_{DC})$ and $(332+N_{DC})$, subcarrier index ranges corresponding to an RU 11 are $-(148+N_{DC})$:12:$-(4+N_{DC})$, $(9+N_{DC})$:12:$(489+N_{DC})$, $-(147+N_{DC})$:12:$-(3+N_{DC})$, $(10+N_{DC})$:12:$(154+N_{DC})$, $(178+N_{DC})$:12:$(322+N_{DC})$, and $(346+N_{DC})$:12:$(490+N_{DC})$, indexes corresponding to 2 null subcarriers that exist in the RU 11 are: $(166+N_{DC})$ and $(334+N_{DC})$, subcarrier index ranges corresponding to an RU 12 are $-(146+N_{DC})$:12:$-(2+N_{DC})$, $(11+N_{DC})$:12:$(491+N_{DC})$, $-(145+N_{DC})$:12:$-(1+N_{DC})$, $(12+N_{DC})$:12:$(156+N_{DC})$, $(180+N_{DC})$:12:$(324+N_{DC})$, and $(348+N_{DC})$:12:$(492+N_{DC})$, and indexes corresponding to 2 null subcarriers that exist in the RU 12 are: $(168+N_{DC})$ and $(336+N_{DC})$; or the each 80 MHz includes 4 242-tone RUs, and subcarrier index ranges corresponding to the 4 242-tone RUs are shown below, where :12: indicates that an index difference between a latter subcarrier and a former subcarrier in two adjacent subcarriers is 12:

subcarrier index ranges corresponding to an RU 1 are $-(492+N_{DC})$:12:$-(12+N_{DC})$, $-(491+N_{DC})$:12:$-(23+N_{DC})$, $-(490+N_{DC})$:12:$-(22+N_{DC})$, $(13+N_{DC})$:12:$(481+N_{DC})$, $(14+N_{DC})$:12:$(482+N_{DC})$, and $(3+N_{DC})$:12:$(483+N_{DC})$, subcarrier index ranges corresponding to an RU 2 are $-(489+N_{DC})$:12:$-(9+N_{DC})$, $-(488+N_{DC})$:12:$-(20+N_{DC})$, $-(487+N_{DC})$:12:$-(19+N_{DC})$, $(16+N_{DC})$:12:$(484+N_{DC})$, $(17+N_{DC})$:12:$(485+N_{DC})$, and $(6+N_{DC})$:12:$(486+N_{DC})$, subcarrier index ranges corresponding to an RU 3 are $-(486+N_{DC})$:12:$-(6+N_{DC})$, $-(485+N_{DC})$:12:$-(17+N_{DC})$, $(484+N_{DC})$:12:$-(16+N_{DC})$, $(19+N_{DC})$:12:$(487+N_{DC})$, $(20+N_{DC})$:12:$(488+N_{DC})$, and $(9+N_{DC})$:12:$(489+N_{DC})$, and subcarrier index ranges corresponding to an RU 4 are $-(483+N_{DC})$:12:$-(3+N_{DC})$, $-(482+N_{DC})$:12:$-(14+N_{DC})$, $-(481+N_{DC})$:12:$-(13+N_{DC})$, $(22+N_{DC})$:12:$(490+N_{DC})$, $(23+N_{DC})$:12:$(491+N_{DC})$, and $(12+N_{DC})$:12:$(492+N_{DC})$.

Specifically, the apparatus 400 may include a module configured to perform the method performed by the receiving device in the foregoing method 300. In addition, modules in the apparatus 400 and the foregoing other operations and/or functions are separately intended to implement corresponding procedures of the method 300 in FIG. 5.

When the apparatus 400 is configured to perform the method 300 in FIG. 5, the processing unit 420 may be configured to perform steps such as parsing the PPDU in the method 300, and the communication unit 410 may be configured to perform step 320 in the method 300.

It should be understood that a specific process in which the modules perform the foregoing corresponding steps is described in detail in the foregoing method embodiments.

It should further be understood that the processing unit 420 in the apparatus 400 may correspond to a processor or a processing unit 620 in a receiving device 600 shown in FIG. 8, and the communication unit 410 may correspond to a transceiver or a transceiver unit 610 in a sending device 600 shown in FIG. 8.

An embodiment of this application further provides an apparatus 500. The apparatus 500 may be a sending device or a chip. The apparatus 500 may be configured to perform actions performed by the sending device in the foregoing method embodiments.

When the apparatus 500 is the sending device, for example, a base station, FIG. 7 is a simplified schematic diagram of a structure of a base station. The base station includes a part 510 and a part 520. The part 510 is mainly configured to: receive and send a radio frequency signal, and perform conversion between the radio frequency signal and a baseband signal. The part 520 is mainly configured to: perform baseband processing, control the base station, and the like. The part 510 may usually be referred to as a transceiver unit, a transceiver circuit, a transceiver, or the like. The part 520 is usually a control center of the base station, may usually be referred to as a processing unit, and is configured to control the base station to perform a processing operation on the sending device side in the foregoing method embodiments.

A transceiver unit in the part 510 may also be referred to as a transceiver or the like. The transceiver unit includes an antenna and a radio frequency unit. The radio frequency unit is mainly configured to perform radio frequency processing. Optionally, a device that is in the part 510 and that is configured to implement a receiving function may be considered as a receiving unit, and a device configured to implement a sending function may be considered as a sending unit. In other words, the part 510 includes the receiving unit and the sending unit. The receiving unit may also be referred to as a receiver, a receiver circuit, or the like. The sending unit may be referred to as a transmitter, a transmitter circuit, or the like.

The part 520 may include one or more boards, and each board may include one or more processors and one or more memories. The processor is configured to: read and execute a program in the memory to implement a baseband processing function and control on the base station. If there are a plurality of boards, the boards may be interconnected with each other to enhance a processing capability. In an optional implementation, the plurality of boards may share one or more processors, or the plurality of boards may share one or more memories, or the plurality of boards may simultaneously share one or more processors.

For example, in an implementation, the transceiver unit in the part 510 is configured to perform a sending operation on the sending device side in step 320 in FIG. 5, and/or the transceiver unit in the part 510 is further configured to perform other receiving and sending steps on the sending device side in embodiments of this application. The processing unit in the part 520 is configured to perform a processing operation in step 310 in FIG. 5, and/or the processing unit in the part 520 is further configured to perform a processing step on the sending device side in embodiments of this application.

It should be understood that FIG. 7 is merely an example rather than a limitation. The foregoing sending device including the transceiver unit and the processing unit may not depend on the structure shown in FIG. 7.

When a communication apparatus 500 is a chip, the chip includes a transceiver unit and a processing unit. The transceiver unit may be an input/output circuit or a communication interface. The processing unit is a processor, a microprocessor, or an integrated circuit that is integrated on the chip.

In addition, the sending device is not limited to the foregoing form, and may also be in another form. For example, the sending device may include a BBU and an adaptive radio unit (ARU), or includes a BBU and an active antenna unit (AAU), or may be customer receiving equipment (CPE), or may be in another form. This is not limited in this application.

The foregoing BBU may be configured to perform an action that is described in the foregoing method embodiments and that is implemented inside the sending device, and the RRU may be configured to perform a sending action by the sending device to the receiving device or a receiving action from the receiving device in the foregoing method embodiments. For details, refer to the descriptions in the foregoing method embodiments.

An embodiment of this application further provides a communication apparatus. The communication apparatus may be a receiving device or a chip. The communication apparatus may be configured to perform an action performed by the receiving device in the foregoing method embodiments.

When the communication apparatus is the receiving device, FIG. 8 is a simplified schematic diagram of a structure of a receiving device. For ease of understanding and convenience of illustration, an example in which the receiving device is a mobile phone is used in FIG. 8. As shown in FIG. 8, the receiving device includes a processor, a memory, a radio frequency circuit, an antenna, and an input/output apparatus. The processor is mainly configured to process a communication protocol and communication data, control the receiving device, execute a software program, process data of the software program, and the like. The memory is mainly configured to store the software program and data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of receiving devices may have no input/output apparatus.

When data needs to be sent, the processor performs baseband processing on the to-be-sent data, and then outputs a baseband signal to the radio frequency circuit. After performing radio frequency processing on the baseband signal, the radio frequency circuit sends a radio frequency signal in a form of an electromagnetic wave to the outside through the antenna. When data is sent to the receiving device, the radio frequency circuit receives the radio frequency signal through the antenna, converts the radio frequency signal to a baseband signal, and outputs the baseband signal to the processor. The processor converts the baseband signal to data, and processes the data. For ease of description, FIG. 8 shows only one memory and one processor. In an actual receiving device product, there may be one or more processors and one or more memories. The memory may also be referred to as a storage medium, a storage device, or the like. The memory may be deployed independent of the processor, or may be integrated with the processor. This is not limited in this embodiment of this application.

In this embodiment of this application, the antenna and the radio frequency circuit that have receiving and sending functions may be considered as a transceiver unit of the receiving device, and the processor that has a processing function may be considered as a processing unit of the receiving device.

As shown in FIG. 8, the receiving device includes the transceiver unit 610 and the processing unit 620. The transceiver unit 610 may also be referred to as a transceiver, a transceiver apparatus, or the like. The processing unit 620 may also be referred to as a processor, a processing board, a processing module, a processing apparatus, or the like. Optionally, a device that is in the transceiver unit 610 and that is configured to implement a receiving function may be considered as a receiving unit, and a device that is in the transceiver unit 610 and that is configured to implement a sending function may be considered as a sending unit. In other words, the transceiver unit 610 includes the receiving unit and the sending unit. The transceiver unit may sometimes be referred to as a transceiver, a transceiver circuit, or the like. The receiving unit may also be sometimes referred to as a receiver, a receiver circuit, or the like. The sending unit may also be sometimes referred to as a transmitter, a transmitter circuit, or the like.

For example, in an implementation, the processing unit 620 is configured to perform step 330 shown in FIG. 5. The transceiver unit 610 is further configured to perform step 320 shown in FIG. 5, and/or the transceiver unit 610 is further configured to perform other receiving and sending steps on a receiving device side.

It should be understood that FIG. 8 is merely an example rather than a limitation. The foregoing receiving device including the transceiver unit and the processing unit may not depend on the structure shown in FIG. 8.

In another implementation, the radio frequency circuit and the antenna may be disposed independent of the processor that performs baseband processing. For example, in a distributed scenario, the radio frequency circuit and the antenna may be separately disposed independent of the communication apparatus.

A communication device in embodiments of this application may be an independent device or may be a part of a large device. For example, the communication apparatus may be:

(1) an independent integrated circuit IC, a chip, or a chip system or subsystem;

(2) a set including one or more ICs, where optionally, the IC set may also include a storage component configured to store data and instructions;

(3) an ASIC, for example, a modem;

(4) a module that can be embedded in another device;

(5) a receiver, an intelligent terminal, a wireless device, a handheld device, a mobile unit, a vehicle-mounted device, a cloud device, an artificial intelligence device, or the like; and (6) others.

When the communication device is a chip, the chip includes a transceiver unit and a processing unit. The transceiver unit may be an input/output circuit or a communication interface. The processing unit may be a processor, a microprocessor, or an integrated circuit that is integrated on the chip.

An embodiment of this application further provides a processing apparatus, including a processor and an interface. The processor may be configured to perform, for example, but not limited to, baseband-related processing, and the processor may be configured to perform the method in the foregoing method embodiments.

The processing apparatus may further include a transceiver. The transceiver may be configured to perform, for example, but not limited to, radio frequency receiving and sending. The foregoing components may be separately disposed on chips that are independent of each other, or at least some or all of the components may be disposed on a same chip. For example, the processor may further be divided into an analog baseband processor and a digital baseband processor. The analog baseband processor and the transceiver may be integrated on a same chip, and the digital baseband processor may be disposed on an independent chip. With continuous development of integrated circuit technologies, an increasing quantity of devices may be integrated on a same chip. For example, the digital baseband processor and a plurality of application processors (for example, but not limited to, a graphics processor and a multimedia processor) may be integrated on a same chip. Such a chip may be referred to as a system on chip. Whether the devices are independently disposed on different chips or integrated on one or more chips usually depends on a specific requirement of a product design. This embodiment of the present invention imposes no limitation on a specific implementation of the foregoing devices.

It should be understood that the foregoing processing apparatus may be a chip. For example, the processing apparatus may be a field programmable gate array (FPGA), an application-specific integrated circuit (ASIC), a system on chip (SoC), a central processing unit (CPU), a network processor (NP), a digital signal processing circuit (DSP), a micro controller (MCU), a programmable logic device (PLD), or another integrated chip.

In an implementation process, steps in the foregoing methods may be implemented by using a hardware integrated logic circuit in the processor or by using instructions in a form of software. The steps of the methods disclosed with reference to embodiments of this application may be directly performed and completed by a hardware processor, or may be performed and completed by using a combination of hardware and software modules in the processor. The software module may be located in a mature storage medium in the art such as a random access memory, a flash memory, a read-only memory, a programmable read-only memory, an electrically erasable programmable memory, or a register. The storage medium is located in the memory. The processor reads information in the memory and completes steps of the foregoing methods in combination with hardware of the processor.

It should be noted that the processor in embodiments of this application may be an integrated circuit chip, and has a signal processing capability. In an implementation process, steps in the foregoing method embodiments may be implemented by using a hardware integrated logic circuit in the processor or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and software modules in the decoding processor. The software module may be located in a mature storage medium in the art such as a random access memory, a flash memory, a read-only memory, a programmable read-only memory, an electrically erasable programmable memory, or a register. The storage medium is located in the memory. The processor reads information in the memory and completes the steps of the foregoing methods in combination with hardware of the processor.

It may be understood that the memory in embodiments of this application may be a volatile memory or a nonvolatile memory, or may include both a volatile memory and a nonvolatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. By way of example but not limitative description, a plurality forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory of the system and methods described in this specification includes but is not limited to these memories and any memory of another proper type.

According to the methods provided in embodiments of this application, this application further provides a computer program product. The computer program product includes computer program code. When the computer program code is run on a computer, the computer is enabled to perform the method in the embodiment shown in FIG. 7.

According to the methods provided in embodiments of this application, this application further provides a computer-readable medium. The computer-readable medium stores program code. When the program code is run on a computer, the computer is enabled to perform the method in the embodiment shown in FIG. 7.

According to the methods provided in embodiments of this application, this application further provides a system. The system includes the foregoing one or more terminal devices and the foregoing one or more network devices.

A person of ordinary skill in the art may be aware that units and algorithm steps in examples described with reference to embodiments disclosed in this specification may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between apparatuses or units may be implemented in electronic, mechanical, or other forms.

The units described as separate parts may or may not be physically separate, and parts displayed as units may or may not be physical units, may be located in one place, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or a part contributing to a conventional technology, or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely non-limiting examples of specific implementations and are not intended to limit the protection scope, which is intended to cover any variation or replacement readily determined by a person of ordinary skill in the art. Therefore, the claims shall define the protection scope.

What is claimed is:

1. A method for sending a physical layer protocol data unit, comprising:

generating a physical layer protocol data unit (PPDU); and sending the PPDU on one or more discrete resource units (RUS), wherein each of the one or more discrete RUs comprises a plurality of subcarriers that are discrete in frequency domain, wherein each of the one or more discrete RUs is an X-tone RU, a value of X is any one or a combination of 13, 26, 52, 106, 242, 484, and 996, and the X-tone RU comprises X subcarriers, wherein each of the one or more discrete RUs is located in a first bandwidth, and the first bandwidth is a multiple of 80 MHz, and wherein each 80 MHz segment of the multiple of 80 MHz comprises 1024 contiguous subcarriers, indexes of the 1024 contiguous subcarriers range from −512 to 511 with a spacing of 1 in ascending order of subcarrier frequencies, and indexes of direct current subcarriers in the 1024 contiguous subcarriers range from $-N_{DC}$ to $N_{DC}$ with a spacing of 1, where $N_{DC}>2$.

2. The method according to claim 1, wherein each of the one or more discrete RUs is a 26-tone RU, and the 26-tone RU consists of two 13-tone RUs; or each of the one or more discrete RUs is a 52-tone RU, and the 52-tone RU consists of two 26-tone RUs; or each of the one or more discrete RUs is a 52+26-tone RU, and the 52+26-tone RU consists of one 52-tone RU and one 26-tone RU; or each of the one or more discrete RUs is a 106-tone RU, and the 106-tone RU consists of two 52-tone RUs and two null subcarriers; or each of the one or more discrete RUs is a 242-tone RU, and the 242-tone RU consists of a plurality of 26-tone RUs.

3. The method according to claim 1, wherein each 80 MHz segment of the multiple of 80 MHz comprises 72 13-tone RUs, and subcarrier index ranges corresponding to the 72 13-tone RUs are shown below, wherein :12: indicates that an index difference between a latter subcarrier and a former subcarrier in two adjacent subcarriers is 12:

a subcarrier index range corresponding to an RU 1 is $-(492+N_{DC}):12:-(348+N_{DC})$, a subcarrier index range corresponding to an RU 2 is $-(324+N_{DC}):12:-(180+N_{DC})$, a subcarrier index range corresponding to an RU 3 is $-(156+N_{DC}):12:-(12+N_{DC})$, a subcarrier index range corresponding to an RU 4 is $(1+N_{DC}):12:(145+N_{DC})$, a subcarrier index range corresponding to an RU 5 is $(169+N_{DC}):12:(313+N_{DC})$, a subcarrier index range corresponding to an RU 6 is $(337+N_{DC}):12:(481+N_{DC})$, indexes corresponding to 4 null subcarriers that exist between the RU 1 and the RU 6 are: $-(336+N_{DC})$, $-(168+N_{DC})$, $(157+N_{DC})$, and $(325+N_{DC})$, a subcarrier index range corresponding to an RU 7 is $-(491+N_{DC}):12:-(347+N_{DC})$, a subcarrier index range corresponding to an RU 8 is $-(323+N_{DC}):12:-(179+N_{DC})$, a subcarrier index range corresponding to an RU 9 is $-(155+N_{DC}):12:-(11+N_{DC})$, a subcarrier index range corresponding to an RU 10 is $(2+N_{DC}):12:(146+N_{DC})$, a subcarrier index range corresponding to an RU 11 is $(170+N_{DC}):12:(314+N_{DC})$, a subcarrier index range corresponding to an RU 12 is $(338+N_{DC}):12:(482+N_{DC})$, indexes corresponding to 4 null subcarriers that exist between the RU 7 and the RU 12 are: $-(335+N_{DC})$, $-(167+N_{DC})$, $(158+N_{DC})$, and $(326+N_{DC})$, a subcarrier index range corresponding to an RU 13 is $-(490+N_{DC}):12:-(346+N_{DC})$, a subcarrier index range corresponding to an RU 14 is $-(322+N_{DC}):12:-(178+N_{DC})$, a subcarrier index range corresponding to an RU 15 is $-(154+N_{DC}):12:-(10+N_{DC})$, a subcarrier index range corresponding to an RU 16 is $(3+N_{DC}):12:(147+N_{DC})$, a subcarrier index range corresponding to an RU 17 is $(171+N_{DC}):12:(315+N_{DC})$, a subcarrier index range corresponding to an RU 18 is $(339+N_{DC}):12:(483+N_{DC})$, indexes corresponding to 4 null subcarriers that exist between the RU 13 and the RU 18 are: $-(334+N_{DC})$, $-(166+N_{DC})$, $(159+N_{DC})$, and $(327+N_{DC})$, a subcarrier index range corresponding to an RU 19 is $-(489+N_{DC}):12:-(345+N_{DC})$, a subcarrier index range corresponding to an RU 20 is $-(321+N_{DC}):12:-(178+N_{DC})$, a subcarrier index range corresponding to an RU 21 is $-(153+N_{DC}):12:-(9+N_{DC})$, a subcarrier index range corresponding to an RU 22 is $(4+N_{DC}):12:(148+N_{DC})$, a subcarrier index range corresponding to an RU 23 is $(172+N_{DC}):12:(316+N_{DC})$, a subcarrier index range corresponding to an RU 24 is $(340+N_{DC}):12:(484+N_{DC})$, indexes corresponding to 4 null subcarriers that exist between the RU 19 and the RU 24 are: $-(333+N_{DC})$, $-(165+N_{DC})$, $(160+N_{DC})$, and $(328+N_{DC})$, a subcarrier index range corresponding to an RU 25 is $-(488+N_{DC}):12:-(344+N_{DC})$, a subcarrier index range corresponding to an RU 26 is $-(320+N_{DC}):12:-(176+N_{DC})$, a subcarrier index range corresponding to an RU 27 is $-(152+N_{DC}):12:-(8+N_{DC})$, a subcarrier index range corresponding to an RU 28 is $(5+N_{DC}):12:(149+N_{DC})$, a subcarrier index range corresponding to an RU 29 is $(173+N_{DC}):12:(317+N_{DC})$, a subcarrier index range corresponding to an RU 30 is $(341+N_{DC}):12:(485+N_{DC})$, indexes corresponding to 4 null subcarriers that exist between the RU 25 and the RU 30 are: $-(332+N_{DC})$, $-(164+N_{DC})$, $(161+N_{DC})$, and $(329+N_{DC})$, a subcarrier index range corresponding to an RU 31 is $-(487+N_{DC}):12:-(343+N_{DC})$, a subcarrier index range corresponding to an RU 32 is $-(319+N_{DC}):12:-(175+N_{DC})$, a subcarrier index range corresponding to an RU 33 is $-(151+N_{DC}):12:-(7+N_{DC})$, a subcarrier index range corresponding to an RU 34 is $(6+N_{DC}):12:(150+N_{DC})$, a subcarrier index range corresponding to an RU 35 is $(174+N_{DC}):12:(318+N_{DC})$, a subcarrier index range corresponding to an RU 36 is $(342+N_{DC}):12:(486+N_{DC})$, indexes corresponding to 4 null subcarriers that exist between the RU 31 and the RU 36 are: $-(331+N_{DC})$, $-(163+N_{DC})$, $(162+N_{DC})$, and $(330+N_{DC})$, a subcarrier index range corresponding to an RU 37 is $-(486+N_{DC}):12:-(342+N_{DC})$, a subcarrier index range corresponding to an RU 38 is $-(318+N_{DC}):12:-(174+N_{DC})$, a subcarrier index range corresponding to an RU 39 is $-(150+N_{DC}):12:-(6+N_{DC})$, a subcarrier index range corresponding to an RU 40 is $(7+N_{DC}):12:(151+N_{DC})$, a subcarrier index range corresponding to an RU 41 is $(175+N_{DC}):12:(319+N_{DC})$, a subcarrier index range corresponding to an RU 42 is $(343+N_{DC}):12:(487+N_{DC})$, indexes corresponding to 4 null subcarriers that exist between the RU 37 and the RU 42 are: $-(330+N_{DC})$, $-(162+N_{DC})$, $(163+N_{DC})$, and $(331+N_{DC})$, a subcarrier index range corresponding to an RU 43 is $-(485+N_{DC}):12:-(341+N_{DC})$, a subcarrier index range corresponding to an RU 44 is $-(317+N_{DC}):12:-(173+N_{DC})$, a subcarrier index range corresponding to an RU 45 is $-(149+N_{DC}):12:-(5+N_{DC})$, a subcarrier index range corresponding to an RU 46 is $(8+N_{DC}):12:(152+N_{DC})$, a subcarrier index range corresponding to an RU 47 is $(176+N_{DC}):12:(320+N_{DC})$, a subcarrier index range corresponding to an RU 48 is $(344+N_{DC}):12:(488+N_{DC})$, indexes corresponding to 4 null subcarriers that exist between the RU 43 and the RU 48 are: $-(329+N_{DC})$, $-(161+N_{DC})$, $(164+N_{DC})$, and $(332+N_{DC})$, a subcarrier index range corresponding to an RU 49 is $-(484+N_{DC}):12:-(340+N_{DC})$, a subcarrier index range corresponding to an RU 50 is $-(316+N_{DC}):12:-(172+N_{DC})$, a subcarrier index range corresponding to an RU 51 is $-(148+N_{DC}):12:-(4+N_{DC})$, a subcarrier index range corresponding to an RU 52 is $(9+N_{DC}):12:(153+N_{DC})$, a subcarrier index range corresponding to an RU 53 is $(177+N_{DC}):12:(321+N_{DC})$, a subcarrier index range corresponding to an RU 54 is $(345+N_{DC}):12:(489+N_{DC})$, indexes corresponding to 4 null subcarriers that exist between the RU 49 and the RU 54 are: $-(328+N_{DC})$, $-(160+N_{DC})$, $(165+N_{DC})$, and $(333+N_{DC})$, a subcarrier index range corresponding to an RU 55 is $-(483+N_{DC}):12:-(339+N_{DC})$, a subcarrier index range corresponding to an RU 56 is $-(315+N_{DC}):12:-(171+N_{DC})$, a subcarrier index range corresponding to an RU 57 is $-(147+N_{DC}):12:-(3+N_{DC})$, a subcarrier index range corresponding to an RU 58 is $(10+N_{DC}):12:(154+N_{DC})$, a subcarrier index range corresponding to an RU 59 is $(178+N_{DC}):12:(322+N_{DC})$, a subcarrier index range corresponding to an RU 60 is $(346+N_{DC}):12:(490+N_{DC})$, indexes corresponding to 4 null subcarriers that exist between the RU 55 and the RU 60 are: $-(327+N_{DC})$, $-(159+N_{DC})$, $(166+N_{DC})$, and $(334+N_{DC})$, a subcarrier index range corresponding to an RU 61 is $-(482+N_{DC}):12:-(338+N_{DC})$, a subcarrier index range corresponding to an RU 62 is $-(314+N_{DC}):12:-(170+N_{DC})$, a subcarrier index range corresponding to an RU 63 is $-(146+N_{DC}):12:-(2+N_{DC})$, a subcarrier index range corresponding to an RU 64 is $(11+N_{DC}):12:(155+N_{DC})$, a subcarrier index range corresponding to an RU 65 is $(179+N_{DC}):12:(323+N_{DC})$, a subcarrier index range corresponding to an RU 66 is $(347+N_{DC}):12:(491+N_{DC})$, indexes corresponding to 4 null subcarriers that exist between the RU 61 and the RU 66 are: −(326+$N_{DC}$), −(158+$N_{DC}$), (167+$N_{DC}$), and (335+$N_{DC}$), a subcarrier index range corresponding to an RU 67 is −(481+$N_{DC}$):12:−(337+$N_{DC}$), a subcarrier index range corresponding to an RU 68 is −(313+$N_{DC}$):12:−(169+$N_{DC}$), a subcarrier index range corresponding to an RU 69 is −(145+$N_{DC}$):12:−(1+$N_{DC}$), a subcarrier index range corresponding to an RU 70 is (12+$N_{DC}$):12:(156+$N_{DC}$), a subcarrier index range corresponding to an RU 71 is (180+$N_{DC}$):12:(324+$N_{DC}$), a subcarrier index range corresponding to an RU 72 is (348+$N_{DC}$):12:(492+$N_{DC}$), and indexes corresponding to 4 null subcarriers that exist between the RU 67 and the RU 72 are: −(325+$N_{DC}$), −(157+$N_{DC}$), (168+$N_{DC}$), and (336+$N_{DC}$); or each 80 MHz segment of the multiple of 80 MHz comprises 36 26-tone RUs, and subcarrier index ranges corresponding to the 36 26-tone RUs are shown below, wherein :12: indicates that an index difference between a latter subcarrier and a former subcarrier in two adjacent subcarriers is 12:

subcarrier index ranges corresponding to an RU 1 are −(492+$N_{DC}$):12:−(348+$N_{DC}$) and −(324+$N_{DC}$):12:−(180+$N_{DC}$), subcarrier index ranges corresponding to an RU 2 are −(156+$N_{DC}$):12:−(12+$N_{DC}$) and (1+$N_{DC}$):12:(145+$N_{DC}$), subcarrier index ranges corresponding to an RU 3 are (169+$N_{DC}$):12:(313+$N_{DC}$) and (337+$N_{DC}$):12:(481+$N_{DC}$), indexes corresponding to 4 null subcarriers that exist in the RU 1 to the RU 3 are: −(336+$N_{DC}$), −(168+$N_{DC}$), (157+$N_{DC}$), and (325+$N_{DC}$), subcarrier index ranges corresponding to an RU 4 are −(491+$N_{DC}$):12:−(347+$N_{DC}$) and −(323+$N_{DC}$):12:−(179+$N_{DC}$), subcarrier index ranges corresponding to an RU 5 are −(155+$N_{DC}$):12:−(11+$N_{DC}$) and (2+$N_{DC}$):12:(146+$N_{DC}$), subcarrier index ranges corresponding to an RU 6 are (170+$N_{DC}$):12:(314+$N_{DC}$) and (338+$N_{DC}$):12:(482+$N_{DC}$), indexes corresponding to 4 null subcarriers that exist in the RU 4 to the RU 6 are: −(335+$N_{DC}$), −(167+$N_{DC}$), (158+$N_{DC}$), and (326+$N_{DC}$), subcarrier index ranges corresponding to an RU 7 are −(490+$N_{DC}$):12:−(346+$N_{DC}$) and −(322+$N_{DC}$):12:−(178+$N_{DC}$), subcarrier index ranges corresponding to an RU 8 are −(154+$N_{DC}$):12:−(10+$N_{DC}$) and (3+$N_{DC}$):12:(147+$N_{DC}$), subcarrier index ranges corresponding to an RU 9 are (171+$N_{DC}$):12:(315+$N_{DC}$) and (339+$N_{DC}$):12:(483+$N_{DC}$), indexes corresponding to 4 null subcarriers that exist in the RU 7 to the RU 9 are: −(334+$N_{DC}$), −(166+$N_{DC}$), (159+$N_{DC}$), and (327+$N_{DC}$), subcarrier index ranges corresponding to an RU 10 are −(489+$N_{DC}$):12:−(345+$N_{DC}$) and −(321+$N_{DC}$):12:−(178+$N_{DC}$), subcarrier index ranges corresponding to an RU 11 are −(153+$N_{DC}$):12:−(9+$N_{DC}$) and (4+$N_{DC}$):12:(148+$N_{DC}$), subcarrier index ranges corresponding to an RU 12 are (172+$N_{DC}$):12:(316+$N_{DC}$) and (340+$N_{DC}$):12:(484+$N_{DC}$), indexes corresponding to 4 null subcarriers that exist in the RU 10 to the RU 12 are: −(333+$N_{DC}$), −(165+$N_{DC}$), (160+$N_{DC}$), and (328+$N_{DC}$), subcarrier index ranges corresponding to an RU 13 are −(488+$N_{DC}$):12:−(344+$N_{DC}$) and −(320+$N_{DC}$):12:−(176+$N_{DC}$), subcarrier index ranges corresponding to an RU 14 are −(152+$N_{DC}$):12:−(8+$N_{DC}$) and (5+$N_{DC}$):12:(149+$N_{DC}$), subcarrier index ranges corresponding to an RU 15 are (173+$N_{DC}$):12:(317+$N_{DC}$) and (341+$N_{DC}$):12:(485+$N_{DC}$), indexes corresponding to 4 null subcarriers that exist in the RU 13 to the RU 15 are: −(332+$N_{DC}$), −(164+$N_{DC}$), (161+$N_{DC}$), and (329+$N_{DC}$), subcarrier index ranges corresponding to an RU 16 are −(487+$N_{DC}$):12:−(343+$N_{DC}$) and −(319+$N_{DC}$):12:−(175+$N_{DC}$), subcarrier index ranges corresponding to an RU 17 are −(151+$N_{DC}$):12:−(7+$N_{DC}$) and (6+$N_{DC}$):12:(150+$N_{DC}$), subcarrier index ranges corresponding to an RU 18 are (174+$N_{DC}$):12:(318+$N_{DC}$) and (342+$N_{DC}$):12:(486+$N_{DC}$), indexes corresponding to 4 null subcarriers that exist in the RU 16 to the RU 18 are: −(331+$N_{DC}$), (163+$N_{DC}$), (162+$N_{DC}$), and (330+$N_{DC}$), subcarrier index ranges corresponding to an RU 19 are −(486+$N_{DC}$):12:−(342+$N_{DC}$) and −(318+$N_{DC}$):12:−(174+$N_{DC}$), subcarrier index ranges corresponding to an RU 20 are −(150+$N_{DC}$):12:−(6+$N_{DC}$) and (7+$N_{DC}$):12:(151+$N_{DC}$), subcarrier index ranges corresponding to an RU 21 are (175+$N_{DC}$):12:(319+$N_{DC}$) and (343+$N_{DC}$):12:(487+$N_{DC}$), indexes corresponding to 4 null subcarriers that exist in the RU 19 to the RU 21 are: −(330+$N_{DC}$), −(162+$N_{DC}$), (163+$N_{DC}$), and (331+$N_{DC}$), subcarrier index ranges corresponding to an RU 22 are −(485+$N_{DC}$):12:−(341+$N_{DC}$) and −(317+$N_{DC}$):12:−(173+$N_{DC}$), subcarrier index ranges corresponding to an RU 23 are −(149+$N_{DC}$):12:−(5+$N_{DC}$) and (8+$N_{DC}$):12:(152+$N_{DC}$), subcarrier index ranges corresponding to an RU 24 are (176+$N_{DC}$):12:(320+$N_{DC}$) and (344+$N_{DC}$):12:(488+$N_{DC}$), indexes corresponding to 4 null subcarriers that exist in the RU 22 to the RU 24 are: −(329+$N_{DC}$), −(161+$N_{DC}$), (164+$N_{DC}$), and (332+$N_{DC}$), subcarrier index ranges corresponding to an RU 25 are −(484+$N_{DC}$):12:−(340+$N_{DC}$) and −(316+$N_{DC}$):12:−(172+$N_{DC}$), subcarrier index ranges corresponding to an RU 26 are −(148+$N_{DC}$):12:−(4+$N_{DC}$) and (9+$N_{DC}$):12:(153+$N_{DC}$), subcarrier index ranges corresponding to an RU 27 are (177+$N_{DC}$):12:(321+$N_{DC}$) and (345+$N_{DC}$):12:(489+$N_{DC}$), indexes corresponding to 4 null subcarriers that exist in the RU 25 to the RU 27 are: −(328+$N_{DC}$), −(160+$N_{DC}$), (165+$N_{DC}$), and (333+$N_{DC}$), subcarrier index ranges corresponding to an RU 28 are $-(483+N_{DC})$:12:$-(339+N_{DC})$ and $-(315+N_{DC})$:12:$-(171+N_{DC})$, subcarrier index ranges corresponding to an RU 29 are $-(147+N_{DC})$:12:$-(3+N_{DC})$ and $(10+N_{DC})$:12:$(154+N_{DC})$, subcarrier index ranges corresponding to an RU 30 are $(178+N_{DC})$:12:$(322+N_{DC})$ and $(346+N_{DC})$:12:$(490+N_{DC})$, indexes corresponding to 4 null subcarriers that exist in the RU 28 to the RU 30 are: $-(327+N_{DC})$, $-(159+N_{DC})$, $(166+N_{DC})$, and $(334+N_{DC})$, subcarrier index ranges corresponding to an RU 31 are $-(482+N_{DC})$:12:$-(338+N_{DC})$ and $-(314+N_{DC})$:12:$-(170+N_{DC})$, subcarrier index ranges corresponding to an RU 32 are $-(146+N_{DC})$:12:$-(2+N_{DC})$ and $(11+N_{DC})$:12:$(155+N_{DC})$, subcarrier index ranges corresponding to an RU 33 are $(179+N_{DC})$:12:$(323+N_{DC})$ and $(347+N_{DC})$:12:$(491+N_{DC})$, indexes corresponding to 4 null subcarriers that exist in the RU 31 to the RU 33 are: $-(326+N_{DC})$, $-(158+N_{DC})$, $(167+N_{DC})$, and $(335+N_{DC})$, subcarrier index ranges corresponding to an RU 34 are $-(481+N_{DC})$:12:$-(337+N_{DC})$ and $-(313+N_{DC})$:12:$-(169+N_{DC})$, subcarrier index ranges corresponding to an RU 35 are $-(145+N_{DC})$:12:$-(1+N_{DC})$ and $(12+N_{DC})$:12:$(156+N_{DC})$, subcarrier index ranges corresponding to an RU 36 are $(180+N_{DC})$:12:$(324+N_{DC})$ and $(348+N_{DC})$:12:$(492+N_{DC})$, and indexes corresponding to 4 null subcarriers that exist in the RU 34 to the RU 36 are: $-(325+N_{DC})$, $-(157+N_{DC})$, $(168+N_{DC})$, and $(336+N_{DC})$; or each 80 MHz segment of the multiple of 80 MHz comprises 24 52-tone RUs, and subcarrier index ranges corresponding to the 24 52-tone RUs are shown below, wherein :12: indicates that an index difference between a latter subcarrier and a former subcarrier in two adjacent subcarriers is 12:

subcarrier index ranges corresponding to an RU 1 are $-(492+N_{DC})$:12:$-(348+N_{DC})$, $-(324+N_{DC})$:12:$-(180+N_{DC})$, $-(156+N_{DC})$:12:$-(12+N_{DC})$, and $(1+N_{DC})$:12:$(145+N_{DC})$, indexes corresponding to 2 null subcarriers that exist in the RU 1 are: $-(336+N_{DC})$ and $-(168+N_{DC})$, subcarrier index ranges corresponding to an RU 2 are $-(491+N_{DC})$:12:$-(347+N_{DC})$, $-(323+N_{DC})$:12:$-(179+N_{DC})$, $-(155+N_{DC})$:12:$-(11+N_{DC})$, and $(2+N_{DC})$:12:$(146+N_{DC})$, indexes corresponding to 2 null subcarriers that exist in the RU 2 are: $-(335+N_{DC})$ and $-(167+N_{DC})$, subcarrier index ranges corresponding to an RU 3 are $-(490+N_{DC})$:12:$-(346+N_{DC})$, $-(322+N_{DC})$:12:$-(178+N_{DC})$, $-(154+N_{DC})$:12:$-(10+N_{DC})$, and $(3+N_{DC})$:12:$(147+N_{DC})$, indexes corresponding to 2 null subcarriers that exist in the RU 3 are: $-(334+N_{DC})$ and $-(166+N_{DC})$, subcarrier index ranges corresponding to an RU 4 are $-(489+N_{DC})$:12:$-(345+N_{DC})$, $-(321+N_{DC})$:12:$-(178+N_{DC})$, $-(153+N_{DC})$:12:$-(9+N_{DC})$, and $(4+N_{DC})$:12:$(148+N_{DC})$, indexes corresponding to 2 null subcarriers that exist in the RU 4 are: $-(333+N_{DC})$ and $-(165+N_{DC})$, subcarrier index ranges corresponding to an RU 5 are $-(488+N_{DC})$:12:$-(344+N_{DC})$, $-(320+N_{DC})$:12:$-(176+N_{DC})$, $-(152+N_{DC})$:12:$-(8+N_{DC})$, and $(5+N_{DC})$:12:$(149+N_{DC})$, indexes corresponding to 2 null subcarriers that exist in the RU 5 are: $-(332+N_{DC})$ and $-(164+N_{DC})$, subcarrier index ranges corresponding to an RU 6 are $-(487+N_{DC})$:12:$-(343+N_{DC})$, $-(319+N_{DC})$:12:$-(175+N_{DC})$, $-(151+N_{DC})$:12:$-(7+N_{DC})$, and $(6+N_{DC})$:12:$(150+N_{DC})$, indexes corresponding to 2 null subcarriers that exist in the RU 6 are: $-(331+N_{DC})$ and $-(163+N_{DC})$, subcarrier index ranges corresponding to an RU 7 are $-(486+N_{DC})$:12:$-(342+N_{DC})$, $-(318+N_{DC})$:12:$-(174+N_{DC})$, $-(150+N_{DC})$:12:$-(6+N_{DC})$, and $(7+N_{DC})$:12:$(151+N_{DC})$, indexes corresponding to 2 null subcarriers that exist in the RU 7 are: $-(330+N_{DC})$ and $-(162+N_{DC})$, subcarrier index ranges corresponding to an RU 8 are $-(485+N_{DC})$:12:$-(341+N_{DC})$, $-(317+N_{DC})$:12:$-(173+N_{DC})$, $-(149+N_{DC})$:12:$-(5+N_{DC})$, and $(8+N_{DC})$:12:$(152+N_{DC})$, indexes corresponding to 2 null subcarriers that exist in the RU 8 are: $-(329+N_{DC})$ and $-(161+N_{DC})$, subcarrier index ranges corresponding to an RU 9 are $-(484+N_{DC})$:12:$-(340+N_{DC})$, $-(316+N_{DC})$:12:$-(172+N_{DC})$, $-(148+N_{DC})$:12:$-(4+N_{DC})$, and $(9+N_{DC})$:12:$(153+N_{DC})$, indexes corresponding to 2 null subcarriers that exist in the RU 9 are: $-(328+N_{DC})$ and $-(160+N_{DC})$, subcarrier index ranges corresponding to an RU 10 are $-(483+N_{DC})$:12:$-(339+N_{DC})$, $-(315+N_{DC})$:12:$-(171+N_{DC})$, $-(147+N_{DC})$:12:$-(3+N_{DC})$, and $(10+N_{DC})$:12:$(154+N_{DC})$, indexes corresponding to 2 null subcarriers that exist in the RU 10 are: $-(327+N_{DC})$ and $-(159+N_{DC})$, subcarrier index ranges corresponding to an RU 11 are $-(482+N_{DC})$:12:$-(338+N_{DC})$, $-(314+N_{DC})$:12:$-(170+N_{DC})$, $-(146+N_{DC})$:12:$-(2+N_{DC})$, and $(11+N_{DC})$:12:$(155+N_{DC})$, indexes corresponding to 2 null subcarriers that exist in the RU 11 are: $-(326+N_{DC})$ and $-(158+N_{DC})$, subcarrier index ranges corresponding to an RU 12 are $-(481+N_{DC})$:12:$-(337+N_{DC})$, $-(313+N_{DC})$:12:$-(169+N_{DC})$, $-(145+N_{DC})$:12:$-(1+N_{DC})$, and $(12+N_{DC})$:12:$(156+N_{DC})$, indexes corresponding to 2 null subcarriers that exist in the RU 12 are: $-(325+N_{DC})$ and $-(157+N_{DC})$, subcarrier index ranges corresponding to an RU 13 are $-(156+N_{DC})$:12:$-(12+N_{DC})$, $(1+N_{DC})$:12:$(145+N_{DC})$, $(169+N_{DC})$:12:$(313+N_{DC})$, and $(337+N_{DC})$:12:$(481+N_{DC})$, indexes corresponding to 2 null subcarriers that exist in the RU 13 are: $(157+N_{DC})$ and $(325+N_{DC})$, subcarrier index ranges corresponding to an RU 14 are $-(155+N_{DC})$:12:$-(11+N_{DC})$, $(2+N_{DC})$:12:$(146+N_{DC})$, $(170+N_{DC})$:12:$(314+N_{DC})$, and $(338+N_{DC})$:12:$(482+N_{DC})$, indexes corresponding to 2 null subcarriers that exist in the RU 14 are: $(158+N_{DC})$ and $(326+N_{DC})$, subcarrier index ranges corresponding to an RU 15 are $-(154+N_{DC})$:12:$-(10+N_{DC})$, $(3+N_{DC})$:12:$(147+N_{DC})$, $(171+N_{DC})$:12:$(315+N_{DC})$, and $(339+N_{DC})$:12:$(483+N_{DC})$, indexes corresponding to 2 null subcarriers that exist in the RU 15 are: $(159+N_{DC})$ and $(327+N_{DC})$, subcarrier index ranges corresponding to an RU 16 are −(153+$N_{DC}$):12:−(9+$N_{DC}$), (4+$N_{DC}$):12:(148+$N_{DC}$), (172+$N_{DC}$):12:(316+$N_{DC}$), and (340+$N_{DC}$):12:(484+$N_{DC}$), indexes corresponding to 2 null subcarriers that exist in the RU 16 are: (160+$N_{DC}$) and (328+$N_{DC}$), subcarrier index ranges corresponding to an RU 17 are −(152+$N_{DC}$):12:−(8+$N_{DC}$), (5+$N_{DC}$):12:(149+$N_{DC}$), (173+$N_{DC}$):12:(317+$N_{DC}$), and (341+$N_{DC}$):12:(485+$N_{DC}$), indexes corresponding to 2 null subcarriers that exist in the RU 17 are: (161+$N_{DC}$) and (329+$N_{DC}$), subcarrier index ranges corresponding to an RU 18 are −(151+$N_{DC}$):12:−(7+$N_{DC}$), (6+$N_{DC}$):12:(150+$N_{DC}$), (174+$N_{DC}$):12:(318+$N_{DC}$), and (342+$N_{DC}$):12:(486+$N_{DC}$), indexes corresponding to 2 null subcarriers that exist in the RU 18 are: (162+$N_{DC}$) and (330+$N_{DC}$), subcarrier index ranges corresponding to an RU 19 are −(150+$N_{DC}$):12:−(6+$N_{DC}$), (7+$N_{DC}$):12:(151+$N_{DC}$), (175+$N_{DC}$):12:(319+$N_{DC}$), and (343+$N_{DC}$):12:(487+$N_{DC}$), indexes corresponding to 2 null subcarriers that exist in the RU 19 are: (163+$N_{DC}$) and (331+$N_{DC}$), subcarrier index ranges corresponding to an RU 20 are −(149+$N_{DC}$):12:−(5+$N_{DC}$), (8+$N_{DC}$):12:(152+$N_{DC}$), (176+$N_{DC}$):12:(320+$N_{DC}$), and (344+$N_{DC}$):12:(488+$N_{DC}$), indexes corresponding to 2 null subcarriers that exist in the RU 20 are: (164+$N_{DC}$) and (332+$N_{DC}$), subcarrier index ranges corresponding to an RU 21 are −(148+$N_{DC}$):12:−(4+$N_{DC}$), (9+$N_{DC}$):12:(153+$N_{DC}$), (177+$N_{DC}$):12:(321+$N_{DC}$), and (345+$N_{DC}$):12:(489+$N_{DC}$), indexes corresponding to 2 null subcarriers that exist in the RU 21 are: (165+$N_{DC}$) and (333+$N_{DC}$), subcarrier index ranges corresponding to an RU 22 are −(147+$N_{DC}$):12:−(3+$N_{DC}$), (10+$N_{DC}$):12:(154+$N_{DC}$), (178+$N_{DC}$):12:(322+$N_{DC}$), and (346+$N_{DC}$):12:(490+$N_{DC}$), indexes corresponding to 2 null subcarriers that exist in the RU 22 are: (166+$N_{DC}$) and (334+$N_{DC}$), subcarrier index ranges corresponding to an RU 23 are −(146+$N_{DC}$):12:−(2+$N_{DC}$), (11+$N_{DC}$):12:(155+$N_{DC}$), (179+$N_{DC}$):12:(323+$N_{DC}$), and (347+$N_{DC}$):12:(491+$N_{DC}$), indexes corresponding to 2 null subcarriers that exist in the RU 23 are: (167+$N_{DC}$) and (335+$N_{DC}$), subcarrier index ranges corresponding to an RU 24 are −(145+$N_{DC}$):12:−(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 2 null subcarriers that exist in the RU 24 are: (168+$N_{DC}$) and (336+$N_{DC}$); or each 80 MHz segment of the multiple of 80 MHz comprises 12 52+26-tone RUs, and subcarrier index ranges corresponding to the 12 52+26-tone RUs are shown below, wherein :12:

indicates that an index difference between a latter subcarrier and a former subcarrier in two adjacent subcarriers is 12:

subcarrier index ranges corresponding to an RU 1 are −(492+$N_{DC}$):12:−(348+$N_{DC}$), −(324+$N_{DC}$):12:−(180+$N_{DC}$), −(156+$N_{DC}$):12:−(12+$N_{DC}$), (1+$N_{DC}$):12:(145+$N_{DC}$), (169+$N_{DC}$):12:(313+$N_{DC}$), and (337+$N_{DC}$):12:(481+$N_{DC}$), indexes corresponding to 4 null subcarriers that exist in the RU 1 are: −(336+$N_{DC}$), −(168+$N_{DC}$), (157+$N_{DC}$), and (325+$N_{DC}$), subcarrier index ranges corresponding to an RU 2 are −(491+$N_{DC}$):12:−(347+$N_{DC}$), −(323+$N_{DC}$):12:−(179+$N_{DC}$), −(155+$N_{DC}$):12:−(11+$N_{DC}$), (2+$N_{DC}$):12:(146+$N_{DC}$), (170+$N_{DC}$):12:(314+$N_{DC}$), and (338+$N_{DC}$):12:(482+$N_{DC}$), indexes corresponding to 4 null subcarriers that exist in the RU 2 are: −(335+$N_{DC}$), −(167+$N_{DC}$), (158+$N_{DC}$), and (326+$N_{DC}$), subcarrier index ranges corresponding to an RU 3 are −(490+$N_{DC}$):12:−(346+$N_{DC}$), −(322+$N_{DC}$):12:−(178+$N_{DC}$), −(154+$N_{DC}$):12:−(10+$N_{DC}$), (3+$N_{DC}$):12:(147+$N_{DC}$), (171+$N_{DC}$):12:(315+$N_{DC}$), and (339+$N_{DC}$):12:(483+$N_{DC}$), indexes corresponding to 4 null subcarriers that exist in the RU 3 are: −(334+$N_{DC}$), −(166+$N_{DC}$), (159+$N_{DC}$), and (327+$N_{DC}$), subcarrier index ranges corresponding to an RU 4 are −(489+$N_{DC}$):12:−(345+$N_{DC}$), −(321+$N_{DC}$):12:−(178+$N_{DC}$), −(153+$N_{DC}$):12:−(9+$N_{DC}$), (4+$N_{DC}$):12:(148+$N_{DC}$), (172+$N_{DC}$):12:(316+$N_{DC}$), and (340+$N_{DC}$):12:(484+$N_{DC}$), indexes corresponding to 4 null subcarriers that exist in the RU 4 comprise: −(333+$N_{DC}$) and −(165+$N_{DC}$), subcarrier index ranges corresponding to an RU 5 are −(488+$N_{DC}$):12:−(344+$N_{DC}$), −(320+$N_{DC}$):12:−(176+$N_{DC}$), −(152+$N_{DC}$):12:−(8+$N_{DC}$), and (5+$N_{DC}$):12:(149+$N_{DC}$), indexes corresponding to 4 null subcarriers that exist in the RU 5 are: −(333+$N_{DC}$), −(165+$N_{DC}$), (160+$N_{DC}$), and (328+$N_{DC}$), subcarrier index ranges corresponding to an RU 6 are −(487+$N_{DC}$):12:−(343+$N_{DC}$), −(319+$N_{DC}$):12:−(175+$N_{DC}$), −(151+$N_{DC}$):12:−(7+$N_{DC}$), (6+$N_{DC}$):12:(150+$N_{DC}$), (174+$N_{DC}$):12:(318+$N_{DC}$), and (342+$N_{DC}$):12:(486+$N_{DC}$), indexes corresponding to 4 null subcarriers that exist in the RU 6 are: −(331+$N_{DC}$), −(163+$N_{DC}$), (162+$N_{DC}$), and (330+$N_{DC}$), subcarrier index ranges corresponding to an RU 7 are −(486+$N_{DC}$):12:−(342+$N_{DC}$), −(318+$N_{DC}$):12:−(174+$N_{DC}$), −(150+$N_{DC}$):12:−(6+$N_{DC}$), (7+$N_{DC}$):12:(151+$N_{DC}$), (175+$N_{DC}$):12:(319+$N_{DC}$), and (343+$N_{DC}$):12:(487+$N_{DC}$), indexes corresponding to 4 null subcarriers that exist in the RU 7 are: −(330+$N_{DC}$), −(162+$N_{DC}$), (163+$N_{DC}$), and (331+$N_{DC}$), subcarrier index ranges corresponding to an RU 8 are −(485+$N_{DC}$):12:−(341+$N_{DC}$), −(317+$N_{DC}$):12:−(173+$N_{DC}$), −(149+$N_{DC}$):12:−(5+$N_{DC}$), (8+$N_{DC}$):12:(152+$N_{DC}$), (176+$N_{DC}$):12:(320+$N_{DC}$), and (344+$N_{DC}$):12:(488+$N_{DC}$), indexes corresponding to 4 null subcarriers that exist in the RU 8 are: −(329+$N_{DC}$), −(161+$N_{DC}$), (164+$N_{DC}$), and (332+$N_{DC}$), subcarrier index range corresponding to an RU 9 are −(484+$N_{DC}$):12:−(340+$N_{DC}$), −(316+$N_{DC}$):12:−(172+$N_{DC}$), −(148+$N_{DC}$):12:−(4+$N_{DC}$), (9+$N_{DC}$):12:(153+$N_{DC}$), (177+$N_{DC}$):12:(321+$N_{DC}$), and (345+$N_{DC}$):12:(489+$N_{DC}$), indexes corresponding to 4 null subcarriers that exist in the RU 9 are: −(328+$N_{DC}$), −(160+$N_{DC}$), (165+$N_{DC}$), and (333+$N_{DC}$), subcarrier index ranges corresponding to an RU 10 are −(483+$N_{DC}$):12:−(339+$N_{DC}$), −(315+$N_{DC}$):12:−(171+

$N_{DC}$), −(147+$N_{DC}$):12:−(3+$N_{DC}$), (10+$N_{DC}$):12:(154+$N_{DC}$), (178+$N_{DC}$):12:(322+$N_{DC}$), and (346+$N_{DC}$):12:(490+$N_{DC}$), indexes corresponding to 4 null subcarriers that exist in the RU 10 are: −(327+$N_{DC}$), −(159+$N_{DC}$), (166+$N_{DC}$), and (334+$N_{DC}$), subcarrier index ranges corresponding to an RU 11 are −(482+$N_{DC}$):12:−(338+$N_{DC}$), −(314+$N_{DC}$):12:−(170+$N_{DC}$), −(146+$N_{DC}$):12:−(2+$N_{DC}$), (11+$N_{DC}$):12:(155+$N_{DC}$), (179+$N_{DC}$):12:(323+$N_{DC}$), and (347+$N_{DC}$):12:(491+$N_{DC}$), indexes corresponding to 4 null subcarriers that exist in the RU 11 are: −(326+$N_{DC}$), −(158+$N_{DC}$), (167+$N_{DC}$), and (335+$N_{DC}$), subcarrier index ranges corresponding to an RU 12 are −(481+$N_{DC}$):12:−(337+$N_{DC}$), −(313+$N_{DC}$):12:−(169+$N_{DC}$), −(145+$N_{DC}$):12:−(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 4 null subcarriers that exist in the RU 12 are: −(325+$N_{DC}$), −(157+$N_{DC}$), (168+$N_{DC}$), and (336+$N_{DC}$); or each 80 MHz segment of the multiple of 80 MHz comprises 12 106-tone RUs, and subcarrier index ranges corresponding to the 12 106-tone RUs are shown below, wherein :12: indicates that an index difference between a latter subcarrier and a former subcarrier in two adjacent subcarriers is 12:

subcarrier index ranges corresponding to an RU 1 are −(492+$N_{DC}$):12:−(12+$N_{DC}$), (1+$N_{DC}$):12:(145+$N_{DC}$), −(491+$N_{DC}$):12:−(347+$N_{DC}$), −(323+$N_{DC}$):12:−(179+$N_{DC}$), −(155+$N_{DC}$):12:−(11+$N_{DC}$), and (2+$N_{DC}$):12:(146+$N_{DC}$), indexes corresponding to 2 null subcarriers that exist in the RU 1 are: −(335+$N_{DC}$) and −(167+$N_{DC}$), subcarrier index ranges corresponding to an RU 2 are −(490+$N_{DC}$):12−(10+$N_{DC}$), (3+$N_{DC}$):12:(147+$N_{DC}$), −(489+$N_{DC}$):12:−(345+$N_{DC}$), −(321+$N_{DC}$):12:−(178+$N_{DC}$), −(153+$N_{DC}$):12:−(9+$N_{DC}$), and (4+$N_{DC}$):12:(148+$N_{DC}$), indexes corresponding to 2 null subcarriers that exist in the RU 2 are: −(333+$N_{DC}$) and −(165+$N_{DC}$), subcarrier index ranges corresponding to an RU 3 are −(488+$N_{DC}$):12−(8+$N_{DC}$), (5+$N_{DC}$):12:(149+$N_{DC}$), −(487+$N_{DC}$):12:−(343+$N_{DC}$), −(319+$N_{DC}$):12:−(175+$N_{DC}$), −(151+$N_{DC}$):12:−(7+$N_{DC}$), and (6+$N_{DC}$):12:(150+$N_{DC}$), indexes corresponding to 2 null subcarriers that exist in the RU 3 are: −(331+$N_{DC}$) and −(163+$N_{DC}$), subcarrier index ranges corresponding to an RU 4 are −(486+$N_{DC}$):12−(6+$N_{DC}$), (7+$N_{DC}$):12:(151+$N_{DC}$), −(485+$N_{DC}$):12:−(341+$N_{DC}$), −(317+$N_{DC}$):12:−(173+$N_{DC}$), −(149+$N_{DC}$):12:−(5+$N_{DC}$), and (8+$N_{DC}$):12:(152+$N_{DC}$), indexes corresponding to 2 null subcarriers that exist in the RU 4 are: −(329+$N_{DC}$) and −(161+$N_{DC}$), subcarrier index ranges corresponding to an RU 5 are −(484+$N_{DC}$):12−(4+$N_{DC}$), (9+$N_{DC}$):12:(153+$N_{DC}$), −(483+$N_{DC}$):12:−(339+$N_{DC}$), −(315+$N_{DC}$):12:−(171+$N_{DC}$), −(147+$N_{DC}$):12:−(3+$N_{DC}$), and (10+$N_{DC}$):12:(154+$N_{DC}$), indexes corresponding to 2 null subcarriers that exist in the RU 5 are: −(327+$N_{DC}$) and −(159+$N_{DC}$), subcarrier index ranges corresponding to an RU 6 are −(482+$N_{DC}$):12:−(2+$N_{DC}$), (11+$N_{DC}$):12:(155+$N_{DC}$), −(481+$N_{DC}$):12:−(337+$N_{DC}$), −(313+$N_{DC}$):12:−(169+$N_{DC}$), −(145+$N_{DC}$):12:−(1+$N_{DC}$), and (12+$N_{DC}$):12:(156+$N_{DC}$), indexes corresponding to 2 null subcarriers that exist in the RU 6 are: −(325+$N_{DC}$) and −(157+$N_{DC}$), subcarrier index ranges corresponding to an RU 7 are −(156+$N_{DC}$):12:−(12+$N_{DC}$), (1+$N_{DC}$):12:(481+$N_{DC}$), −(155+$N_{DC}$):12:−(11+$N_{DC}$), (2+$N_{DC}$):12:(146+$N_{DC}$), (170+$N_{DC}$):12:(314+$N_{DC}$), and (338+$N_{DC}$):12:(482+$N_{DC}$), indexes corresponding to 2 null subcarriers that exist in the RU 7 are: (158+$N_{DC}$) and (326+$N_{DC}$), subcarrier index ranges corresponding to an RU 8 are −(154+$N_{DC}$):12:−(10+$N_{DC}$), (3+$N_{DC}$):12:(483+$N_{DC}$), −(153+$N_{DC}$):12:−(9+$N_{DC}$), (4+$N_{DC}$):12:(148+$N_{DC}$), (172+$N_{DC}$):12:(316+$N_{DC}$), and (340+$N_{DC}$):12:(484+$N_{DC}$), indexes corresponding to 2 null subcarriers that exist in the RU 8 are: (160+$N_{DC}$) and (328+$N_{DC}$), subcarrier index ranges corresponding to an RU 9 are −(152+$N_{DC}$):12:−(8+$N_{DC}$), (5+$N_{DC}$):12: (485+$N_{DC}$), −(151+$N_{DC}$):12:−(7+$N_{DC}$), (6+$N_{DC}$):12:(150+$N_{DC}$), (174+$N_{DC}$):12:(318+$N_{DC}$), and (342+$N_{DC}$):12:(486+$N_{DC}$), indexes corresponding to 2 null subcarriers that exist in the RU 9 are: (162+$N_{DC}$) and (330+$N_{DC}$), subcarrier index ranges corresponding to an RU 10 are −(150+$N_{DC}$):12:−(6+$N_{DC}$), (7+$N_{DC}$):12:(487+$N_{DC}$), −(149+$N_{DC}$):12:−(5+$N_{DC}$), (8+$N_{DC}$):12:(152+$N_{DC}$), (176+$N_{DC}$):12:(320+$N_{DC}$), and (344+$N_{DC}$):12:(488+$N_{DC}$), indexes corresponding to 2 null subcarriers that exist in the RU 10 are: (164+$N_{DC}$) and (332+$N_{DC}$), subcarrier index ranges corresponding to an RU 11 are −(148+$N_{DC}$):12:−(4+$N_{DC}$), (9+$N_{DC}$):12:(489+$N_{DC}$), −(147+$N_{DC}$):12:−(3+$N_{DC}$), (10+$N_{DC}$):12:(154+$N_{DC}$), (178+$N_{DC}$):12:(322+$N_{DC}$), and (346+$N_{DC}$):12:(490+$N_{DC}$), indexes corresponding to 2 null subcarriers that exist in the RU 11 are: (166+$N_{DC}$) and (334+$N_{DC}$), subcarrier index ranges corresponding to an RU 12 are −(146+$N_{DC}$):12:−(2+$N_{DC}$), (11+$N_{DC}$):12:(491+$N_{DC}$), −(145+$N_{DC}$):12:−(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 2 null subcarriers that exist in the RU 12 are: (168+$N_{DC}$) and (336+$N_{DC}$); or each 80 MHz segment of the multiple of 80 MHz comprises 4 242-tone RUs, and subcarrier index ranges corresponding to the 4 242-tone RUs are shown below, wherein :12: indicates that an index difference between a latter subcarrier and a former subcarrier in two adjacent subcarriers is 12:

subcarrier index ranges corresponding to an RU 1 are −(492+$N_{DC}$):12:−(12+$N_{DC}$), −(491+$N_{DC}$):12:−(23+$N_{DC}$), −(490+$N_{DC}$):12:−(22+$N_{DC}$), (13+$N_{DC}$):12:(481+$N_{DC}$), (14+$N_{DC}$):12:(482+$N_{DC}$), and (3+$N_{DC}$):12:(483+$N_{DC}$), subcarrier index ranges corresponding to an RU 2 are −(489+$N_{DC}$):12:−(9+$N_{DC}$), −(488+$N_{DC}$):12:−(20+$N_{DC}$), −(487+$N_{DC}$):12:−(19+$N_{DC}$), (16+$N_{DC}$):12:(484+$N_{DC}$), (17+$N_{DC}$):12:(485+$N_{DC}$), and (6+$N_{DC}$):12:(486+$N_{DC}$), subcarrier index ranges corresponding to an RU 3 are −(486+$N_{DC}$):12:−(6+$N_{DC}$), −(485+$N_{DC}$):12:−(17+

$N_{DC}$), (484+$N_{DC}$):12:−(16+$N_{DC}$), (19+$N_{DC}$):12:(487+$N_{DC}$), (20+$N_{DC}$):12:(488+$N_{DC}$), and (9+$N_{DC}$):12:(489+$N_{DC}$), and subcarrier index ranges corresponding to an RU 4 are −(483+$N_{DC}$):12:−(3+$N_{DC}$), −(482+$N_{DC}$):12:−(14+$N_{DC}$), −(481+$N_{DC}$):12:−(13+$N_{DC}$), (22+$N_{DC}$):12:(490+$N_{DC}$), (23+$N_{DC}$):12:(491+$N_{DC}$), and (12+$N_{DC}$):12:(492+$N_{DC}$).

4. A method for receiving a physical layer protocol data unit, comprising:

receiving a physical layer protocol data unit (PPDU) on one or more discrete resource units (RUS), wherein each of the one or more discrete RUs comprises a plurality of subcarriers that are discrete in frequency domain; and parsing the PPDU, wherein each of the one or more discrete RUs is an X-tone RU, a value of X is any one or a combination of 13, 26, 52, 106, 242, 484, and 996, and the X-tone RU comprises X subcarriers, wherein each of the one or more discrete RUs is located in a first bandwidth, and the first bandwidth is a multiple of 80 MHz, and wherein each 80 MHz segment of the multiple of 80 MHz comprises 1024 contiguous subcarriers, indexes of the 1024 contiguous subcarriers range from −512 to 511 with a spacing of 1 in ascending order of subcarrier frequencies, and indexes of direct current subcarriers in the 1024 contiguous subcarriers range from $-N_{DC}$ to $N_{DC}$ with a spacing of 1, where $N_{DC}>2$.

5. The method according to claim 4, wherein each of the one or more discrete RUs is a 26-tone RU, and the 26-tone RU consists of two 13-tone RUs; or each of the one or more discrete RUs is a 52-tone RU, and the 52-tone RU consists of two 26-tone RUs;

each of the one or more discrete RUs is a 52+26-tone RU, and the 52+26-tone RU consists of one 52-tone RU and one 26-tone RU; or each of the one or more discrete RUs is a 106-tone RU, and the 106-tone RU consists of two 52-tone RUs and two null subcarriers; or each of the one or more discrete RUs is a 242-tone RU, and the 242-tone RU consists of a plurality of 26-tone RUs.

6. A communication apparatus, comprising:

a memory, configured to store computer instructions; and a processor, configured to execute the computer instructions stored in the memory, to enable the processor to perform operations comprising:

generating a physical layer protocol data unit (PPDU); and sending the PPDU on one or more discrete resource units (RUS), wherein each of the one or more discrete RUs comprises a plurality of subcarriers that are discrete in frequency domain, wherein each of the one or more discrete RUs is an X-tone RU, a value of X is any one or a combination of 13, 26, 52, 106, 242, 484, and 996, and the X-tone RU comprises X subcarriers, wherein each of the one or more discrete RUs is located in a first bandwidth, and the first bandwidth is a multiple of 80 MHz, and wherein each 80 MHz segment of the multiple of 80 MHz comprises 1024 contiguous subcarriers, indexes of the 1024 contiguous subcarriers range from −512 to 511 with a spacing of 1 in ascending order of subcarrier frequencies, and indexes of direct current subcarriers in the 1024 contiguous subcarriers range from $-N_{DC}$ to $N_{DC}$ with a spacing of 1, where $N_{DC}\geq 2$.

7. The apparatus according to claim 6, wherein each of the one or more discrete RUs is a 26-tone RU, and the 26-tone RU consists of two 13-tone RUs; or each of the one or more discrete RUs is a 52-tone RU, and the 52-tone RU consists of two 26-tone RUs; or each of the one or more discrete RUs is a 52+26-tone RU, and the 52+26-tone RU consists of one 52-tone RU and one 26-tone RU; or each of the one or more discrete RUs is a 106-tone RU, and the 106-tone RU consists of two 52-tone RUs and two null subcarriers; or each of the one or more discrete RUs is a 242-tone RU, and the 242-tone RU consists of a plurality of 26-tone RUs.

8. The apparatus according to claim 6, wherein each 80 MHz segment of the multiple of 80 MHz comprises 72 13-tone RUs, and subcarrier index ranges corresponding to the 72 13-tone RUs are shown below, wherein :12: indicates that an index difference between a latter subcarrier and a former subcarrier in two adjacent subcarriers is 12:

a subcarrier index range corresponding to an RU 1 is −(492+$N_{DC}$):12:−(348+$N_{DC}$), a subcarrier index range corresponding to an RU 2 is −(324+$N_{DC}$):12:−(180+$N_{DC}$), a subcarrier index range corresponding to an RU 3 is −(156+$N_{DC}$):12:−(12+$N_{DC}$), a subcarrier index range corresponding to an RU 4 is (1+$N_{DC}$):12:(145+$N_{DC}$), a subcarrier index range corresponding to an RU 5 is (169+$N_{DC}$):12:(313+$N_{DC}$), a subcarrier index range corresponding to an RU 6 is (337+$N_{DC}$):12:(481+$N_{DC}$), indexes corresponding to 4 null subcarriers that exist between the RU 1 and the RU 6 are: −(336+$N_{DC}$), −(168+$N_{DC}$), (157+$N_{DC}$), and (325+$N_{DC}$), a subcarrier index range corresponding to an RU 7 is −(491+$N_{DC}$):12:−(347+$N_{DC}$), a subcarrier index range corresponding to an RU 8 is −(323+$N_{DC}$):12:−(179+$N_{DC}$), a subcarrier index range corresponding to an RU 9 is −(155+$N_{DC}$):12:−(11+$N_{DC}$), a subcarrier index range corresponding to an RU 10 is (2+$N_{DC}$):12:(146+$N_{DC}$), a subcarrier index range corresponding to an RU 11 is (170+$N_{DC}$):12:(314+$N_{DC}$), a subcarrier index range corresponding to an RU 12 is (338+$N_{DC}$):12:(482+$N_{DC}$), indexes corresponding to 4 null subcarriers that exist between the RU 7 and the RU 12 are: −(335+$N_{DC}$), −(167+$N_{DC}$), (158+$N_{DC}$), and (326+$N_{DC}$), a subcarrier index range corresponding to an RU 13 is −(490+$N_{DC}$):12:−(346+$N_{DC}$), a subcarrier index range corresponding to an RU 14 is −(322+$N_{DC}$):12:−(178+$N_{DC}$), a subcarrier index range corresponding to an RU 15 is −(154+$N_{DC}$):12:−(10+$N_{DC}$), a subcarrier index range corresponding to an RU 16 is (3+$N_{DC}$):12:(147+$N_{DC}$), a subcarrier index range corresponding to an RU 17 is (171+$N_{DC}$):12:(315+$N_{DC}$), a subcarrier index range corresponding to an RU 18 is $(339+N_{DC}):12:(483+N_{DC})$, indexes corresponding to 4 null subcarriers that exist between the RU 13 and the RU 18 are: $-(334+N_{DC})$, $-(166+N_{DC})$, $(159+N_{DC})$, and $(327+N_{DC})$, a subcarrier index range corresponding to an RU 19 is $-(489+N_{DC}):12:-(345+N_{DC})$, a subcarrier index range corresponding to an RU 20 is $-(321+N_{DC}):12:-(178+N_{DC})$, a subcarrier index range corresponding to an RU 21 is $-(153+N_{DC}):12:-(9+N_{DC})$, a subcarrier index range corresponding to an RU 22 is $(4+N_{DC}):12:(148+N_{DC})$, a subcarrier index range corresponding to an RU 23 is $(172+N_{DC}):12:(316+N_{DC})$, a subcarrier index range corresponding to an RU 24 is $(340+N_{DC}):12:(484+N_{DC})$, indexes corresponding to 4 null subcarriers that exist between the RU 19 and the RU 24 are: $-(333+N_{DC})$, $-(165+N_{DC})$, $(160+N_{DC})$, and $(328+N_{DC})$, a subcarrier index range corresponding to an RU 25 is $-(488+N_{DC}):12:-(344+N_{DC})$, a subcarrier index range corresponding to an RU 26 is $-(320+N_{DC}):12:-(176+N_{DC})$, a subcarrier index range corresponding to an RU 27 is $-(152+N_{DC}):12:-(8+N_{DC})$, a subcarrier index range corresponding to an RU 28 is $(5+N_{DC}):12:(149+N_{DC})$, a subcarrier index range corresponding to an RU 29 is $(173+N_{DC}):12:(317+N_{DC})$, a subcarrier index range corresponding to an RU 30 is $(341+N_{DC}):12:(485+N_{DC})$, indexes corresponding to 4 null subcarriers that exist between the RU 25 and the RU 30 are: $-(332+N_{DC})$, $-(164+N_{DC})$, $(161+N_{DC})$, and $(329+N_{DC})$, a subcarrier index range corresponding to an RU 31 is $-(487+N_{DC}):12:-(343+N_{DC})$, a subcarrier index range corresponding to an RU 32 is $-(319+N_{DC}):12:-(175+N_{DC})$, a subcarrier index range corresponding to an RU 33 is $-(151+N_{DC}):12:-(7+N_{DC})$, a subcarrier index range corresponding to an RU 34 is $(6+N_{DC}):12:(150+N_{DC})$, a subcarrier index range corresponding to an RU 35 is $(174+N_{DC}):12:(318+N_{DC})$, a subcarrier index range corresponding to an RU 36 is $(342+N_{DC}):12:(486+N_{DC})$, indexes corresponding to 4 null subcarriers that exist between the RU 31 and the RU 36 are: $-(331+N_{DC})$, $-(163+N_{DC})$, $(162+N_{DC})$, and $(330+N_{DC})$, a subcarrier index range corresponding to an RU 37 is $-(486+N_{DC}):12:-(342+N_{DC})$, a subcarrier index range corresponding to an RU 38 is $-(318+N_{DC}):12:-(174+N_{DC})$, a subcarrier index range corresponding to an RU 39 is $-(150+N_{DC}):12:-(6+N_{DC})$, a subcarrier index range corresponding to an RU 40 is $(7+N_{DC}):12:(151+N_{DC})$, a subcarrier index range corresponding to an RU 41 is $(175+N_{DC}):12:(319+N_{DC})$, a subcarrier index range corresponding to an RU 42 is $(343+N_{DC}):12:(487+N_{DC})$, indexes corresponding to 4 null subcarriers that exist between the RU 37 and the RU 42 are: $-(330+N_{DC})$, $-(162+N_{DC})$, $(163+N_{DC})$, and $(331+N_{DC})$, a subcarrier index range corresponding to an RU 43 is $-(485+N_{DC}):12:-(341+N_{DC})$, a subcarrier index range corresponding to an RU 44 is $-(317+N_{DC}):12:-(173+N_{DC})$, a subcarrier index range corresponding to an RU 45 is $-(149+N_{DC}):12:-(5+N_{DC})$, a subcarrier index range corresponding to an RU 46 is $(8+N_{DC}):12:(152+N_{DC})$, a subcarrier index range corresponding to an RU 47 is $(176+N_{DC}):12:(320+N_{DC})$, a subcarrier index range corresponding to an RU 48 is $(344+N_{DC}):12:(488+N_{DC})$, indexes corresponding to 4 null subcarriers that exist between the RU 43 and the RU 48 are: $-(329+N_{DC})$, $-(161+N_{DC})$, $(164+N_{DC})$, and $(332+N_{DC})$, a subcarrier index range corresponding to an RU 49 is $-(484+N_{DC}):12:-(340+N_{DC})$, a subcarrier index range corresponding to an RU 50 is $-(316+N_{DC}):12:-(172+N_{DC})$, a subcarrier index range corresponding to an RU 51 is $-(148+N_{DC}):12:-(4+N_{DC})$, a subcarrier index range corresponding to an RU 52 is $(9+N_{DC}):12:(153+N_{DC})$, a subcarrier index range corresponding to an RU 53 is $(177+N_{DC}):12:(321+N_{DC})$, a subcarrier index range corresponding to an RU 54 is $(345+N_{DC}):12:(489+N_{DC})$, indexes corresponding to 4 null subcarriers that exist between the RU 49 and the RU 54 are: $-(328+N_{DC})$, $-(160+N_{DC})$, $(165+N_{DC})$, and $(333+N_{DC})$, a subcarrier index range corresponding to an RU 55 is $-(483+N_{DC}):12:-(339+N_{DC})$, a subcarrier index range corresponding to an RU 56 is $-(315+N_{DC}):12:-(171+N_{DC})$, a subcarrier index range corresponding to an RU 57 is $-(147+N_{DC}):12:-(3+N_{DC})$, a subcarrier index range corresponding to an RU 58 is $(10+N_{DC}):12:(154+N_{DC})$, a subcarrier index range corresponding to an RU 59 is $(178+N_{DC}):12:(322+N_{DC})$, a subcarrier index range corresponding to an RU 60 is $(346+N_{DC}):12:(490+N_{DC})$, indexes corresponding to 4 null subcarriers that exist between the RU 55 and the RU 60 are: $-(327+N_{DC})$, $-(159+N_{DC})$, $(166+N_{DC})$, and $(334+N_{DC})$, a subcarrier index range corresponding to an RU 61 is $-(482+N_{DC}):12:-(338+N_{DC})$, a subcarrier index range corresponding to an RU 62 is $-(314+N_{DC}):12:-(170+N_{DC})$, a subcarrier index range corresponding to an RU 63 is $-(146+N_{DC}):12:-(2+N_{DC})$, a subcarrier index range corresponding to an RU 64 is $(11+N_{DC}):12:(155+N_{DC})$, a subcarrier index range corresponding to an RU 65 is $(179+N_{DC}):12:(323+N_{DC})$, a subcarrier index range corresponding to an RU 66 is $(347+N_{DC}):12:(491+N_{DC})$, indexes corresponding to 4 null subcarriers that exist between the RU 61 and the RU 66 are: $-(326+N_{DC})$, $-(158+N_{DC})$, $(167+N_{DC})$, and $(335+N_{DC})$, a subcarrier index range corresponding to an RU 67 is $-(481+N_{DC}):12:-(337+N_{DC})$, a subcarrier index range corresponding to an RU 68 is $-(313+N_{DC}):12:-(169+N_{DC})$, a subcarrier index range corresponding to an RU 69 is $-(145+N_{DC}):12:-(1+N_{DC})$, a subcarrier index range corresponding to an RU 70 is $(12+N_{DC}):12:(156+N_{DC})$, a subcarrier index range corresponding to an RU 71 is $(180+N_{DC}):12:(324+N_{DC})$, a subcarrier index range corresponding to an RU 72 is $(348+N_{DC}):12:(492+N_{DC})$, and indexes corresponding to 4 null subcarriers that exist between the RU 67 and the RU 72 are: $-(325+N_{DC})$, $-(157+N_{DC})$, $(168+N_{DC})$, and $(336+N_{DC})$; or each 80 MHz segment of the multiple of 80 MHz comprises 36 26-tone RUs, and subcarrier index ranges corresponding to the 36 26-tone RUs are shown below, wherein :12: indicates that an index difference between a latter subcarrier and a former subcarrier in two adjacent subcarriers is 12:

subcarrier index ranges corresponding to an RU 1 are $-(492+N_{DC}):12:-(348+N_{DC})$ and $-(324+N_{DC}):12:-(180+N_{DC})$, subcarrier index ranges corresponding to an RU 2 are $-(156+N_{DC}):12:-(12+N_{DC})$ and $(1+N_{DC}):12:(145+N_{DC})$, subcarrier index ranges corresponding to an RU 3 are $(169+N_{DC}):12:(313+N_{DC})$ and $(337+N_{DC}):12:(481+N_{DC})$, indexes corresponding to 4 null subcarriers that exist in the RU 1 to the RU 3 are: $-(336+N_{DC})$, $-(168+N_{DC})$, $(157+N_{DC})$, and $(325+N_{DC})$, subcarrier index ranges corresponding to an RU 4 are $-(491+N_{DC}):12:-(347+N_{DC})$ and $-(323+N_{DC}):12:-(179+N_{DC})$, subcarrier index ranges corresponding to an RU 5 are $-(155+N_{DC}):12:-(11+N_{DC})$ and $(2+N_{DC}):12:(146+N_{DC})$, subcarrier index ranges corresponding to an RU 6 are $(170+N_{DC}):12:(314+N_{DC})$ and $(338+N_{DC}):12:(482+N_{DC})$, indexes corresponding to 4 null subcarriers that exist in the RU 4 to the RU 6 are: $-(335+N_{DC})$, $-(167+N_{DC})$, $(158+N_{DC})$, and $(326+N_{DC})$, subcarrier index ranges corresponding to an RU 7 are $-(490+N_{DC}):12:-(346+N_{DC})$ and $-(322+N_{DC}):12:-(178+N_{DC})$, subcarrier index ranges corresponding to an RU 8 are $-(154+N_{DC}):12:-(10+N_{DC})$ and $(3+N_{DC}):12:(147+N_{DC})$, subcarrier index ranges corresponding to an RU 9 are $(171+N_{DC}):12:(315+N_{DC})$ and $(339+N_{DC}):12:(483+N_{DC})$, indexes corresponding to 4 null subcarriers that exist in the RU 7 to the RU 9 are: $-(334+N_{DC})$, $-(166+N_{DC})$, $(159+N_{DC})$, and $(327+N_{DC})$, subcarrier index ranges corresponding to an RU 10 are $-(489+N_{DC}):12:-(345+N_{DC})$ and $-(321+N_{DC}):12:-(178+N_{DC})$, subcarrier index ranges corresponding to an RU 11 are $-(153+N_{DC}):12:-(9+N_{DC})$ and $(4+N_{DC}):12:(148+N_{DC})$, subcarrier index ranges corresponding to an RU 12 are $(172+N_{DC}):12:(316+N_{DC})$ and $(340+N_{DC}):12:(484+N_{DC})$, indexes corresponding to 4 null subcarriers that exist in the RU 10 to the RU 12 are: $-(333+N_{DC})$, $-(165+N_{DC})$, $(160+N_{DC})$, and $(328+N_{DC})$, subcarrier index ranges corresponding to an RU 13 are $-(488+N_{DC}):12:-(344+N_{DC})$ and $-(320+N_{DC}):12:-(176+N_{DC})$, subcarrier index ranges corresponding to an RU 14 are $-(152+N_{DC}):12:-(8+N_{DC})$ and $(5+N_{DC}):12:(149+N_{DC})$, subcarrier index ranges corresponding to an RU 15 are $(173+N_{DC}):12:(317+N_{DC})$ and $(341+N_{DC}):12:(485+N_{DC})$, indexes corresponding to 4 null subcarriers that exist in the RU 13 to the RU 15 are: $-(332+N_{DC})$, $-(164+N_{DC})$, $(161+N_{DC})$, and $(329+N_{DC})$, subcarrier index ranges corresponding to an RU 16 are $-(487+N_{DC}):12:-(343+N_{DC})$ and $-(319+N_{DC}):12:-(175+N_{DC})$, subcarrier index ranges corresponding to an RU 17 are $-(151+N_{DC}):12:-(7+N_{DC})$ and $(6+N_{DC}):12:(150+N_{DC})$, subcarrier index ranges corresponding to an RU 18 are $(174+N_{DC}):12:(318+N_{DC})$ and $(342+N_{DC}):12:(486+N_{DC})$, indexes corresponding to 4 null subcarriers that exist in the RU 16 to the RU 18 are: $-(331+N_{DC})$, $-(163+N_{DC})$, $(162+N_{DC})$, and $(330+N_{DC})$, subcarrier index ranges corresponding to an RU 19 are $-(486+N_{DC}):12:-(342+N_{DC})$ and $-(318+N_{DC}):12:-(174+N_{DC})$, subcarrier index ranges corresponding to an RU 20 are $-(150+N_{DC}):12:-(6+N_{DC})$ and $(7+N_{DC}):12:(151+N_{DC})$, subcarrier index ranges corresponding to an RU 21 are $(175+N_{DC}):12:(319+N_{DC})$ and $(343+N_{DC}):12:(487+N_{DC})$, indexes corresponding to 4 null subcarriers that exist in the RU 19 to the RU 21 are: $-(330+N_{DC})$, $-(162+N_{DC})$, $(163+N_{DC})$, and $(331+N_{DC})$, subcarrier index ranges corresponding to an RU 22 are $-(485+N_{DC}):12:-(341+N_{DC})$ and $-(317+N_{DC}):12:-(173+N_{DC})$, subcarrier index ranges corresponding to an RU 23 are $-(149+N_{DC}):12:-(5+N_{DC})$ and $(8+N_{DC}):12:(152+N_{DC})$, subcarrier index ranges corresponding to an RU 24 are $(176+N_{DC}):12:(320+N_{DC})$ and $(344+N_{DC}):12:(488+N_{DC})$, indexes corresponding to 4 null subcarriers that exist in the RU 22 to the RU 24 are: $-(329+N_{DC})$, $-(161+N_{DC})$, $(164+N_{DC})$, and $(332+N_{DC})$, subcarrier index ranges corresponding to an RU 25 are $-(484+N_{DC}):12:-(340+N_{DC})$ and $-(316+N_{DC}):12:-(172+N_{DC})$, subcarrier index ranges corresponding to an RU 26 are $-(148+N_{DC}):12:-(4+N_{DC})$ and $(9+N_{DC}):12:(153+N_{DC})$, subcarrier index ranges corresponding to an RU 27 are $(177+N_{DC}):12:(321+N_{DC})$ and $(345+N_{DC}):12:(489+N_{DC})$, indexes corresponding to 4 null subcarriers that exist in the RU 25 to the RU 27 are: $-(328+N_{DC})$, $-(160+N_{DC})$, $(165+N_{DC})$, and $(333+N_{DC})$, subcarrier index ranges corresponding to an RU 28 are $-(483+N_{DC}):12:-(339+N_{DC})$ and $-(315+N_{DC}):12:-(171+N_{DC})$, subcarrier index ranges corresponding to an RU 29 are $-(147+N_{DC}):12:-(3+N_{DC})$ and $(10+N_{DC}):12:(154+N_{DC})$, subcarrier index ranges corresponding to an RU 30 are $(178+N_{DC}):12:(322+N_{DC})$ and $(346+N_{DC}):12:(490+N_{DC})$, indexes corresponding to 4 null subcarriers that exist in the RU 28 to the RU 30 are: $-(327+N_{DC})$, $-(159+N_{DC})$, $(166+N_{DC})$, and $(334+N_{DC})$, subcarrier index ranges corresponding to an RU 31 are $-(482+N_{DC})$:12:$-(338+N_{DC})$ and $-(314+N_{DC})$:12:$-(170+N_{DC})$, subcarrier index ranges corresponding to an RU 32 are $-(146+N_{DC})$:12:$-(2+N_{DC})$ and $(11+N_{DC})$:12:$(155+N_{DC})$, subcarrier index ranges corresponding to an RU 33 are $(179+N_{DC})$:12:$(323+N_{DC})$ and $(347+N_{DC})$:12:$(491+N_{DC})$, indexes corresponding to 4 null subcarriers that exist in the RU 31 to the RU 33 are: $-(326+N_{DC})$, $-(158+N_{DC})$, $(167+N_{DC})$, and $(335+N_{DC})$, subcarrier index ranges corresponding to an RU 34 are $-(481+N_{DC})$:12:$-(337+N_{DC})$ and $-(313+N_{DC})$:12:$-(169+N_{DC})$, subcarrier index ranges corresponding to an RU 35 are $-(145+N_{DC})$:12:$-(1+N_{DC})$ and $(12+N_{DC})$:12:$(156+N_{DC})$, subcarrier index ranges corresponding to an RU 36 are $(180+N_{DC})$:12:$(324+N_{DC})$ and $(348+N_{DC})$:12:$(492+N_{DC})$, and indexes corresponding to 4 null subcarriers that exist in the RU 34 to the RU 36 are: $-(325+N_{DC})$, $-(157+N_{DC})$, $(168+N_{DC})$, and $(336+N_{DC})$; or each 80 MHz segment of the multiple of 80 MHz comprises 24 52-tone RUs, and subcarrier index ranges corresponding to the 24 52-tone RUs are shown below, wherein :12: indicates that an index difference between a latter subcarrier and a former subcarrier in two adjacent subcarriers is 12:

subcarrier index ranges corresponding to an RU 1 are $-(492+N_{DC})$:12:$-(348+N_{DC})$, $-(324+N_{DC})$:12:$-(180+N_{DC})$, $-(156+N_{DC})$:12:$-(12+N_{DC})$, and $(1+N_{DC})$:12:$(145+N_{DC})$, indexes corresponding to 2 null subcarriers that exist in the RU 1 are: $-(336+N_{DC})$ and $-(168+N_{DC})$, subcarrier index ranges corresponding to an RU 2 are $-(491+N_{DC})$:12:$-(347+N_{DC})$, $-(323+N_{DC})$:12:$-(179+N_{DC})$, $-(155+N_{DC})$:12:$-(11+N_{DC})$, and $(2+N_{DC})$:12:$(146+N_{DC})$, indexes corresponding to 2 null subcarriers that exist in the RU 2 are: $-(335+N_{DC})$ and $-(167+N_{DC})$, subcarrier index ranges corresponding to an RU 3 are $-(490+N_{DC})$:12:$-(346+N_{DC})$, $-(322+N_{DC})$:12:$-(178+N_{DC})$, $-(154+N_{DC})$:12:$-(10+N_{DC})$, and $(3+N_{DC})$:12:$(147+N_{DC})$, indexes corresponding to 2 null subcarriers that exist in the RU 3 are: $-(334+N_{DC})$ and $-(166+N_{DC})$, subcarrier index ranges corresponding to an RU 4 are $-(489+N_{DC})$:12:$-(345+N_{DC})$, $-(321+N_{DC})$:12:$-(178+N_{DC})$, $-(153+N_{DC})$:12:$-(9+N_{DC})$, and $(4+N_{DC})$:12:$(148+N_{DC})$, indexes corresponding to 2 null subcarriers that exist in the RU 4 are: $-(333+N_{DC})$ and $-(165+N_{DC})$, subcarrier index ranges corresponding to an RU 5 are $-(488+N_{DC})$:12:$-(344+N_{DC})$, $-(320+N_{DC})$:12:$-(176+N_{DC})$, $-(152+N_{DC})$:12:$-(8+N_{DC})$, and $(5+N_{DC})$:12:$(149+N_{DC})$, indexes corresponding to 2 null subcarriers that exist in the RU 5 are: $-(332+N_{DC})$ and $-(164+N_{DC})$, subcarrier index ranges corresponding to an RU 6 are $-(487+N_{DC})$:12:$-(343+N_{DC})$, $-(319+N_{DC})$:12:$-(175+N_{DC})$, $-(151+N_{DC})$:12:$-(7+N_{DC})$, and $(6+N_{DC})$:12:$(150+N_{DC})$, indexes corresponding to 2 null subcarriers that exist in the RU 6 are: $-(331+N_{DC})$ and $-(163+N_{DC})$, subcarrier index ranges corresponding to an RU 7 are $-(486+N_{DC})$:12:$-(342+N_{DC})$, $-(318+N_{DC})$:12:$-(174+N_{DC})$, $-(150+N_{DC})$:12:$-(6+N_{DC})$, and $(7+N_{DC})$:12:$(151+N_{DC})$, indexes corresponding to 2 null subcarriers that exist in the RU 7 are: $-(330+N_{DC})$ and $-(162+N_{DC})$, subcarrier index ranges corresponding to an RU 8 are $-(485+N_{DC})$:12:$-(341+N_{DC})$, $-(317+N_{DC})$:12:$-(173+N_{DC})$, $-(149+N_{DC})$:12:$-(5+N_{DC})$, and $(8+N_{DC})$:12:$(152+N_{DC})$, indexes corresponding to 2 null subcarriers that exist in the RU 8 are: $-(329+N_{DC})$ and $-(161+N_{DC})$, subcarrier index ranges corresponding to an RU 9 are $-(484+N_{DC})$:12:$-(340+N_{DC})$, $-(316+N_{DC})$:12:$-(172+N_{DC})$, $-(148+N_{DC})$:12:$-(4+N_{DC})$, and $(9+N_{DC})$:12:$(153+N_{DC})$, indexes corresponding to 2 null subcarriers that exist in the RU 9 are: $-(328+N_{DC})$ and $-(160+N_{DC})$, subcarrier index ranges corresponding to an RU 10 are $-(483+N_{DC})$:12:$-(339+N_{DC})$, $-(315+N_{DC})$:12:$-(171+N_{DC})$, $-(147+N_{DC})$:12:$-(3+N_{DC})$, and $(10+N_{DC})$:12:$(154+N_{DC})$, indexes corresponding to 2 null subcarriers that exist in the RU 10 are: $-(327+N_{DC})$ and $-(159+N_{DC})$, subcarrier index ranges corresponding to an RU 11 are $-(482+N_{DC})$:12:$-(338+N_{DC})$, $-(314+N_{DC})$:12:$-(170+N_{DC})$, $-(146+N_{DC})$:12:$-(2+N_{DC})$, and $(11+N_{DC})$:12:$(155+N_{DC})$, indexes corresponding to 2 null subcarriers that exist in the RU 11 are: $-(326+N_{DC})$ and $-(158+N_{DC})$, subcarrier index ranges corresponding to an RU 12 are $-(481+N_{DC})$:12:$-(337+N_{DC})$, $-(313+N_{DC})$:12:$-(169+N_{DC})$, $-(145+N_{DC})$:12:$-(1+N_{DC})$, and $(12+N_{DC})$:12:$(156+N_{DC})$, indexes corresponding to 2 null subcarriers that exist in the RU 12 are: $-(325+N_{DC})$ and $-(157+N_{DC})$, subcarrier index ranges corresponding to an RU 13 are $-(156+N_{DC})$:12:$-(12+N_{DC})$, $(1+N_{DC})$:12:$(145+N_{DC})$, $(169+N_{DC})$:12:$(313+N_{DC})$, and $(337+N_{DC})$:12:$(481+N_{DC})$, indexes corresponding to 2 null subcarriers that exist in the RU 13 are: $(157+N_{DC})$ and $(325+N_{DC})$, subcarrier index ranges corresponding to an RU 14 are $-(155+N_{DC})$:12:$-(11+N_{DC})$, $(2+N_{DC})$:12:$(146+N_{DC})$, $(170+N_{DC})$:12:$(314+N_{DC})$, and $(338+N_{DC})$:12:$(482+N_{DC})$, indexes corresponding to 2 null subcarriers that exist in the RU 14 are: $(158+N_{DC})$ and $(326+N_{DC})$, subcarrier index ranges corresponding to an RU 15 are $-(154+N_{DC})$:12:$-(10+N_{DC})$, $(3+N_{DC})$:12:$(147+N_{DC})$, $(171+N_{DC})$:12:$(315+N_{DC})$, and $(339+N_{DC})$:12:$(483+N_{DC})$, indexes corresponding to 2 null subcarriers that exist in the RU 15 are: $(159+N_{DC})$ and $(327+N_{DC})$, subcarrier index ranges corresponding to an RU 16 are $-(153+N_{DC})$:12:$-(9+N_{DC})$, $(4+N_{DC})$:12:$(148+N_{DC})$, $(172+N_{DC})$:12:$(316+N_{DC})$, and $(340+N_{DC})$:12:$(484+N_{DC})$, indexes corresponding to 2 null subcarriers that exist in the RU 16 are: $(160+N_{DC})$ and $(328+N_{DC})$, subcarrier index ranges corresponding to an RU 17 are $-(152+N_{DC})$:12:$-(8+N_{DC})$, $(5+N_{DC})$:12:$(149+N_{DC})$, $(173+N_{DC})$:12:$(317+N_{DC})$, and $(341+N_{DC})$:12:$(485+N_{DC})$, indexes corresponding to 2 null subcarriers that exist in the RU 17 are: $(161+N_{DC})$ and $(329+N_{DC})$, subcarrier index ranges corresponding to an RU 18 are −(151+$N_{DC}$):12:−(7+$N_{DC}$), (6+$N_{DC}$):12:(150+$N_{DC}$), (174+$N_{DC}$):12:(318+$N_{DC}$), and (342+$N_{DC}$):12:(486+$N_{DC}$), indexes corresponding to 2 null subcarriers that exist in the RU 18 are: (162+$N_{DC}$) and (330+$N_{DC}$), subcarrier index ranges corresponding to an RU 19 are −(150+$N_{DC}$):12:−(6+$N_{DC}$), (7+$N_{DC}$):12:(151+$N_{DC}$), (175+$N_{DC}$):12:(319+$N_{DC}$), and (343+$N_{DC}$):12:(487+$N_{DC}$), indexes corresponding to 2 null subcarriers that exist in the RU 19 are: (163+$N_{DC}$) and (331+$N_{DC}$), subcarrier index ranges corresponding to an RU 20 are −(149+$N_{DC}$):12:−(5+$N_{DC}$), (8+$N_{DC}$):12:(152+$N_{DC}$), (176+$N_{DC}$):12:(320+$N_{DC}$), and (344+$N_{DC}$):12:(488+$N_{DC}$), indexes corresponding to 2 null subcarriers that exist in the RU 20 are: (164+$N_{DC}$) and (332+$N_{DC}$), subcarrier index ranges corresponding to an RU 21 are −(148+$N_{DC}$):12:−(4+$N_{DC}$), (9+$N_{DC}$):12:(153+$N_{DC}$), (177+$N_{DC}$):12:(321+$N_{DC}$), and (345+$N_{DC}$):12:(489+$N_{DC}$), indexes corresponding to 2 null subcarriers that exist in the RU 21 are: (165+$N_{DC}$) and (333+$N_{DC}$), subcarrier index ranges corresponding to an RU 22 are −(147+$N_{DC}$):12:−(3+$N_{DC}$), (10+$N_{DC}$):12:(154+$N_{DC}$), (178+$N_{DC}$):12:(322+$N_{DC}$), and (346+$N_{DC}$):12:(490+$N_{DC}$), indexes corresponding to 2 null subcarriers that exist in the RU 22 are: (166+$N_{DC}$) and (334+$N_{DC}$), subcarrier index ranges corresponding to an RU 23 are −(146+$N_{DC}$):12:−(2+$N_{DC}$), (11+$N_{DC}$):12:(155+$N_{DC}$), (179+$N_{DC}$):12:(323+$N_{DC}$), and (347+$N_{DC}$):12:(491+$N_{DC}$), indexes corresponding to 2 null subcarriers that exist in the RU 23 are: (167+$N_{DC}$) and (335+$N_{DC}$), subcarrier index ranges corresponding to an RU 24 are −(145+$N_{DC}$):12:−(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 2 null subcarriers that exist in the RU 24 are: (168+$N_{DC}$) and (336+$N_{DC}$); or each 80 MHz segment of the multiple of 80 MHz comprises 12 52+26-tone RUs, and subcarrier index ranges corresponding to the 12 52+26-tone RUs are shown below, wherein :12:

indicates that an index difference between a latter subcarrier and a former subcarrier in two adjacent subcarriers is 12:

subcarrier index ranges corresponding to an RU 1 are −(492+$N_{DC}$):12:−(348+$N_{DC}$), −(324+$N_{DC}$):12:−(180+$N_{DC}$), −(156+$N_{DC}$):12:−(12+$N_{DC}$), (1+$N_{DC}$):12:(145+$N_{DC}$), (169+$N_{DC}$):12:(313+$N_{DC}$), and (337+$N_{DC}$):12:(481+$N_{DC}$), indexes corresponding to 4 null subcarriers that exist in the RU 1 are: −(336+$N_{DC}$), −(168+$N_{DC}$), (157+$N_{DC}$), and (325+$N_{DC}$), subcarrier index ranges corresponding to an RU 2 are −(491+$N_{DC}$):12:−(347+$N_{DC}$), −(323+$N_{DC}$):12:−(179+$N_{DC}$), −(155+$N_{DC}$):12:−(11+$N_{DC}$), (2+$N_{DC}$):12:(146+$N_{DC}$), (170+$N_{DC}$):12:(314+$N_{DC}$), and (338+$N_{DC}$):12:(482+$N_{DC}$), indexes corresponding to 4 null subcarriers that exist in the RU 2 are: −(335+$N_{DC}$), −(167+$N_{DC}$), (158+$N_{DC}$), and (326+$N_{DC}$), subcarrier index ranges corresponding to an RU 3 are −(490+$N_{DC}$):12:−(346+$N_{DC}$), −(322+$N_{DC}$):12:−(178+$N_{DC}$), −(154+$N_{DC}$):12:−(10+$N_{DC}$), (3+$N_{DC}$):12:(147+$N_{DC}$), (171+$N_{DC}$):12:(315+$N_{DC}$), and (339+$N_{DC}$):12:(483+$N_{DC}$), indexes corresponding to 4 null subcarriers that exist in the RU 3 are: −(334+$N_{DC}$), −(166+$N_{DC}$), (159+$N_{DC}$), and (327+$N_{DC}$), subcarrier index ranges corresponding to an RU 4 are −(489+$N_{DC}$):12:−(345+$N_{DC}$), −(321+$N_{DC}$):12:−(178+$N_{DC}$), −(153+$N_{DC}$):12:−(9+$N_{DC}$), (4+$N_{DC}$):12:(148+$N_{DC}$), (172+$N_{DC}$):12:(316+$N_{DC}$), and (340+$N_{DC}$):12:(484+$N_{DC}$), indexes corresponding to 4 null subcarriers that exist in the RU 4 comprise: −(333+$N_{DC}$) and −(165+$N_{DC}$), subcarrier index ranges corresponding to an RU 5 are −(488+$N_{DC}$):12:−(344+$N_{DC}$), −(320+$N_{DC}$):12:−(176+$N_{DC}$), −(152+$N_{DC}$):12:−(8+$N_{DC}$), and (5+$N_{DC}$):12:(149+$N_{DC}$), indexes corresponding to 4 null subcarriers that exist in the RU 5 are: −(333+$N_{DC}$), −(165+$N_{DC}$), (160+$N_{DC}$), and (328+$N_{DC}$), subcarrier index ranges corresponding to an RU 6 are −(487+$N_{DC}$):12:−(343+$N_{DC}$), −(319+$N_{DC}$):12:−(175+$N_{DC}$), −(151+$N_{DC}$):12:−(7+$N_{DC}$), (6+$N_{DC}$):12:(150+$N_{DC}$), (174+$N_{DC}$):12:(318+$N_{DC}$), and (342+$N_{DC}$):12:(486+$N_{DC}$), indexes corresponding to 4 null subcarriers that exist in the RU 6 are: −(331+$N_{DC}$), −(163+$N_{DC}$), (162+$N_{DC}$), and (330+$N_{DC}$), subcarrier index ranges corresponding to an RU 7 are −(486+$N_{DC}$):12:−(342+$N_{DC}$), −(318+$N_{DC}$):12:−(174+$N_{DC}$), −(150+$N_{DC}$):12:−(6+$N_{DC}$), (7+$N_{DC}$):12:(151+$N_{DC}$), (175+$N_{DC}$):12:(319+$N_{DC}$), and (343+$N_{DC}$):12:(487+$N_{DC}$), indexes corresponding to 4 null subcarriers that exist in the RU 7 are: −(330+$N_{DC}$), −(162+$N_{DC}$), (163+$N_{DC}$), and (331+$N_{DC}$), subcarrier index ranges corresponding to an RU 8 are −(485+$N_{DC}$):12:−(341+$N_{DC}$), −(317+$N_{DC}$):12:−(173+$N_{DC}$), −(149+$N_{DC}$):12:−(5+$N_{DC}$), (8+$N_{DC}$):12:(152+$N_{DC}$), (176+$N_{DC}$):12:(320+$N_{DC}$), and (344+$N_{DC}$):12:(488+$N_{DC}$), indexes corresponding to 4 null subcarriers that exist in the RU 8 are: −(329+$N_{DC}$), −(161+$N_{DC}$), (164+$N_{DC}$), and (332+$N_{DC}$), subcarrier index range corresponding to an RU 9 are −(484+$N_{DC}$):12:−(340+$N_{DC}$), −(316+$N_{DC}$):12:−(172+$N_{DC}$), −(148+$N_{DC}$):12:−(4+$N_{DC}$), (9+$N_{DC}$):12:(153+$N_{DC}$), (177+$N_{DC}$):12:(321+$N_{DC}$), and (345+$N_{DC}$):12:(489+$N_{DC}$), indexes corresponding to 4 null subcarriers that exist in the RU 9 are: −(328+$N_{DC}$), −(160+$N_{DC}$), (165+$N_{DC}$), and (333+$N_{DC}$), subcarrier index ranges corresponding to an RU 10 are −(483+$N_{DC}$):12:−(339+$N_{DC}$), −(315+$N_{DC}$):12:−(171+$N_{DC}$), (147+$N_{DC}$):12:−(3+$N_{DC}$), (10+$N_{DC}$):12:(154+$N_{DC}$), (178+$N_{DC}$):12:(322+$N_{DC}$), and (346+$N_{DC}$):12:(490+$N_{DC}$), indexes corresponding to 4 null subcarriers that exist in the RU 10 are: −(327+$N_{DC}$), −(159+$N_{DC}$), (166+$N_{DC}$), and (334+$N_{DC}$), subcarrier index ranges corresponding to an RU 11 are −(482+$N_{DC}$):12:−(338+$N_{DC}$), −(314+$N_{DC}$):12:−(170+$N_{DC}$), −(146+$N_{DC}$):12:−(2+$N_{DC}$), (11+$N_{DC}$):12:(155+$N_{DC}$), (179+$N_{DC}$):12:(323+$N_{DC}$), and (347+$N_{DC}$):12:(491+$N_{DC}$), indexes corresponding to 4 null subcarriers that exist in the RU 11 are: −(326+$N_{DC}$), −(158+$N_{DC}$), (167+$N_{DC}$), and (335+$N_{DC}$), subcarrier index ranges corresponding to an RU 12 are −(481+$N_{DC}$):12:−(337+$N_{DC}$), −(313+$N_{DC}$):12:−(169+$N_{DC}$), −(145+$N_{DC}$):12:−(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 4 null subcarriers that exist in the RU 12 are: −(325+$N_{DC}$), −(157+$N_{DC}$), (168+$N_{DC}$), and (336+$N_{DC}$); or each 80 MHz segment of the multiple of 80 MHz comprises 12 106-tone RUs, and subcarrier index ranges corresponding to the 12 106-tone RUs are shown below, wherein :12: indicates that an index difference between a latter subcarrier and a former subcarrier in two adjacent subcarriers is 12:

subcarrier index ranges corresponding to an RU 1 are −(492+$N_{DC}$):12:−(12+$N_{DC}$), (1+$N_{DC}$):12:(145+$N_{DC}$), −(491+$N_{DC}$):12:−(347+$N_{DC}$), −(323+$N_{DC}$):12:−(179+$N_{DC}$), −(155+$N_{DC}$):12:−(11+$N_{DC}$), and (2+$N_{DC}$):12:(146+$N_{DC}$), indexes corresponding to 2 null subcarriers that exist in the RU 1 are: −(335+$N_{DC}$) and −(167+$N_{DC}$), subcarrier index ranges corresponding to an RU 2 are −(490+$N_{DC}$):12−(10+$N_{DC}$), (3+$N_{DC}$):12:(147+$N_{DC}$), −(489+$N_{DC}$):12:−(345+$N_{DC}$), −(321+$N_{DC}$):12:−(178+$N_{DC}$), −(153+$N_{DC}$):12:−(9+$N_{DC}$), and (4+$N_{DC}$):12:(148+$N_{DC}$), indexes corresponding to 2 null subcarriers that exist in the RU 2 are: −(333+$N_{DC}$) and −(165+$N_{DC}$), subcarrier index ranges corresponding to an RU 3 are −(488+$N_{DC}$):12−(8+$N_{DC}$), (5+$N_{DC}$):12:(149+$N_{DC}$), −(487+$N_{DC}$):12:−(343+$N_{DC}$), −(319+$N_{DC}$):12:−(175+$N_{DC}$), −(151+$N_{DC}$):12:−(7+$N_{DC}$), and (6+$N_{DC}$):12:(150+$N_{DC}$), indexes corresponding to 2 null subcarriers that exist in the RU 3 are: −(331+$N_{DC}$) and −(163+$N_{DC}$), subcarrier index ranges corresponding to an RU 4 are −(486+$N_{DC}$):12−(6+$N_{DC}$), (7+$N_{DC}$):12:(151+$N_{DC}$), −(485+$N_{DC}$):12:−(341+$N_{DC}$), −(317+$N_{DC}$):12:−(173+$N_{DC}$), −(149+$N_{DC}$):12:−(5+$N_{DC}$), and (8+$N_{DC}$):12:(152+$N_{DC}$), indexes corresponding to 2 null subcarriers that exist in the RU 4 are: −(329+$N_{DC}$) and −(161+$N_{DC}$), subcarrier index ranges corresponding to an RU 5 are −(484+$N_{DC}$):12−(4+$N_{DC}$), (9+$N_{DC}$):12:(153+$N_{DC}$), −(483+$N_{DC}$):12:−(339+$N_{DC}$), −(315+$N_{DC}$):12:−(171+$N_{DC}$), −(147+$N_{DC}$):12:−(3+$N_{DC}$), and (10+$N_{DC}$):12:(154+$N_{DC}$), indexes corresponding to 2 null subcarriers that exist in the RU 5 are: −(327+$N_{DC}$) and −(159+$N_{DC}$), subcarrier index ranges corresponding to an RU 6 are −(482+$N_{DC}$):12:−(2+$N_{DC}$), (11+$N_{DC}$):12:(155+$N_{DC}$), −(481+$N_{DC}$):12:−(337+$N_{DC}$), −(313+$N_{DC}$):12:−(169+$N_{DC}$), −(145+$N_{DC}$):12:−(1+$N_{DC}$), and (12+$N_{DC}$):12:(156+$N_{DC}$), indexes corresponding to 2 null subcarriers that exist in the RU 6 are: −(325+$N_{DC}$) and −(157+$N_{DC}$), subcarrier index ranges corresponding to an RU 7 are −(156+$N_{DC}$):12:−(12+$N_{DC}$), (1+$N_{DC}$):12:(481+$N_{DC}$), −(155+$N_{DC}$):12:−(11+$N_{DC}$), (2+$N_{DC}$):12:(146+$N_{DC}$), (170+$N_{DC}$):12:(314+$N_{DC}$), and (338+$N_{DC}$):12:(482+$N_{DC}$), indexes corresponding to 2 null subcarriers that exist in the RU 7 are: (158+$N_{DC}$) and (326+$N_{DC}$), subcarrier index ranges corresponding to an RU 8 are −(154+$N_{DC}$):12:−(10+$N_{DC}$), (3+$N_{DC}$):12:(483+$N_{DC}$), −(153+$N_{DC}$):12:−(9+$N_{DC}$), (4+$N_{DC}$):12:(148+$N_{DC}$), (172+$N_{DC}$):12:(316+$N_{DC}$), and (340+$N_{DC}$):12:(484+$N_{DC}$), indexes corresponding to 2 null subcarriers that exist in the RU 8 are: (160+$N_{DC}$) and (328+$N_{DC}$), subcarrier index ranges corresponding to an RU 9 are −(152+$N_{DC}$):12:−(8+$N_{DC}$), (5+$N_{DC}$):12: (485+$N_{DC}$), −(151+$N_{DC}$):12:−(7+$N_{DC}$), (6+$N_{DC}$):12:(150+$N_{DC}$), (174+$N_{DC}$):12:(318+$N_{DC}$), and (342+$N_{DC}$):12:(486+$N_{DC}$), indexes corresponding to 2 null subcarriers that exist in the RU 9 are: (162+$N_{DC}$) and (330+$N_{DC}$), subcarrier index ranges corresponding to an RU 10 are −(150+$N_{DC}$):12:−(6+$N_{DC}$), (7+$N_{DC}$):12:(487+$N_{DC}$), −(149+$N_{DC}$):12:−(5+$N_{DC}$), (8+$N_{DC}$):12:(152+$N_{DC}$), (176+$N_{DC}$):12:(320+$N_{DC}$), and (344+$N_{DC}$):12:(488+$N_{DC}$), indexes corresponding to 2 null subcarriers that exist in the RU 10 are: (164+$N_{DC}$) and (332+$N_{DC}$), subcarrier index ranges corresponding to an RU 11 are −(148+$N_{DC}$):12:−(4+$N_{DC}$), (9+$N_{DC}$):12:(489+$N_{DC}$), −(147+$N_{DC}$):12:−(3+$N_{DC}$), (10+$N_{DC}$):12:(154+$N_{DC}$), (178+$N_{DC}$):12:(322+$N_{DC}$), and (346+$N_{DC}$):12:(490+$N_{DC}$), indexes corresponding to 2 null subcarriers that exist in the RU 11 are: (166+$N_{DC}$) and (334+$N_{DC}$), subcarrier index ranges corresponding to an RU 12 are −(146+$N_{DC}$):12:−(2+$N_{DC}$), (11+$N_{DC}$):12:(491+$N_{DC}$), −(145+$N_{DC}$):12:−(1+$N_{DC}$), (12+$N_{DC}$):12:(156+$N_{DC}$), (180+$N_{DC}$):12:(324+$N_{DC}$), and (348+$N_{DC}$):12:(492+$N_{DC}$), and indexes corresponding to 2 null subcarriers that exist in the RU 12 are: (168+$N_{DC}$) and (336+$N_{DC}$); or each 80 MHz segment of the multiple of 80 MHz comprises 4 242-tone RUs, and subcarrier index ranges corresponding to the 4 242-tone RUs are shown below, wherein :12: indicates that an index difference between a latter subcarrier and a former subcarrier in two adjacent subcarriers is 12:

subcarrier index ranges corresponding to an RU 1 are −(492+$N_{DC}$):12:−(12+$N_{DC}$), −(491+$N_{DC}$):12:−(23+$N_{DC}$), −(490+$N_{DC}$):12:−(22+$N_{DC}$), (13+$N_{DC}$):12:(481+$N_{DC}$), (14+$N_{DC}$):12:(482+$N_{DC}$), and (3+$N_{DC}$):12:(483+$N_{DC}$), subcarrier index ranges corresponding to an RU 2 are −(489+$N_{DC}$):12:−(9+$N_{DC}$), −(488+$N_{DC}$):12:−(20+$N_{DC}$), −(487+$N_{DC}$):12:−(19+$N_{DC}$), (16+$N_{DC}$):12:(484+$N_{DC}$), (17+$N_{DC}$):12:(485+$N_{DC}$), and (6+$N_{DC}$):12:(486+$N_{DC}$), subcarrier index ranges corresponding to an RU 3 are −(486+$N_{DC}$):12:−(6+$N_{DC}$), −(485+$N_{DC}$):12:−(17+$N_{DC}$), −(484+$N_{DC}$):12:−(16+$N_{DC}$), (19+$N_{DC}$):12:(487+$N_{DC}$), (20+$N_{DC}$):12:(488+$N_{DC}$), and (9+$N_{DC}$):12:(489+$N_{DC}$), and subcarrier index ranges corresponding to an RU 4 are −(483+$N_{DC}$):12:−(3+$N_{DC}$), −(482+$N_{DC}$):12:−(14+$N_{DC}$), −(481+$N_{DC}$):12:−(13+$N_{DC}$), (22+$N_{DC}$):12:(490+$N_{DC}$), (23+$N_{DC}$):12:(491+$N_{DC}$), and (12+$N_{DC}$):12:(492+$N_{DC}$).

* * * * *